(12) United States Patent
Pahlman et al.

(10) Patent No.: US 7,247,279 B2
(45) Date of Patent: Jul. 24, 2007

(54) SYSTEM FOR REMOVAL OF POLLUTANTS FROM A GAS STREAM

(75) Inventors: John E. Pahlman, deceased, late of Bloomington, MN (US); by Kathleen S. Pahlman, legal representative, Bloomington, MN (US); Steven C. Carlton, Emily, MN (US); Ray V. Huff, Hereford, AZ (US); Charles F. Hammel, Escondido, CA (US); Richard M. Boren, Bakersfield, CA (US); Kevin P. Kronbeck, Baxter, MN (US); Joshua E. Larson, Burnsville, MN (US); Patrick A. Tuzinski, Bloomington, MN (US); Steve G. Axen, Golden, CO (US)

(73) Assignee: EnviroScrub Technologies Corporation, Minneapolis, MN (US)

( * ) Notice: Subject to any disclaimer, the term of this patent is extended or adjusted under 35 U.S.C. 154(b) by 411 days.

(21) Appl. No.: 10/458,763

(22) Filed: Jun. 9, 2003

(65) Prior Publication Data

US 2004/0109800 A1    Jun. 10, 2004

Related U.S. Application Data

(63) Continuation-in-part of application No. 09/919,600, filed on Jul. 31, 2001, now Pat. No. 6,610,263.

(60) Provisional application No. 60/222,236, filed on Aug. 1, 2000, provisional application No. 60/232,049, filed on Sep. 12, 2000, provisional application No. 60/232,097, filed on Sep. 12, 2000, provisional application No. 60/238,105, filed on Oct. 4, 2000, provisional application No. 60/239,422, filed on Oct. 10, 2000, provisional application No. 60/239,435, filed on Oct. 10, 2000, provisional application No. 60/242,830, filed on Oct. 23, 2000, provisional application No. 60/243,090, filed on Oct. 24, 2000, provisional application No. 60/244,948, filed on Nov. 1, 2000, provisional application No. 60/288,166, filed on May 2, 2001, provisional application No. 60/288,165, filed on May 2, 2001, provisional application No. 60/288,237, filed on May 2, 2001, provisional application No. 60/288,245, filed on May 2, 2001, provisional application No. 60/288,243, filed on May 2, 2001, provisional application No. 60/288,242, filed on May 2, 2001, provisional application No. 60/288,168, filed on May 2, 2001, provisional application No. 60/288,167, filed on May 2, 2001, provisional application No. 60/295,930, filed on Jun. 5, 2001, provisional application No. 60/296,006, filed on Jun. 5, 2001, provisional application No. 60/296,005, filed on Jun. 5, 2001, provisional application No. 60/296,004, filed on Jun. 5, 2001, provisional application No. 60/296,007, filed on Jun. 5, 2001, provisional application No. 60/296,003, filed on Jun. 5, 2001, provisional application No. 60/299,362, filed on Jun. 19, 2001, provisional application No. 60/299,363, filed on Jun. 19, 2001, provisional application No. 60/387,064, filed on Jun. 7, 2002, provisional application No. 60/362,477, filed on Mar. 6, 2002, provisional application No. 60/380,537, filed on May 13, 2002.

(51) Int. Cl.
 *B01D 50/00* (2006.01)
(52) U.S. Cl. .................................................. 422/168
(58) Field of Classification Search ................ 422/168, 422/171, 177
See application file for complete search history.

(56) References Cited

U.S. PATENT DOCUMENTS

| | | | |
|---|---|---|---|
| 4,164,545 | A | 8/1979 | Scott |
| 4,277,255 | A | 7/1981 | Apelgren |
| 4,552,734 | A | 11/1985 | Iannicelli et al. |
| 4,719,791 | A | 1/1988 | Greiner et al. |
| 4,923,688 | A | 5/1990 | Iannicelli |
| 5,366,710 | A | 11/1994 | Chou et al. |
| 5,391,218 | A | 2/1995 | Jorgenson et al. |
| 5,505,766 | A | 4/1996 | Chang |
| 5,871,703 | A | 2/1999 | Alix et al. |
| 6,117,403 | A | 9/2000 | Alix et al. |
| 6,132,692 | A | 10/2000 | Alix et al. |
| 6,214,304 | B1 | 4/2001 | Rosenthal et al. |
| 2002/0150516 | A1 | 10/2002 | Pahlman et al. |

FOREIGN PATENT DOCUMENTS

WO    WO 01/87464 A1    11/2001

*Primary Examiner*—Edward M. Johnson
(74) *Attorney, Agent, or Firm*—Fredrikson & Byron, PA

(57) ABSTRACT

System for removal of targeted pollutants from combustion and other industrial process gases and processes utilizing the system. Metal oxides are introduced from feeders into reaction zones of the system where they are contacted with a gas from which pollutants are to be removed. With respect to pollutant removal, the sorbent may interact with a pollutant as a catalyst, reactant, adsorbent or absorbent. Removal may occur in single-stage, dual-stage, or multi-stage systems with a variety of different configurations and reaction zones, e.g., bag house, cyclones, fluidized beds, and the like. Process parameters, particularly system differential pressure, are controlled by electronic controls to maintain minimal system differential pressure, and to monitor and adjust pollutant removal efficiencies. Reacted sorbent may be removed from the reaction action zones for recycling or recycled or regenerated with useful and marketable by-products being recovered during regeneration.

11 Claims, 28 Drawing Sheets

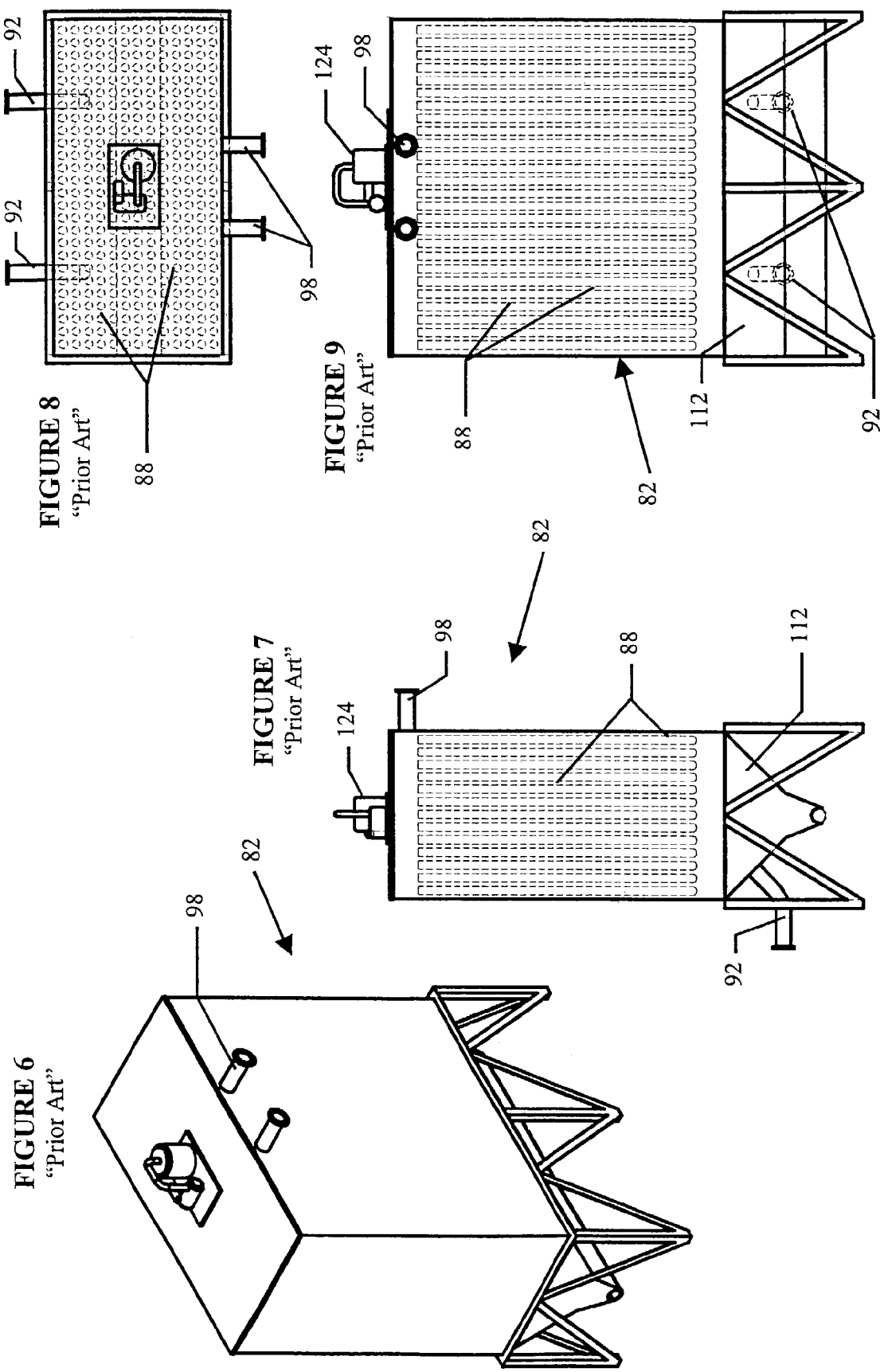

SOFTWARE CONTROL LOOP FOR SIMULATANEOUS NO$_X$, SO$_X$, AND ΔP CONTROL

SOFTWARE CONTROL LOOP FOR SIMULTANEOUS $NO_x$, $SO_x$, $\Delta P$ CONTROL, AND VARIABLE VENTURI POSITION CONTROL

FIGURE 26 – CURRENT REGENERATION WET PROCESS

FIGURE 27 – CURRENT REGENERATION DRY PROCESS

NO$_x$ & SO$_2$ TESTING, SO$_2$ VALUES
OXIDES OF MANGANESE TYPE A, TYPE B, AND TYPE C VS. TIME
INLET CONCENTRATION VALVES OF 17.35% CO$_2$, 395 PPM CO, 391 PPM NO, & 407 PPM SO$_2$

POURBAIX DIAGRAM AT 25° C WITH 1x10⁰ DISSOLVED MANGANESE CONCENTRATION

POURBAIX DIAGRAM AT 25° C WITH $1 \times 10^{-6}$ DISSOLVED MANGANESE CONCENTRATION

US 7,247,279 B2

SYSTEM FOR REMOVAL OF POLLUTANTS FROM A GAS STREAM

RELATED APPLICATIONS

This application is a continuation-in-part of U.S. application Ser. No. 09/919,600, filed Jul. 31, 2001 now U.S. Pat. No. 6,610,263 which claims priority for U.S. Provisional Applications: No. 60/222,236, filed Aug. 1, 2000; Nos. 60/232,049; 60/232,097, both filed Sep. 12, 2000; No. 60/238,105, filed Oct. 4, 2000; Nos. 60/239,422; 60/239,435, both filed Oct. 10, 2000; No. 60/242,830, filed Oct. 23, 2000; No. 60/243,090, filed Oct. 24, 2000; No. 60/244,948, filed Nov. 1, 2000; Nos. 60/288,166; 60/288,165; 60/288,237; 60/288,245; 60/288,243; 60/288,242; 60/288,168; 60/288,167, all filed May 2, 2001; Nos. 60/295,930; 60/296,006; 60/296,005; 60/296,004; 60/296,007; 60/296,003; all filed Jun. 5, 2001; and Nos. 60/299,362; 60/299,363, both filed Jun. 19, 2001, all of which are incorporated herein by reference. This application further claims priority to the following U.S. Utility and Provisional Applications: No. 60/387,064, filed Jun. 7, 2002; No. 10/328,490, filed Dec. 23, 2002; No. 60/362,477, filed Mar. 6, 2002 and No. 60/380,537, filed May 13, 2002, which are incorporated herein by reference.

FIELD OF THE INVENTION

The invention relates to the systems and processes utilizing metal oxide sorbents for removal of gaseous pollutants from gases generated from the burning of fossil fuels and from other process gases, with electronic control of operational parameters and regeneration of the sorbent. The invention further relates to regeneration of the metal oxide sorbents, with magnetic separation of ash and other non-magnetic or weakly magnetic particulates during regeneration processing.

BACKGROUND OF THE INVENTION

During combustion of fuels that contain sulfur compounds, oxides of sulfur ($SO_X$), such as sulfur dioxide ($SO_2$), and sulfur trioxide ($SO_3$) are produced as a result of oxidation of the sulfur. Some fuels may contain nitrogen compounds that contribute to the formation of oxides of nitrogen ($NO_X$) which are primarily formed at high temperatures by the reaction of nitrogen and oxygen from the air used for the reaction with the fuel, such as nitric oxide (NO) and nitrogen dioxide ($NO_2$) or its dimer ($N_2O_4$). Many technologies have been developed for reduction of $SO_X$ and $NO_X$, but few can remove both types of pollutants simultaneously in a dry process or reliably achieve cost effective levels of reduction.

Typical sources of nitrogen and sulfur oxide pollutants are power plant stack gases, automobile exhaust gases, heating-plant stack gases, and emissions from various industrial process, such as smelting operations and nitric and sulfuric acid plants. Power plant emissions represent an especially formidable source of nitrogen oxides and sulfur oxides, by virtue of the very large tonnage of these pollutants and such emissions discharged into the atmosphere annually. Moreover, because of the low concentration of the pollutants in such emissions, typically 500 ppm or less for nitrogen oxides and 3,000 ppm or less for sulfur dioxide, their removal is difficult because very large volumes of gas must be treated.

In the past to meet the regulatory requirements, coal-burning power plants have often employed a wet scrubbing process, which commonly uses calcium compounds to react with $SO_X$ to form gypsum. This waste product is normally discarded as a voluminous liquid slurry in an impoundment and ultimately is capped with a clay barrier, which is then covered with topsoil once the slurry is de-watered over time. Alternatively, some power-plant operators have chosen to burn coal that contains much lower amounts of sulfur to reduce the quantities of $SO_X$ emitted to the atmosphere. In the case of $NO_X$, operators often choose to decrease the temperature at which the coal is burned. This in turn decreases the amount of $NO_X$ produced and therefore emitted; however, low temperature combustion does not utilize the full heating value of the coal, resulting in loss of efficiency.

Turbine plants normally use natural gas, which contains little or no sulfur compounds, to power the turbines, and therefore virtually no $SO_X$ is emitted. On the other hand at the temperature that the turbines are commonly operated, substantial $NO_X$ is produced. In addition to Selective Catalytic Reduction (SCR) processes for conversion of $NO_X$ to nitrogen, water vapor, and oxygen, which can be safely discharged, some operators choose to reduce the temperature at which the turbines are operated and thereby reduce the amount of $NO_X$ emitted. With lower temperatures the full combustion/heating value of natural gas is not realized, resulting in loss of efficiency. Unfortunately for these operators, newer environmental regulation will require even greater reduction of $SO_X$ and $NO_X$ emissions necessitating newer or more effective removal technologies and/or further reductions in efficiency.

Operators of older coal-burning power plants are often running out of space to dispose of solid wastes associated with use of scrubbers that use calcium compounds to form gypsum. Operators of newer plants would choose to eliminate the problem from the outset if the technology were available. Additionally, all power plants, new and old, are faced with upcoming technology requirements of further reducing emissions of $NO_X$ and will have to address this issue in the near future. Thus, plants that currently meet the requirements for $SO_X$ emissions are facing stricter requirements for reduction of $NO_X$ for which there has been little or no economically feasible technology available.

Of the few practical systems, which have hitherto been proposed for the removal of nitrogen oxides from power plant flue gases, all have certain disadvantages. Various methods have been proposed for the removal of sulfur dioxide from power plant flue gases, but they too have disadvantages. For example, wet scrubbing systems based on aqueous alkaline materials, such as solutions of sodium carbonate or sodium sulfite, or slurries of magnesia, lime or limestone, usually necessitate cooling the flue gas to about 55° C. in order to establish a water phase. At these temperatures, the treated gas requires reheating in order to develop enough buoyancy to obtain an adequate plume rise from the stack. U.S. Pat. No. 4,369,167 teaches removing pollutant gases and trace metals with a lime slurry. A wet scrubbing method using a limestone solution is described in U.S. Pat. No. 5,199,263.

Considerable work has also been done in an attempt to reduce $NO_X$ pollutants by the addition of combustion catalysts, usually organo-metallic compounds, to the fuel during combustion. However, the results of such attempts have been less successful than staged combustion. $NO_X$ oxidation to $N_2$ is facilitated by ammonia, methane, et al. which is not effected by $SO_X$ is described in U.S. Pat. No. 4,112,053. U.S. Pat. No. 4,500,281 teaches the limitations of organo-metallic catalysts for $NO_X$ removal versus staged combustion. Heavy metal sulfide with ammonia is described for reducing $NO_X$ in stack gases in U.S. Pat. No. 3,981,971.

Considerable effort has been expended to remove sulfur from normally solid fuels, such as coal, lignite, etc. Such processes include wet scrubbing of stack gases from coal-fired burners. However, such systems are capital intensive and the disposal of wet sulfite sludge, which is produced as a result of such scrubbing techniques, is also a problem. Cost inefficiencies result from the often-large differential pressures across a wet scrubber removal system; differential pressures in excess of 30 inches of water column (WC) are not unusual. Also, the flue gases must be reheated after scrubbing in order to send them up the stack, thus reducing the efficiency of the system. Both U.S. Pat. Nos. 4,102,982 and 5,366,710 describe the wet scrubbing of $SO_X$ and $NO_X$.

The combustion gas stream from a coal-burning power plant is also a major source of airborne acid gases, fly ash, mercury compounds, and elemental mercury in vapor form. Coal contains various sulfides, including mercury sulfide. Mercury sulfide reacts to form elemental mercury and $SO_X$ in the combustion boiler. At the same time other sulfides are oxidized to $SO_X$ and the nitrogen in the combustion air is oxidized to $NO_X$. Downstream of the boiler, in the ducts and stack of the combustion system, and then in the atmosphere, part of the elemental mercury is re-oxidized to form mercury compounds, primarily to mercuric chloride ($HgCl_2$). This occurs by reactions with chloride ions or the like normally present in combustion reaction gases flowing through, the combustion system of a coal-burning power plant.

Many power plants emit daily amounts of up to a pound of mercury, as elemental mercury and mercury compounds. The concentration of mercury in the stream of combustion gas is about 4.7 parts per billion (ppb) or 0.0047 parts per million (ppm). Past efforts to remove mercury from the stream of combustion gas, before it leaves the stack of a power plant, include: (a) injection, into the combustion gas stream, of activated carbon particles or particulate sodium sulfide or activated alumina without sulfur; and (b) flowing the combustion gas stream through a bed of activated particles.

In addition to $SO_X$, $NO_X$, mercury (elemental and compound), combustion, industrial and other process gases may contain other pollutants of concern such as hydrogen sulfide, totally reduced sulfides (TRS), oxides of carbon, and ash to name a few. EnviroScrub Technologies Corporation has developed pollutant removal systems and processes that overcome many of the shortcomings of prior art pollutant removal systems utilizing a regenerable sorbent of oxides of manganese. Some of these systems and process are referred to and commonly known as Pahlman™ systems and processes and are described in U.S. published application Ser. No. 20020150516, and international published application numbers WO0228513A2, WO0209852A2, and WO0209852A3, the disclosures of which are incorporated herein by this reference. They also include processes for regeneration of the sorbent and for recovery and/or production of useful values and by-products from regeneration processing streams.

Applicants have now recognized and determined that different metal oxides may be selected and utilized as the sorbent based upon certain physical or chemical properties of the metal oxides themselves and/or of the reaction products formed between the metal oxides and the target pollutants in gas streams.

During regeneration, reacted sorbent may be rinsed or washed to remove reaction products from the sorbent surface. Ash and other spectator particulates can accumulate in the rinses, washes or other processing solutions and streams during regeneration. They can interfere with or inhibit sorbent regeneration, by-product production and recovery of useful values present in the processing solutions and streams. Their presence may increase to undesired levels through several cycles and eventually require disposal or other costly treatment and purchases for processing solutions. Further, the overall rate or efficiency of regeneration, production or recovery may be reduced at significant levels. Applicants have found that with dry or wet magnetic separation techniques, non-magnetic or weakly magnetic particulate, spectator particulates, can be separated from certain metal oxides utilized as sorbents. Removal of ash and other spectator particulates prevents their accumulation in regeneration processing streams avoiding potential costs or deleterious affects during regeneration or recovery.

SUMMARY OF THE INVENTION

The systems and processes of the invention utilize metal oxides as sorbent for removal of target pollutants from gas streams. In an embodiment, the system is comprised of at least one feeder, at least one reaction zone, and an electronic controller. The system may further comprise a thermal regeneration subsystem and/or an aqueous regeneration subsystem and optionally a magnetic separation device.

The feeder is selected from the group consisting of a dry sorbent feeder, a sorbent slurry feeder, sorbent filter cake feeder, and a feeder system. The feeder contains a supply of a sorbent comprised of a regenerable metal oxide and is configured to handle and feed the sorbent. The metal oxide is a metal oxide that is insoluble in aqueous solutions and that produces soluble and/or thermally decomposable reaction products when reacted with a target pollutant in a gas stream.

The reaction zones of the systems are at least one reaction zone configured for introduction of the sorbent and a gas containing at least one target pollutant. A gas containing target pollutants is introduced into a reaction zone and contacted with the sorbent for a time sufficient to effect capture of the target pollutant at a targeted pollutant capture rate through formation of a reaction product. The at least one reaction zone being comprised of a least one bag house having fabric filter bags disposed therein and optionally preceded by a gas-solids reaction unit. The metal oxides are in particle form when introduced in to the bag house and have an average particle size of about 0.1 to about 500 microns and a BET value ranging from about 1 to about 1000 $m^2/g$.

The electronic controller is equipped so that it is capable of simultaneously monitoring and adjusting system operational parameters. The controller provides integrated control of system differential pressure and other operational parameters selected from the group consisting of target pollutant capture rates, gas inlet temperature, sorbent feed rate and any combination thereof. Differential pressure within the system is regulated so that any differential pressure across the system is no greater than a predetermined level and so that the target pollutants are removed at their targeted capture rate set points.

In other embodiments of the invention the at least one reaction zone comprises a first reaction zone and a second reaction zone. The two reaction zones are connected so that gas passing from the first reaction zone is introduced into the second reaction zone. Both reaction zones are a bag house having fabric filter bags disposed therein and each optionally preceded by a gas-solid reaction unit.

In a further embodiment, the at least one reaction zone comprises a first reaction zone, a second reaction zone, and a third reaction zone. The reaction zones are connected so that gas passing from the first reaction zone may be introduced in the second reaction zone, the third reaction zone or both reaction zones. The reaction zones are each a bag houses having fabric filter bags disposed therein and each is optionally preceded by a gas-solid reaction unit.

In yet further embodiment, the at least one reaction zone comprises modular reaction unit comprised of at least three (3) interconnected reaction zones. The reaction zones are connected so that a gas containing target pollutants can be routed through any one of the reaction zones, any two of the reaction zones in series, or all of the at least three reaction zones in series or in parallel, or any combination of series and parallel. Each reaction zone is separately connected to the feeder so that sorbent can be introduced into each reaction zone. The reaction zones each are a bag house having fabric filter bags disposed therein and each may be optionally preceded by a gas-solid reaction unit.

As gas-solid reaction unit may be selected from the group including, but not limited to, a fluidized bed, a pseudo-fluidized bed, a reaction column, a fixed bed, a pipe/duct reactor, a moving bed, a serpentine reactor, a cyclone, a multiclone, or combinations thereof and the bag house selected from the group consisting of conventional bag house, an inverted bag house, a bag house reactor, and a fluidized bed-bag house reactor.

The Sorbent

The processes of the invention utilizes the systems and subsystems to removal target pollutant and to regenerate metal oxide sorbents. The various embodiments are carried out in a system according to the invention. A gas containing target pollutants is introduced into the reaction zones of the system and contacted with the sorbent for a time sufficient to capture at least one target pollutant at a target pollutant capture rate through formation of a reaction product between the target pollutant and the sorbent to yield reacted sorbent. The gas is introduced at temperatures ranging from ambient to below the thermal decomposition temperature of the reaction products. The gas is then-vented from the reaction zone free of sorbent and any other particulates present in the gas. The reacted sorbent may be regenerated in a thermal regeneration subsystem and/or an aqueous regeneration subsystem. Optionally, the reacted sorbent may be routed to a magnetic seperation device where magnetic sorbent particles are separated from nonmagnetic particles prior to routing to the aqueous regeneration subsystem.

BRIEF DESCRIPTION OF THE DRAWINGS

FIG. 6 is a perspective view of a commercially available bag house.

FIG. 7 is an end elevation view of a commercially available bag house.

FIG. 8 is a top plan view of a commercially available bag house.

FIG. 9 is a side elevation view of a commercially available bag house.

DETAILED DESCRIPTION OF THE INVENTION

Figure 1:
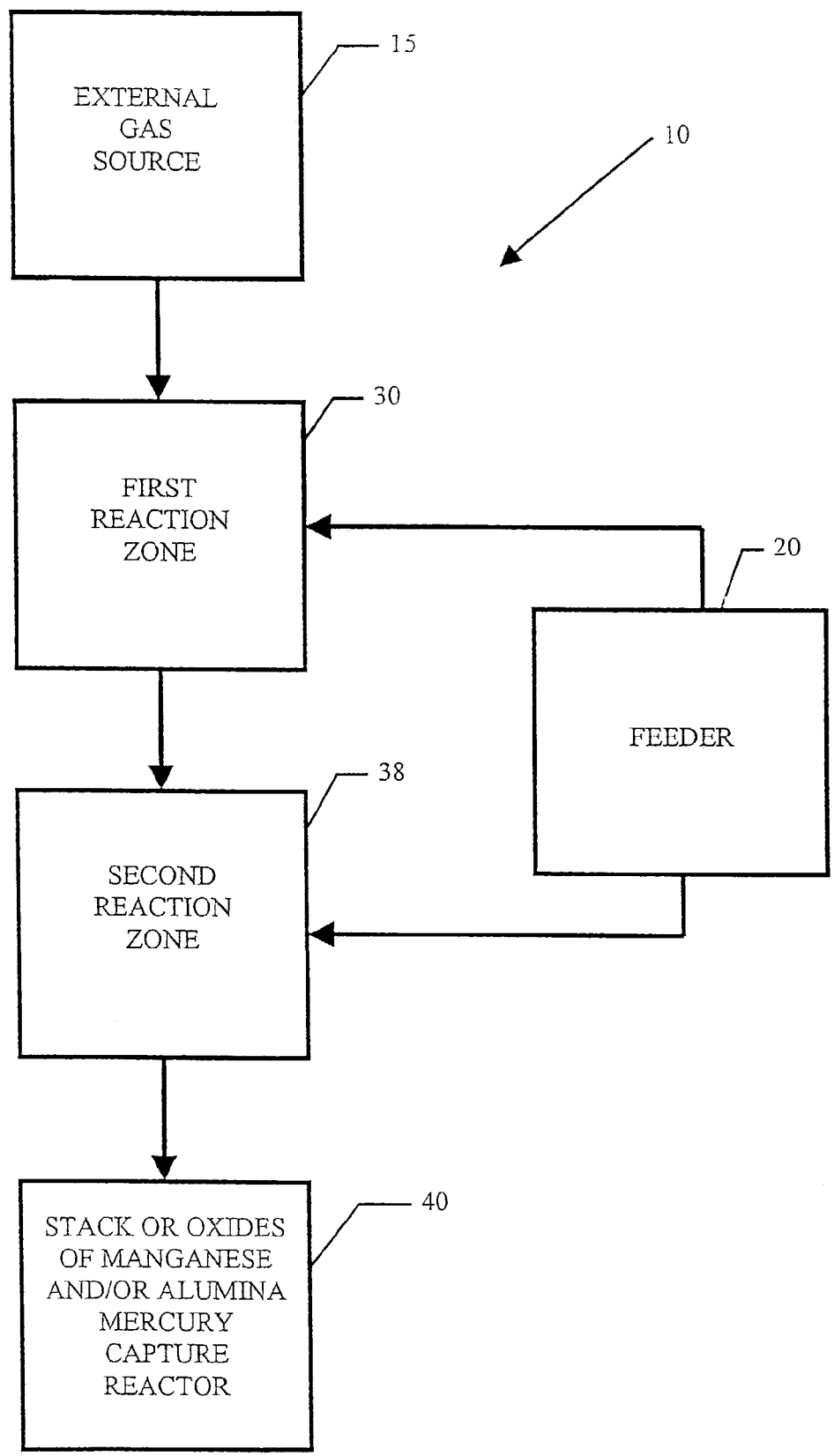
FIG. 1 is a schematic block diagram showing a system according to the invention.

The systems and processes of the invention are utilized in the removal of target pollutants from a gas stream. In the invention, a gas containing target pollutants, such as $SO_X$ and/or $NO_X$, is contacted with a sorbent of regenerable metal oxides and/or regenerated metal oxides or introduced into a reaction zone where the gas is contacted with such sorbents under electronically controlled conditions so that the target pollutants are removed at targeted or preset capture rate set points. The sorbent may interact with the pollutants in a gas stream as a catalyst, a chemical reactant, an absorbent or an adsorbent to form a "reaction product" as later defined herein below. If, for example, the metal is manganese, the sorbent would be oxides of manganese; the sorbent would interact with the $SO_X$ and the $NO_X$ to form, respectively, sulfates of manganese and nitrates of manganese, metal salts. Such salts and other reaction products typically form or are adsorbed or adsorbed on the surface of the sorbent which is in particle form when introduced into the reaction zone. A sorbent thus reacted with a target pollutant is a "reacted sorbent" as that term is later defined herein below.

When the targeted pollutant capture rate can no longer be achieved due to diminished sorbent loading capacity or when operating procedures require, the reacted sorbent is removed from the reaction zone and routed for regeneration of the sorbent by chemical or physical techniques described herein below or by other techniques known to those skilled in the art.

The invention may be understood with reference to the following definitions:

"Target pollutant," as used herein, refers to the pollutant or pollutants that are to be captured and removed from a gas stream. Examples of target pollutants include, but are not limited to, $NO_X$, $SO_X$, elemental mercury (Hg) and mercury compounds, hydrogen sulfide ($H_2S$), totally reduced sulfides (TRS), chlorides, such as hydrochloric acid (HCl), and oxides of carbon (CO and $CO_2$), as well as other chemical constituents in a gas stream targeted for removal in the systems and processes of the invention.

"Substantially stripped," as used herein means that a target pollutant has been removed from a gas at about a targeted capture rate by interaction with a sorbent and/or by physical separation in a solid-gas separator reaction zone. The stripping, i.e, removal or capture, of a target pollutant, may be initially commenced upon contact with the sorbent upstream of a reaction zone or in a first reaction zone and completed in a subsequent reaction zone.

"Reacted sorbent" or "loaded sorbent," as used interchangeably herein, refers to sorbent that has interacted with one or more target pollutants in a gas whether by chemical reaction, catalysis, adsorption or absorption. Regardless of the specific mechanism of interaction, the sorbent is said to have "reacted" with the target pollutant. The term does not mean that the sorbent has been completely consumed or utilized in the interaction or that all reactive or active sites on the sorbent have been utilized since all such sites may not actually be utilized. Therefore, the loading capacity of the sorbent may not be completely exhausted, though it will eventually diminish through continued use to a point where targeted capture rates can no longer be achieved, dictating that the sorbent be either disposed or regenerated.

"Unreacted sorbent" means virgin sorbent that has not interacted with a target pollutant in a gas.

"Metal nitrates," as used herein, refers to and includes the various forms of metal nitrate compounds, regardless of chemical formula, that may be formed through the chemical reaction between $NO_X$ and the metal of the sorbent and includes hydrated forms as well.

"Metal sulfates," as used herein, refers to and includes the various forms of metal sulfate compounds, regardless of chemical formula that may be formed through the chemical reaction between $SO_X$ and the sorbent and includes hydrated forms as well.

"Reaction product," as used herein, refers to and includes those chemical compounds formed through chemical or catalytic interaction of the metal oxide sorbent with the target pollutants in a gas stream as well as those chemical compounds, regardless of the mechanism of their formation, that are adsorbed or absorbed to the sorbent from the gas stream, such as metal oxide sulfates, metal oxide nitrates, mercury compounds. The term specifically includes inorganic metal salts. Without being bound by theory, Applicants believes that $Hg_2Cl_2$, a mercury compound, may be formed from elemental mercury and chloride present in a gas stream by reaction of chemical constituents in the gas or by catalytic interaction and possibly adsorbed or adsorbed on or to the surface of the sorbent particles. In sufficient concentration the reaction product may sufficiently accumulate as to be itself in particle form.

"Metal oxide stability area" or "stability area," as used herein, refers to the region of thermodynamic stability for metal oxides at their valence states delineated by Eh and pH values for aqueous solutions or, phrased alternatively, the domain of metal oxide stability for an aqueous solution. More specifically, it refers to the region or domain delineated by Eh and pH values for aqueous solutions in an electrochemical stability diagram, such as presented by Pourbaix diagrams and their equivalents, such as the Latimer Diagram or the Frost Diagram.

"$MnO_2$ stability area," as used herein, refers to the metal oxide stability area for manganese dioxide; or, phrased alternatively, the region or domain of $MnO_2$ stability delineated by Eh and pH values for aqueous solutions in an electrochemical stability diagram, such as presented by Pourbaix diagrams and their equivalents, such as the Latimer Diagram or the Frost Diagram.

In Applicants' above-referenced published patent applications oxides of manganese were disclosed as a sorbent useful in the pollutant removal systems and processes. Applicants have now recognized that other metal oxides or combinations thereof having certain chemical and physical characteristics may be utilized in addition to oxides of manganese in the pollutant removal systems and processes disclosed and described herein. These characteristics include, but are not limited to, pollutant loading capacity or oxidation potential; insolubility or poor solubility in aqueous solutions at processing temperatures; generation of reaction products, when interacted or reacted with target pollutants, that are soluble in aqueous solutions; generation of soluble reaction products that yield metal cations that are susceptible to precipitation processing in oxidizing aqueous solutions; generation of reaction products that are thermally decomposable at temperatures above the temperatures at which gases containing target pollutants are introduced into the reactions zones of the systems of the invention, but that are otherwise thermally stable at such temperatures; and combinations thereof.

Selection of suitable metal oxides exhibiting desired combinations of the above characteristic is a matter of engineering design choice dependant upon the target pollutant, the temperature of process gases and processing solutions, and the method of regeneration. The metal oxides that are most useful in the system of the invention are those which form either soluble or thermally decomposable reaction products but that are themselves stable at processing temperatures and insoluble in aqueous or weakly acid aqueous solutions. For example, oxides of manganese are insoluble in aqueous solutions and when reacted with $NO_X$ and $SO_X$ will form, respectively, nitrates and sulfates of manganese. Both are soluble metal salts which are also thermally decomposable. Suitable metal oxides are not limited to those that exhibit both properties. A suitable metal oxide will react with a target pollutant to produce a reaction product exhibiting one of these properties and preferably both.

Metal oxides that can yield reactions products with those specific desired properties include, but are not limited to, representative metals and transition metals. Of the transition metals, those from the fourth period of the periodic table are particularly well suited. By way of example, some suitable metal oxides include, but are not limited to, oxides of any one of the following metals: magnesium, calcium, scandium, chromium, manganese, iron, nickel copper, zinc, aluminum, yttrium, rhodium, palladium, silver, cadmium and combinations thereof. Those skilled in the art can readily identify those metal oxides useful in the invention based upon physical properties of the metal oxides and their corresponding metal salts. Oxides of manganese may be preferred from a cost or economical perspective because they are relatively abundant and react with both $SO_X$ and $NO_x$ to provide reaction products, metal salts, that are both soluble and thermally decomposable.

After insolubility of the metal oxide and formation of soluble or thermally decomposable reaction products, particle size is another important physical property characteristic as the sorbent particles generally need to be of a size capable of being entrained in typical process gas flows. Of course, gas flow rates can be increased with fans and the like in order to entrain larger particles prior to introduction into a bag house. With consideration of particle size, metal oxides may be selected and the regeneration processes of the invention may be engineered to yield metal oxides, e.g., oxides of manganese, having an average particle size sufficient to be entrained by a flow of target pollutant containing gas but not so small as to pass through fabric filter bags disposed in a bag house utilized as a reaction zone in the systems of the invention or through reacted sorbent filter cakes formed thereon. Typically, sorbent particles having an average particle size ranging from about 0.1 to about 500 microns are of sufficient size. Preferably, the metal oxides will have an average particle size of less than about 300 microns, and more preferably of less than about 100 microns.

Regenerable metal oxides and regenerated metal oxides of manganese when dry will typically be fine, powdery, particulate compounds. However, they may be used in the systems of the invention as a sorbent slurry or a sorbent filter cake formed during regeneration and injected or otherwise introduced, using different types of sorbent feeders, into a gas-solid reaction unit upstream from a bag house where surface moisture, but not structural water, is driven off. The sorbent is thus said to be "dry" prior to introduction into a bag house and is in powder form.

Reactivity or loading capacity of a dry metal oxide sorbents may generally be related to its particle surface area, making particle surface another relevant physical property or characteristic. Particles or particulates all have weight, size, and shape; and in most cases, they are of inconsistent and irregular shape. In the case of fine powders, it is often desirable to know how much surface area a given quantity of powder exhibits, especially for particles that are chemically reactive on their particle surfaces, or are used as sorbents, thickeners or fillers. (Usually measurements of surface area properties are done to compare several powders for performance reasons.) Particles may also have microscopic pores, cracks and other features that contribute to surface area.

The BET (Brunauer-Emmett-Teller) method is a widely accepted means for measuring the surface area of powders. A powder sample is exposed to an inert test gas, such as nitrogen, at given temperature and pressures; and because the size of the gas molecules are known at those conditions, the BET method determines how much test gas covers all of the exterior surfaces, exposed pores and cracks with essentially one layer of gas molecules over all of the particles in the powder sample. Optionally, the analyst can use other test gases such as helium, argon or krypton; and can vary from 1 to 3 relative test pressures, or more, for better accuracy. From this, a measure of total surface area is calculated and usually reported in units of square meters of particle surface area per gram of powder sample ($m^2/g$). Generally, coarse and smooth powders often range in magnitude from 0.001 to 0.1 $m^2/g$ of surface area, and fine and irregular powders range from 1 to 1000 $m^2/g$. Since the interaction between a sorbent and most target pollutants typically, but not exclusively, occurs primarily at the surface of the sorbent particles, there is a correlation between surface area and removal efficiency or loading capacity. The metal oxides useful in the invention, when dry, are fine and irregular powders having a surface area ranging from about 1 to about 1000 $m^2/g$. Preferably the sorbent will have a surface area of greater than about 15 $m^2/g$, and more preferably of greater than about 20 $m^2/g$.

Thus, a particularly useful metal oxide is one that is insoluble in aqueous solution, produces a soluble and/or thermally decomposable reaction product, has an average particle size of about 0.1 micron to about 500 microns, and is in particle form having surface area ranging from about 1 to about 1000 $m^2/g$. Of the metal oxides having these characteristics those exhibiting good to high pollutant loading capacity or reactivity, which Applicants, without being bound by theory, believe is in part a function of oxidation state or potential.

With respect to oxidation state, the metal oxides initially used may have a lower oxidation state or loading capacity than the regenerated metal oxides; but through the process of regeneration the loading capacity should at a minimal be restored, so as to be at least equal to that of the originally used unreacted sorbent. Applicants have found that the regenerated oxides of manganese are in particle form and are defined by the chemical formula $MnO_X$, where X is about 1.5 to 2.0. For other metal oxides, the chemical formula will of course be different; but the goal or object of regeneration would be the same—to restore pollutant loading capacity and/or to increase the oxidation state of the regenerated metal oxide sorbent to at least equal to that of the unreacted metal oxide sorbent used to capture target pollutants.

Metal oxides whether naturally-occurring or synthetically prepared come in forms having different oxidation states and crystalline forms. For example, oxides of manganese may be found in manganese ore deposits or derived synthetically. Manganese compounds of interest occur in three different oxidation states of +2, +3, and +4; this gives rise to a range of multivalent phases, which provide oxides of manganese with a great diversity of atomic structures and thus mineral forms. Examples of these mineral forms include, but are not limited to, pyrolusite ($MnO_2$), ramsdellite ($MnO_2$), manganite (MnOOH or $Mn_2O_3.H_2O$), groutite (MnOOH), and vernadite ($MnO_2.nH_2O$) to name a few. This is reportedby Jerry E. Post in his article "Manganese Oxide Minerals: Crystal structures and economic and environmental significance," Proc. Nat'l. Acad. Sci, U.S.A., Vol. 96, pp. 3447-3454, March 1999, the disclosure of which is incorporated herein by this reference.

One of the most common of the various forms of oxides of manganese is manganese dioxide, $MnO_2$. The pyrolusite form of this mineral is often the primary mineral form in manganese deposits. Pyrolusite is composed predominantly of the compound $MnO_2$. This oxide of manganese exhibits at least two crystalline forms. One is the gamma form, which is nearly amorphous. The other is a beta form that exhibits pronounced crystalline structure. The term "oxides of manganese" as used herein is intended to refer and include the various forms of manganese oxide, their hydrated forms, and crystalline forms, as well as manganese hydroxide (e.g. $Mn(OH)_2$), etc.

With reference to the removal of $SO_X$ and/or $NO_X$, the relative capture or removal efficiencies of oxides of manganese may be understood by the below calculation(s) of loading rates. In order to assess the economics of the system and processes of the invention, it is necessary to determine the gas removal efficiencies of the sorbent. Gas capture efficiency based upon test results may be calculated by dividing weight of gas removed by weight of sorbent. This provides an approximate picture of system operations, but does not account for stoichiometry of the reactions or interference between reactive gases in a multiple-gas system. The stoichiometric gas capture ratio is described below.

For the purpose of this assessment the overall reactions believed to occur between the sorbent, oxides of manganese, and sulfur dioxide ($SO_2$) and nitric oxide (NO) are shown below, with molecular weights shown above each species.

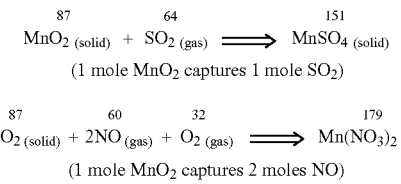

$$\overset{87}{MnO_{2\,(solid)}} + \overset{64}{SO_{2\,(gas)}} \Longrightarrow \overset{151}{MnSO_{4\,(solid)}}$$
(1 mole $MnO_2$ captures 1 mole $SO_2$)

$$\overset{87}{MnO_{2\,(solid)}} + \overset{60}{2NO_{(gas)}} + \overset{32}{O_{2\,(gas)}} \Longrightarrow \overset{179}{Mn(NO_3)_{2\,(solid)}}$$
(1 mole $MnO_2$ captures 2 moles NO)

These reactions may occur in multiple steps. Molecular weights are shown above each species. Based on these reactions, the theoretical maximum stoichiometric gas capture by weight of $MnO_2$ sorbent is the ratio of the molecular weights of the products versus the reactants which is 73% for $SO_2$ or 69% for NO, for systems containing only one reactive gas. For a system containing two reactive gases, depending on reaction characteristics, the maximum stoichiometric gas capture will be lower for both gases. If reaction speeds are assumed to be equal for both reactive gases, maximum stoichiometric gas capture for each gas should be proportional to the percentage of each gas present.

For example, during a 48-hour test, two reactive gases, $SO_2$ and NO were present at approximately 430 ppm and 300 ppm, respectively. Total weights of reactive inlet gases treated were:

$SO_2$=98.45 lb. NO=47.02 lb. total=145.47 lb.

Therefore, $SO_2$ and NO represented 67.7% and 32.3% respectively, of reactive gases present. If the theoretical maximum stoichiometric gas capture for a single-gas system is corrected to these reactive gas weight proportions, the theoretical maximum percentage capture for each gas by $MnO_2$ weight is:

$SO_2$: (0.73 single-gas)×(0.67 for the 48-hr. test)
=0.489=48.9%

NO: (0.69 single-gas)×(0.323 for the 48-hr. test)
=0.223=22.3%

Therefore, the theoretical maximum weights of gases captured by 289 lb., for example, of sorbent for the 48-hour test would be:

$SO_2$: (289 lb. Sorbent)×(0.489)=141.4 lb. $SO_2$

NO: (289 lb. Sorbent)×(0.323)=98.35 lb. NO

Actual gas capture experienced in the 48-hour test was 23.94 lb. of $SO_2$ and 4.31 lb. of NO. For the 2-gas system, stoichiometric gas capture was:

$SO_2$: (23.94 lb. captured)/(141.4 lb. $SO_2$ possible)
=16.9% (of theoretical maximum)

NO: (4.31 lb. captured)/(64.41 lb. possible)=6.69%
(of theoretical maximum)

Applicants provided the foregoing chemical equations, reactions, and formulae upon theory without intending to be bound thereby.

Target pollutant removal can be performed in the single-stage, dual-stage or multi-stage embodiments of the system of the invention. Regardless of the embodiment of the invention, the system will have at least one bag house having fabric filter bags disposed therein as a reaction zone. The bag houses of the systems of the invention may optionally be preceded by a gas-solid reaction unit selected from the group consisting of a fluidized bed, a pseudo-fluidized bed, a reaction column, a fixed bed, a pipe/duct reactor, a moving bed, a serpentine reactor, a cyclone, a multiclone, or combinations thereof. As the system of the invention may be incorporated as an "add-on" to existing pollutant removal systems, including wet scrubber removal systems, the bag house may also be preceded by a wet removal system.

In an embodiment of a dual-stage removal system according to the invention, the system has a first and a second bag house. In another embodiment, the dual stage removal system may have first, second and third bag houses connected in a Y-shaped configuration as later described herein below. In an embodiment of a multi-stage removal system of the invention, there are at least three interconnected bag houses configured as a modular reaction unit as later described herein below In the various embodiments of the system of the invention, the bag houses may be of a conventional design, or may be an inverted bag house, bag house reactor, a fluidized bed-bag house reactor.

The bag houses of the systems and some of the gas-solid reaction unit preceding them serve as both reaction zones and as solid-gas separators rendering the gas free of solids and particulates, such as sorbent, whether reacted or unreacted, fly ash, and particulate mercury compounds, so as to allow the gas that is substantially stripped of target pollutants to be vented from a bag house or gas-solid reaction unit and to be routed on to another reaction zone or up a stack to be vented into the atmosphere free of any solids or particulates. The solids and particulates are retained within solid-gas separators and may be subsequently removed for further processing or regeneration.

The operational parameters of the systems of the invention are monitored and controlled by electronic controllers, control subsystems or control sub-elements as later described herein below.

The systems of the invention can be understood with reference to the figures. Turning to FIG. 1, a system according to the invention is illustrated in block diagram form. The system 10 may be seen as comprised of a feeder 20 and a first reaction zone 30 and a second reaction zone 38. The feeder 20 would contain a supply of sorbent of regenerable metal oxides, here oxides of manganese and/or regenerated oxides of manganese. The feeder 20 is configured to handle and feed the metal oxide sorbent, oxides of manganese, which, upon regeneration, are in particle form and defined by the chemical formula $MnO_X$ where X is about 1.5 to 2.0.

The feeder may be a dry sorbent feeder, a sorbent slurry feeder, a sorbent filter cake feeder, or a feeder system. A sorbent filter cake feeder is a feeder capable of feeding a sorbent filter cake such as may be formed during regeneration by separating rinsed or precipitated sorbent from a slurry. A feeder system is a feeder incorporating a combination of at least two of the following feeder components, a dry sorbent feeder component, a slurry feeder component, and a sorbent filter cake feeder. The components of the feeder system may be separately connected to the reaction zones of the system 10 of the invention or, optionally, to a gas-solids reaction unit up stream of the reaction zone, such as section of pipe/duct preceding the reaction zones, Further, the components of the feeder system may share a common connection to the reaction zones of the system. Sorbent feed rates may be electronically controlled.

The first reaction zone 30 is configured for introduction of the sorbent and a gas containing at least one target pollutant. For purposes of illustration, the gas contains two target pollutants, $SO_X$ and $NO_X$. In one embodiment, the first reaction zone 30 may be a section of pipe/duct, possibly configured as a fluidized bed, a pseudo-fluidized bed, a reaction column, a fixed bed, a pipe/duct reactor, a moving bed, a bag house, an inverted bag house, bag house reactor, serpentine reactor, a cyclone/multiclone, a fluidized bed-bag house reactor, and combinations thereof. The second reaction zone 38 a fluidized bed, a pseudo-fluidized bed, a reaction column, a fixed bed, a pipe/duct reactor, a moving bed, a bag house, an inverted bag house, bag house reactor, serpentine reactor, a cyclone/multiclone, a fluidized bed-bag house reactor, and combinations thereof. Preferably, the second reaction zone is a bag house, such as commercially available bag house, an inverted bag house according to the invention, or a bag house reactor according to the invention. The system depicted in FIG. 1 may alternatively be viewed as having reaction zone 30 that is a gas-solids reaction unit 30 upstream from second reaction zone 38, a bag house.

The gas containing $SO_X$ and $NO_X$, or other pollutants, comes from a gas source 15 external to the system. The gas is introduced into the first reaction zone 30 and is contacted with sorbent introduced into the first reaction zone 30 from the feeder 20 and is contacted with the sorbent for a time sufficient to primarily effect $SO_X$ capture at a targeted $SO_X$ capture rate. For purpose of discussion, and not wishing to be held to a strict interpretation, with respect to effecting a certain capture, it has been observed that oxides of manganese can more readily capture $SO_2$ in a gas stream absent of $NO_X$, and also can more readily capture $NO_X$ in a gas stream absent of $SO_2$, than when the gas stream contains both $SO_2$ and $NO_X$. $SO_X$ capture tends to proceed at a much faster rate than $NO_X$ capture when the two pollutants are present in a gas stream. This observation may be utilized in a dual-stage removal system with $SO_X$ being captured in a first bag house and $NO_X$ being captured in the second bag house.

The gas and sorbent may be introduced separately or commingled before introduction into a reaction zone. Once the gas and sorbent have been contacted for sufficient time, the $SO_X$ is captured by reacting with the sorbent to form sulfates of manganese to substantially strip the gas of $SO_X$. The gas substantially stripped of $SO_X$ passes from the first reaction zone 30 into the second reaction zone 38. The second reaction zone 38 is configured for introduction of sorbent and the gas substantially stripped of $SO_X$. In the second reaction zone 38, the gas is further contacted with sorbent for a time sufficient to primarily effect $NO_X$ capture at a targeted $NO_X$ capture rate. The $NO_X$ is captured by reacting with the sorbent to form nitrates of manganese to substantially strip the gas of $NO_X$. The second reaction zone 38 is further configured so that the gas which has been substantially stripped of both $SO_X$ and $NO_X$ is rendered free of reacted sorbent. The gas may then be vented from the second reaction zone 38 to a stack 40 where the gas is released to the atmosphere.

It should be understood that other suitable metal oxides may similarly be used for dual-stage or multi-stage removal with formation of metal nitrates and sulfates or other corresponding reaction products.

Differential pressure across the system is regulated by an electronic controller or a control sub-element (not shown in FIG. 1) so that any differential pressure across the system is no greater than a pre-determined level and target pollutants are removed at targeted pollutant capture rates. As is later described, the control sub-element may control other system parameters such as feeder rate, $SO_X$ and/or $NO_X$ (target pollutant) capture rates, and the inlet gas temperature into the reaction zones. Thus, the system of the invention is highly adaptable and, in another embodiment, is generally comprised of a feeder 20, a first reaction zone 30, a second reaction zone 38, and at least one electronic controller or control sub-element for regulating process parameters.

Figure 2:
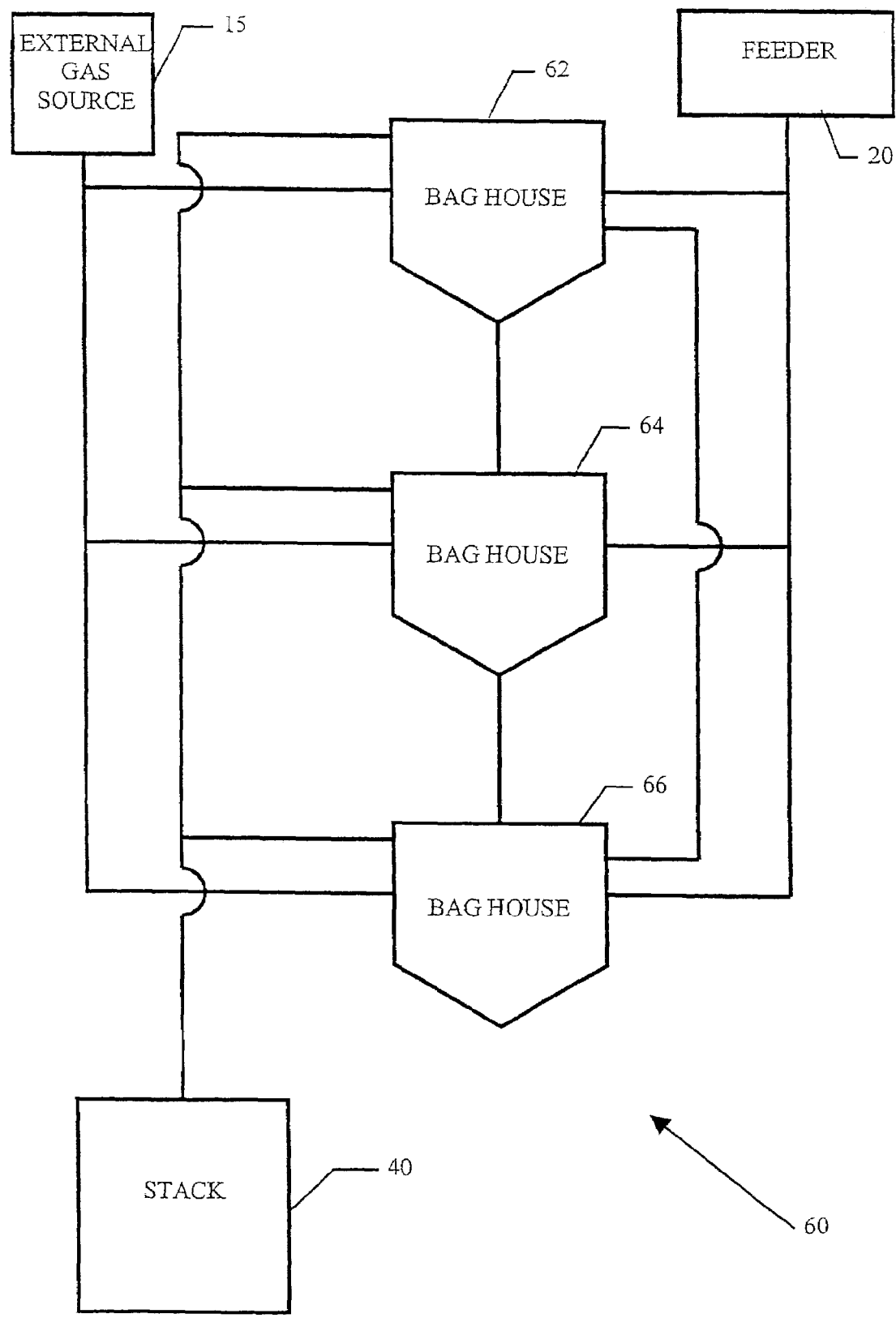
FIG. 2 is a schematic block diagram showing a system according to the invention.

In another embodiment of the invention, the system is comprised of a feeder 20 as previously described and a modular reaction unit 60 comprised of at least three interconnected reaction zones. With reference to FIG. 2, where the reaction zones are three interconnected bag houses 62, 64, 66, the modular reaction unit may be understood. The bag houses 62, 64, 66 are connected so that a gas containing target pollutants, such as $SO_X$ and/or $NO_X$, can be routed through any one of the bag houses, any of the two bag houses in series, or all of the at least three bag houses in series or in parallel or any combination of series or parallel. Each bag house is separately connected to the feeder 20 and to the external gas source 15. Through these connections, sorbent and gas can be introduced into each bag house operating as separate single-stage removal systems where both $SO_X$ and/or $NO_X$ capture can occur when the gas is contacted with sorbent for a time sufficient to allow formation of sulfates of manganese, nitrates of manganese, or both. The system in this embodiment may also include control sub-elements 50 (not shown) for regulating various process parameters. The reaction zones of the modular unit 60 are not limited to bag houses and may be any combination of reaction zones useful in the inventory. If the bag houses are operated independently of each other, then the section of pipe or duct (pipe/duct) preceding the bag house and that which is connected to an inlet of each bag house conveys gas into each bag house and is also configured as a first reaction zone (or gas-solids reaction unit) 30, a pipe/duct reactor, into which gas containing $SO_X$ and $NO_X$ flows along with the sorbent. The gas is mixed with the sorbent in the pipe/duct reactor where target pollutant capture commences and is completed in the bag house, second reaction zone 38 at targeted pollutant capture rates. In this mode, the system operates as illustrated in FIG. 1 with each bag house 62, 64, 66 being a second reaction zone 38 into which the gas that has been initially contacted and partially reacted with the sorbent passes from the first reaction zone 30, pipe/duct reactor. If the first reaction zone is not a gas-solids separator, the entrained sorbent is carried to the second reaction zone 38 by the gas.

Figure 3:
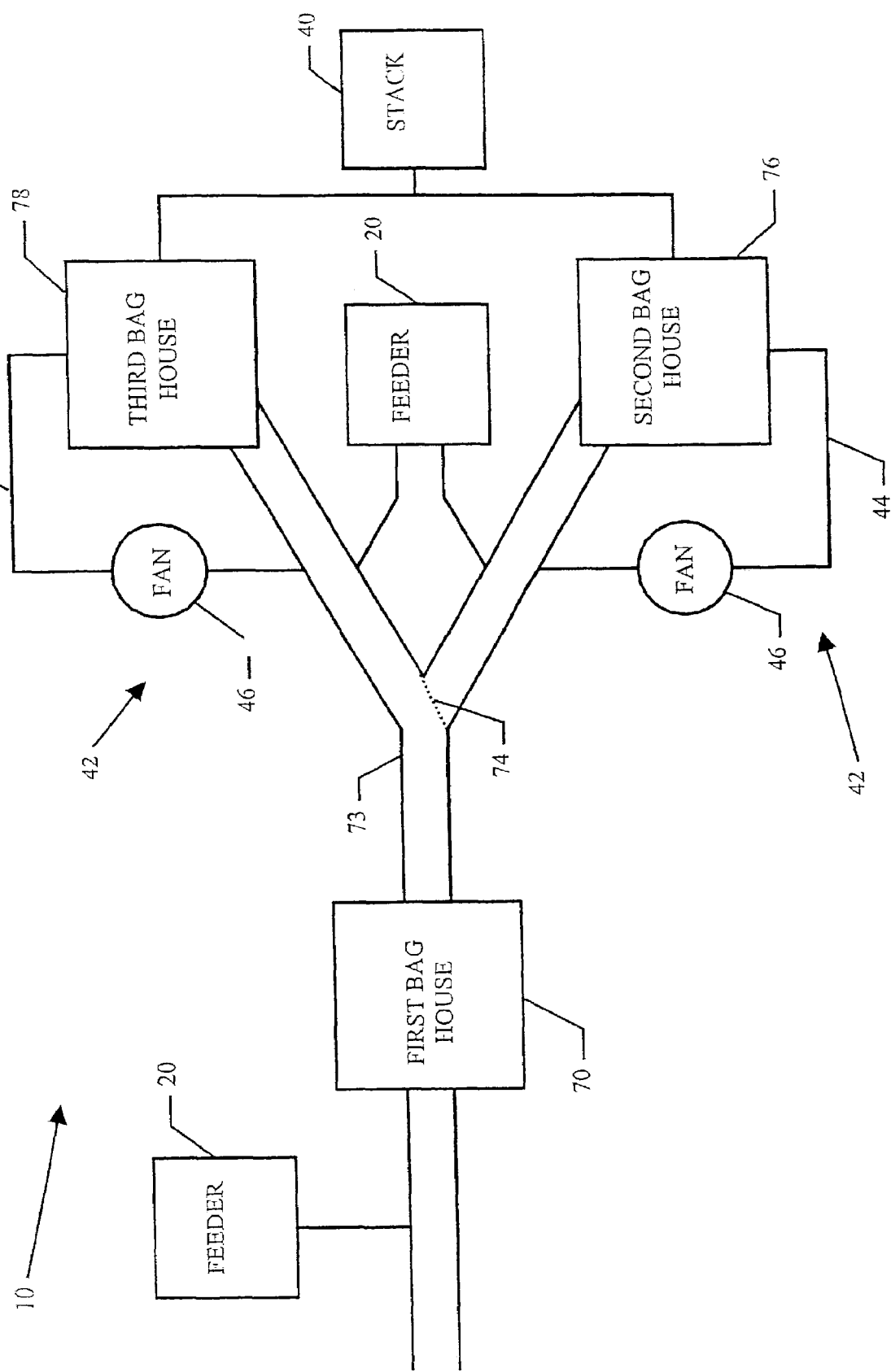
FIG. 3 is a schematic block diagram showing a system according to the invention.

With reference to FIG. 3, another embodiment of the invention is shown. In this embodiment, the system 10 is comprised of a feeder 20, and three bag houses 70, 76, and 78, a common conduit 73 and a diverter valve 74. Gas and sorbent are introduced into the first bag house 70 which serves as a first reaction zone of a dual-staged $SO_X/NO_X$ removal system where primarily $SO_X$ capture occurs. The gas substantially stripped of $SO_X$ then passes from the first bag house 70 into the common conduit 73. As shown in FIG. 3, the common conduit 73 is Y-shaped, but may be of any shape that allows gas to flow from the first bag house 72 and to be directed to the second and third bag houses 76, 78 which each function as the second reaction zone of a two-staged $SO_X/NO_X$ removal system. This is an example of the Y-shaped, dual-stage configuration previously mentioned above.

In the Y-shaped common conduit 73 can be seen a diverter valve 74 illustrated as a dotted line at the fork of the "Y". The diverter valve 74 is positioned in the common conduit 73 so as to direct the flow of gas from the first bag house 70 to the second bag house 76 and/or the third bag house 78. The diverter valve 74 has variable positions, in the first position gas from the first bag house 70 is directed to the second bag house 76, in the second (variable) position gas from the first bag house 70 is directed to both the second and third bag houses 76, 78, and in the third position, as illustrated in FIG. 3, the gas from the first bag house 70 is directed to the third bag house 78. Gas exiting the second and third bag houses 76 and 78 may be vented and directed for further processing or handling (e.g. directed to stack 40 or directed to a subsequent reactor for Hg removal). The system of this embodiment may incorporate any combination of the reaction zones useful in the invention and is not intended to be limited to bag houses.

However, when the reaction zones are bag houses, the system illustrated in FIG. 3 may further comprise an off-line loading circuit 42. The off-line loading circuit 42 is brought into use after the filter bags have been pulsed to clean them of filter cake so reacted sorbent can be removed for recycling or regeneration. There may be more than one off-line loading circuit 42, as shown in FIG. 3, each separately connected to a bag house 76 and 78. The off-line loading circuit is connected to a sorbent feeder and a bag house via an off-line loading circuit conduit 44 and incorporates a fan 46 for blowing air commingled with sorbent into the bag houses 76 and 78 in order to pre-load the fabric filter bags in the bag houses by building a filter cake thereon. The air passing through the bags and cake thereon is vented from the bag house. When the bag house is ready to come back on line, the off-line loading circuit can be closed or switched off and the diverter valve 74 moved to a position to permit the flow of process gas through the bag house that is being brought back on line.

When $NO_X$ is captured by the sorbent, the sorbent may not be completely loaded or spent thus having remaining reactive sites or under-utilized loading capacity. Even though it may no longer be effective as an efficient sorbent for $NO_X$ at this point, the sorbent may have reactive sites that could be utilized efficiently for $SO_X$ capture. Thus, the partially loaded reacted sorbent or $NO_X$-reacted sorbent in a second reaction zone of a two-stage $SO_X/NO_X$ removal system could be removed from the second reaction zone and fed into the first reaction zone to allow additional $SO_X$ capture with, or loading onto, the sorbent. This would decrease the frequency at which sorbent regeneration is needed and reduce the amount of virgin or unreacted sorbent that would need to be introduced into the first reaction zone.

Figure 4:
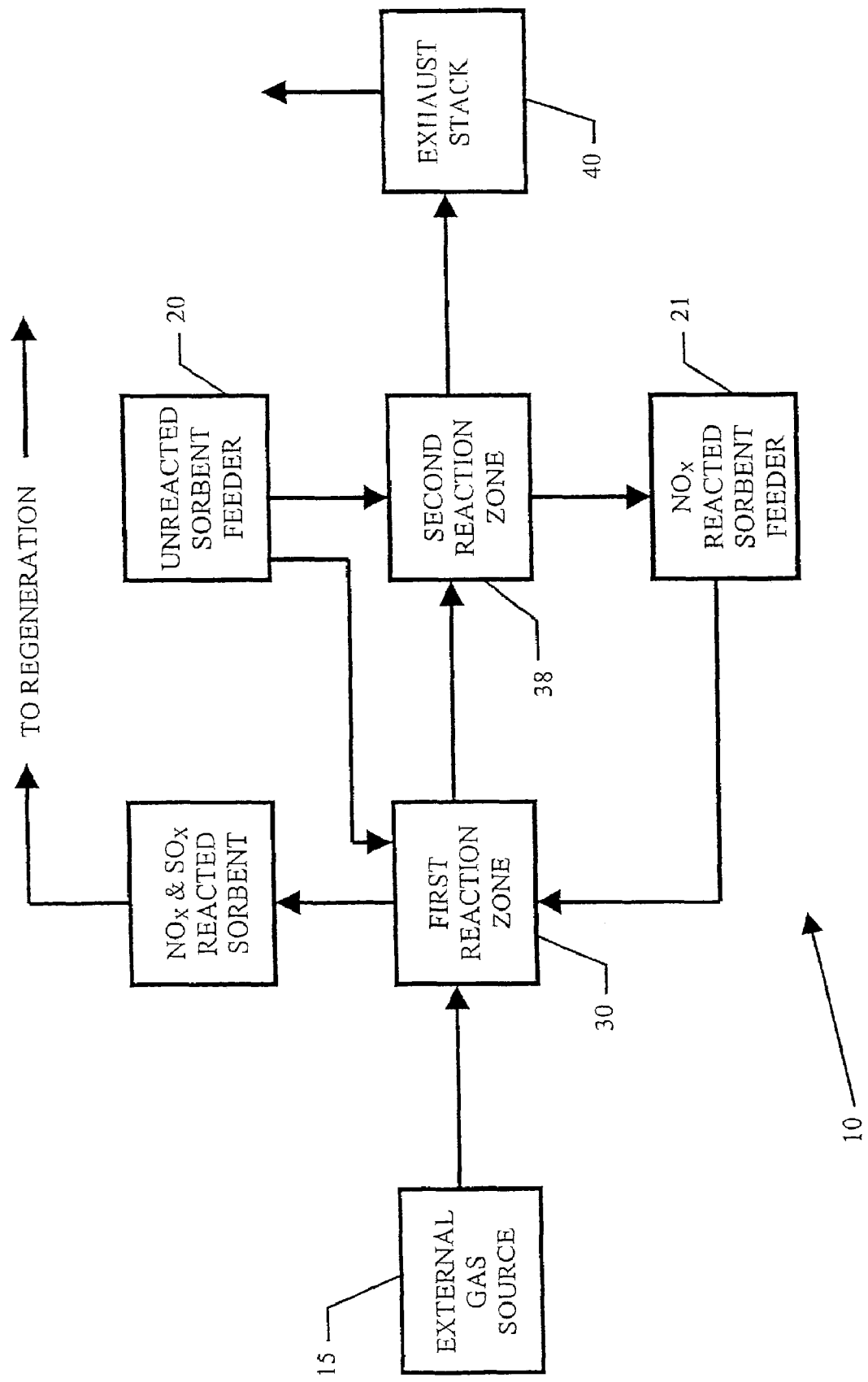
FIG. 4 is a block diagram showing a system according to the invention.

With reference to FIG. 4 a system according to the invention utilizing counter-flow feed of $NO_X$-reacted sorbent is illustrated in a block flow diagram. The system 10 is comprised of a first reaction zone 30, a second reaction zone 38, a feeder 20 containing virgin or unreacted sorbent, and a $NO_X$-reacted sorbent feeder 21. The first reaction zone 30 of system 10 is connected to external gas source 15 and gas flows from the external gas source 15 to the first reaction zone 30, from the first reaction zone 30 to the second reaction zone 38, and from the second reaction zone 38 is either vented to stack 40 or directed on to another system unit such as a mercury-sorbent reactor (not shown). The feeder 20 can feed virgin or unreacted sorbent into the first reaction zone 30 and the second reaction zone 38. $NO_X$-reacted sorbent is removed from the second reaction zone and is conveyed from the second reaction zone to the first reaction zone via $NO_X$-reacted sorbent feeder 21 where the $NO_X$-reacted sorbent with available reaction sites is further contacted with a gas containing both $SO_X$ and $NO_X$ to remove and capture $SO_X$.

Using reacted sorbent feeders allows sorbent to be recycled to a reaction zone where unreacted sites on the surface of the sorbent can be utilized. Through the mechanical operations of removing reacted sorbent from a reaction zone and returning it to the same or another reaction zone, the amount of virgin or unreacted sorbent that has to be introduced into the system is reduced. A sorbent may be recycled this way several times before regeneration is necessary due to inadequate loading capacity or to the reduction in available reaction sites on the surface of sorbent particles. This represents significant cost savings and more economical and complete use of metal oxide sorbents.

During operation, the surfaces of sorbent particles may become obstructed, for example, by compaction or agglomeration. This physical manipulation and handling of the reacted sorbent with reacted sorbent feeders may re-orient the particles making unexposed surfaces available to capture target pollutants.

Figure 28:
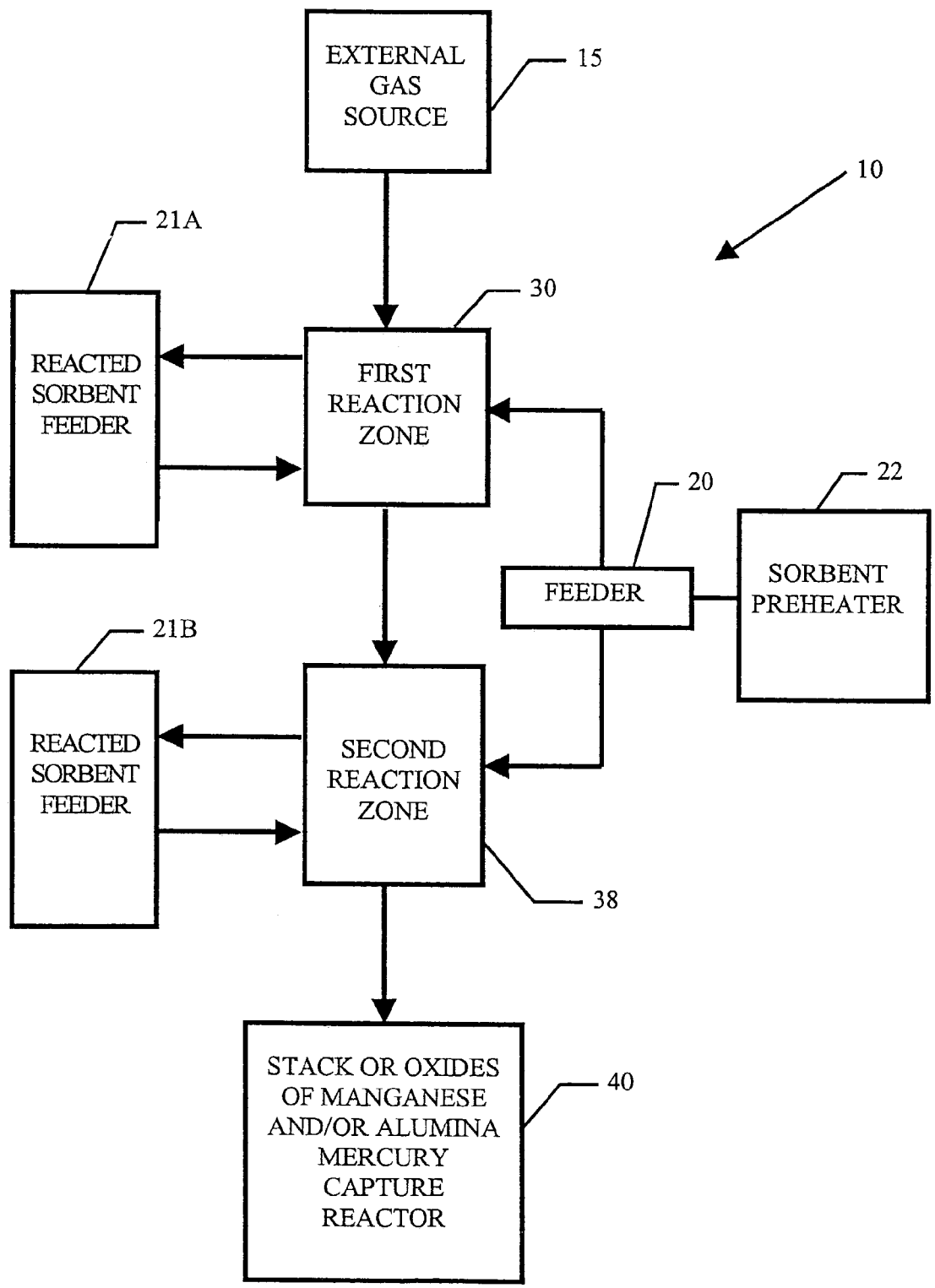
FIG. 28 is a block diagram of system according to the invention.

The recycling of reacted sorbent in this way may proceed as shown in FIG. 4 in a counter-flow manner as discussed above. Recycling may also proceed by removing reacted sorbent from a reaction zone conveying it to a reacted sorbent feeder and introducing or re-introducing the reacted sorbent into the same reaction zone. This is shown in FIG. 28, where reacted sorbent feeder 21A receives reacted sorbent conveyed from the first reaction zone 30 and reacted sorbent from reacted sorbent feeder 21A is re-introduced into the first reaction zone 30. Further, reacted sorbent from second reaction zone 38 is conveyed to reacted sorbent feeder 21B and re-introduced into the second reaction zone 38. This may be desirable where a first targeted pollutant is being captured in the first reaction zone and a second targeted pollutant is being captured in the second reaction zone. If, for example, $SO_X$ is being captured in the first reaction zone 30, the $SO_X$ reacted sorbent when it is spent or ceases to be effective for $SO_X$ removal, can then be routed for regeneration and recovery of sulfates as alkali or ammonium sulfate, useful commercial product. Similarly, if $NO_X$ is the pollutant being captured in the second reaction zone 38, the $NO_X$ reacted sorbent can be removed when it ceases to be effective for $NO_X$ removal and directed for regeneration and recovery to produce alkali or ammonium nitrates, again, useful commercial by-products or directed to the first reaction zone and used to capture the first target pollutant, $SO_X$.

Figure 5:
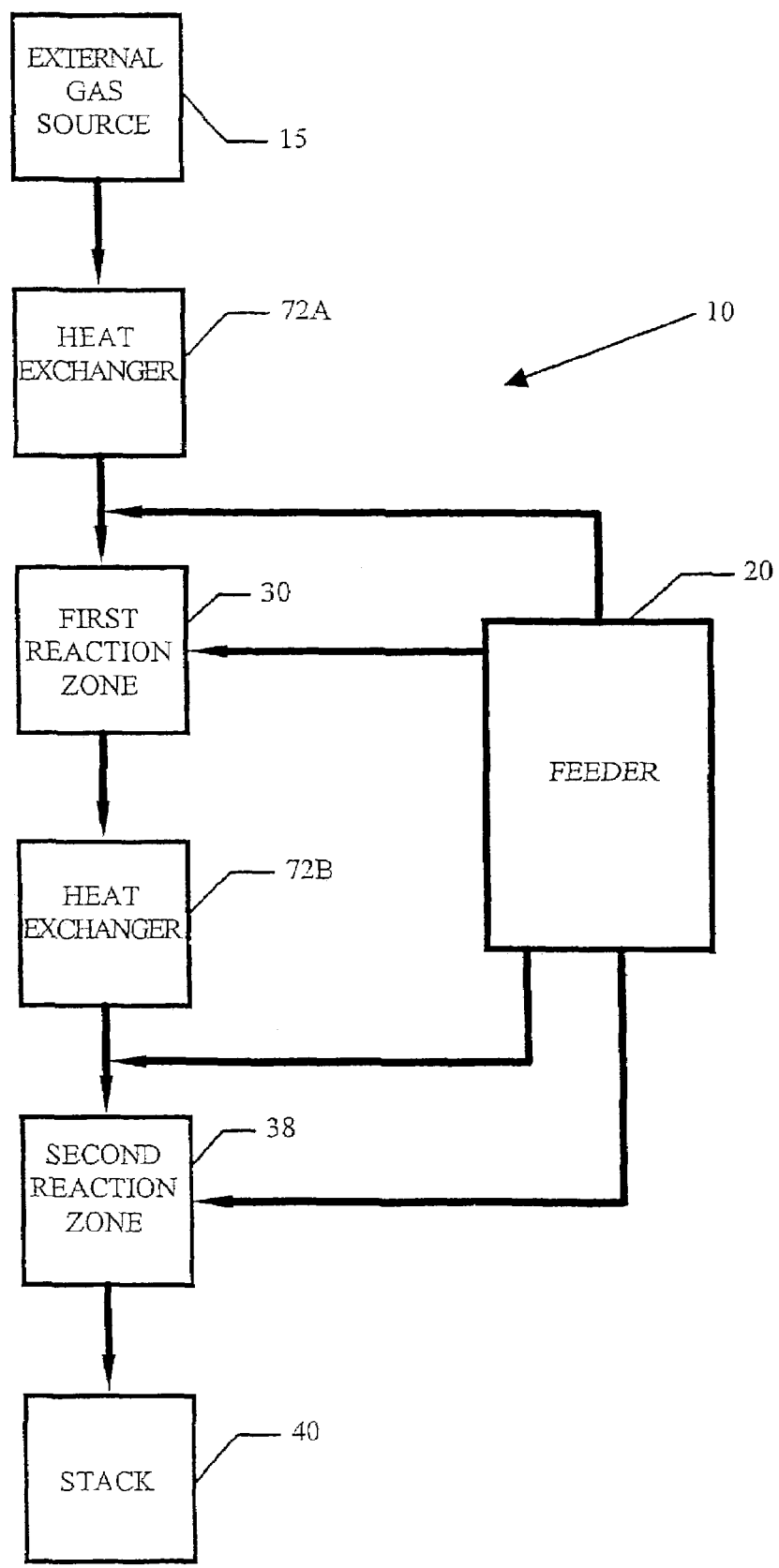
FIG. 5 is a block diagram showing a system according to the invention.

Capture rates may be affected by the gas inlet temperature as it enters a reaction zone and may need to be adjusted, cooled or heated, to achieve a desired capture rate for $SO_X$ and/or $NO_X$. This can be accomplished with a heat exchanger. As is illustrated in FIG. 5, the system may further include a heat exchanger preceding each reaction zone of a system of the invention. In FIG. 5, the system of the invention as illustrated is substantially the same as the illustration of FIG. 1, depicting first and second reaction zones 30 and 38, feeder 20, external gas source 15, and stack 40. In FIG. 5, heat exchangers 72A, 72B have been introduced into the system before each reaction zone. The heat exchangers 72A, 72B may be utilized to heat or cool the gas stream prior to entry into each reaction zone. As the gas enters into the system, if the gas temperature is above the thermal decomposition temperatures of either metal sulfates or nitrates or other first and second reaction products, the heat exchangers 72A, 72B will operate to cool the gas to a desired temperature based upon whether which target pollutant, e.g., $SO_X$ or $NO_X$, is the primary pollutant captured in the reaction zone. Similarly, if the gas were below a desired temperature set point, the heat exchangers 72A, 72B will operate to heat the gas to the desired temperature. The heat exchangers 72A, 72B may be a gas-to-gas cooler or a heater unit, or other suitable means for accomplishing heating and cooling of gases to assure that the gas inlet temperature at a targeted temperature or within an acceptable range.

As previously mentioned above, the gases entering the system from external gas source 15 may be any of a variety of process or industrial gases. These gases when generated encompass a range of temperatures. Due to simple economics and the design of various plants and facilities for efficient use of waste heat which is captured or transferred to provide heat for various processes at a facility, these process gases will typically have a temperature ranging from 250° F. to 350° F. or 120° C. to 180° C. In less typical situations, these gases may have temperatures upwards of 1000° F., or 540° C. Gases at these temperatures are readily processed in the systems of the invention and the heat exchangers 72A, 72B can be utilized to maintain the gas within these temperature ranges if desired. The system can also process gases at much higher temperatures such as 1000° F. By way of illustration, for purposes of $SO_X$ and $NO_X$ capture, the gas temperature should not exceed, respectively, the thermal decomposition temperatures of metal sulfates and nitrates when the first and second target pollutants are $SO_X$ and $NO_X$. Given that species of these sulfates and nitrates may be formed, the thermal decomposition temperature would depend upon the species formed during capture. With respect to pollutant removal using oxides of manganese as the metal oxide sorbent, it has been reported that sulfates of manganese may thermally decompose at temperatures approximating 950° C. Similarly, nitrates of manganese are believed to thermally decompose at temperatures ranging up to 260° C. The system of the invention can process gases approaching these thermal decomposition temperatures. But, more typically, the system in practice will be operated in temperature ranges from ambient to temperatures approximating those of process gases from industrial sources.

Heat or waste heat from the process gases of a facility may be utilized in the regeneration and recovery processes discussed herein below. Further, the waste heat may be utilized for purposes of sorbent preheating which may serve to "activate" sorbent prior to introduction into a reaction zone. Although the exact mechanism of activation is not known, it is generally known that oxides of manganese can be "activated" with heat. Thus, as can be seen in FIG. 28, a system according to the invention may further include a sorbent preheater 22 which may actually be part of or separate from sorbent feeder 20. The source of heat for the sorbent preheater may be any heat source, but waste heat from facility processes can be economically efficiently utilized for this purpose.

Figure 14:
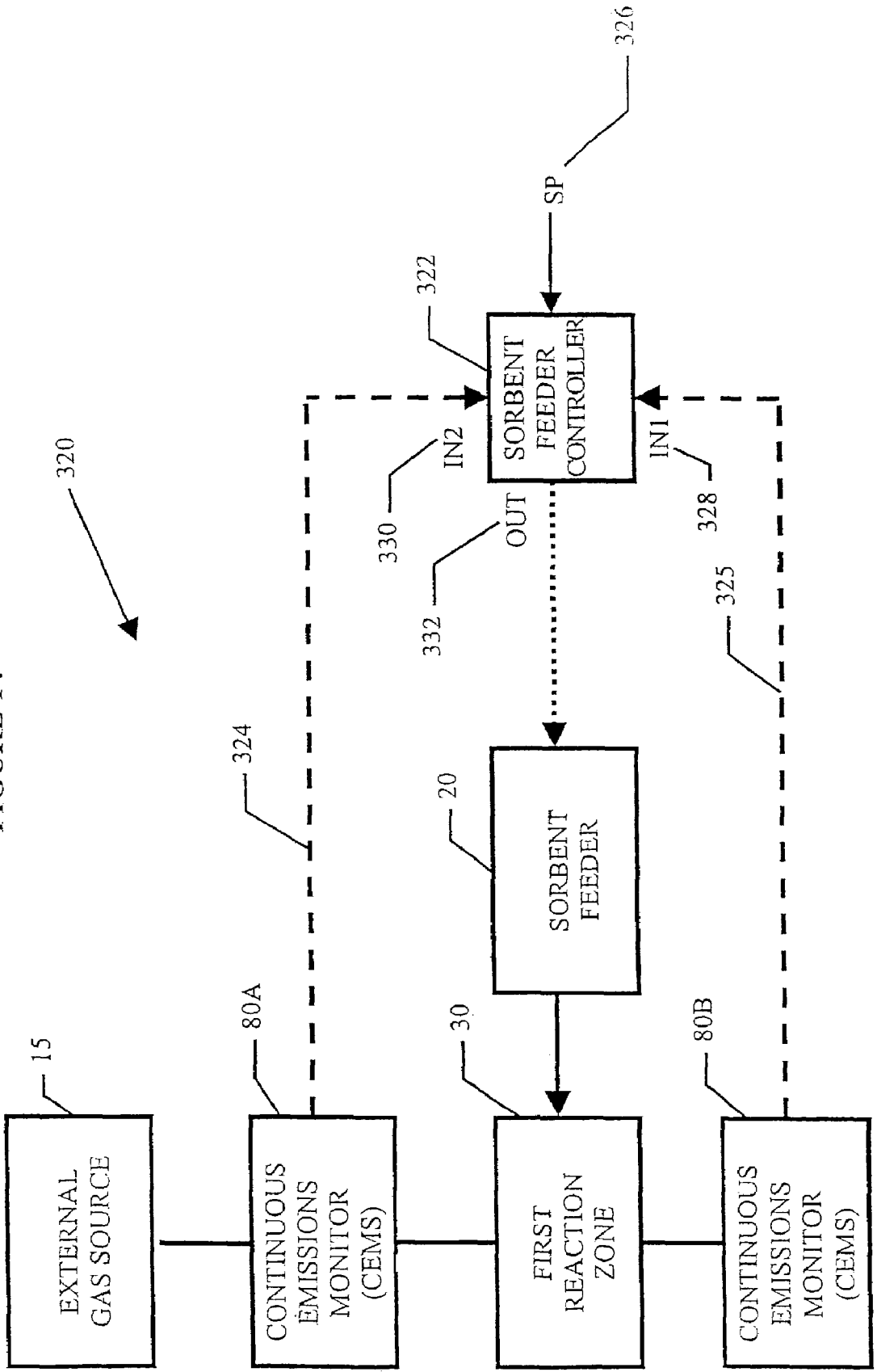
FIG. 14 is a block diagram of a system according to the invention.

Target pollutant capture rates may be regulated by the amount of sorbent fed into the reaction zones. In order to regulate capture rate, gas measuring devices, such as continuous emission monitors (CEMS), are utilized to measure the composition of the gas at the inlet to the reaction zone and at the outlet of the reaction zone. With reference to FIG. 14, the gas flows from the external gas source 15 and past CEMS 80A where the gas composition is measured prior to entry into first reaction zone 30. Another CEMS 80B is provided after the first reaction zone 30 to measure the concentration of the gas substantially stripped of at least a first target pollutant as it passes from the first reaction zone 30. As in FIG. 1, the gas may be vented to a stack 40, passed to a second reaction zone 38, or another system unit for further processing.

In the system of the invention, a bag house serves as both a reaction zone and as a solid gas separator, since bag houses are solid-gas separators. A conventional, commercially available bag house 82 is depicted in FIGS. 6 through 9. FIG. 6 is a perspective view of a bag house 82. FIG. 7 is an end elevation view showing a bag house 82. FIG. 8 is a top plan view of a bag house 82. FIG. 9 is a side elevation view of a bag house 82. Within the bag house 82 are a plurality of bags 88 also referred to as filter fabric bags shown in FIGS. 7 through 9. As can be seen in FIGS. 7 through 9, the bag house 82 has a plurality of filter fabric bags 88 suspended therein. Typically, they are suspended from a frame or support structure at the top of the bag house 82. The filter bags 88 may be of various shapes, e.g., conical or pyramidal, and include an internal frame and suitable fabric filter. Those skilled in the art would be able to select suitable filter fabric materials from those commercially available. Gas and entrained sorbent enters the bag house 82 through the bag house inlet 92, shown in FIGS. 7 through 9, and by virtue of an applied differential pressure, gases are forced through the fabric of the bags 88 and the entrained sorbents are separated from the gas by forming a filter cake on the surface of the bags 88. The filter cake thus formed is a reaction medium where pollutants are contacted with and removed by the sorbent. The commingled gases and sorbents move vertically upward and contact the fabric and/or the filter cake formed thereon. The bags 88 are configured to permit the gases to be directed from the outside to the inside of the bags to a conduit at the top of the bag house 82 and then to the bag house outlet 98, shown in FIGS. 6 through 9.

While the bag house 82 is in operation, the filter bags 88 may be periodically pulsed or otherwise agitated in order to adjust differential pressure across the bag house 82, which frees some or all of the filter cake and allows gas to flow more freely through the filter cake and the fabric filter bags. If the filter cake is allowed to get too thick, excess differential differential pressure across the bag house or the system of the invention may result. Thus, the pulse intensity or frequency can be utilized to regulate or adjust differential pressure. When the bag house 82 is taken off line, the bags 88 may be pulsed to free the bags 88 of virtually all reacted sorbent not otherwise removed during normal operations. The reacted sorbent or filter cake fall from the bags 88 by gravity into a hopper 112 (seen in FIGS. 7 and 9) at the bottom of the bag house 82 for subsequent removal from the bag house hopper 112. Removal from the hopper 112 may be accomplished with a screw conveyor or by other appropriate means, even manually.

A thicker filter cake will lead to increased removal efficiency, but at the price of extra power required to force the external gas source through the reaction zone. In one example, more power is required for an induction fan to pull exhaust gases through the bag house when the filter cake thickness is greater. The differential pressure may thus be maintained at an optimal level, trading off increased power requirements against the increased pollutant removal. In addition, the thicker the filter cake the longer the residence time of the sorbent material in the system. Longer residence time of the gas in the filter cake results in better removal efficiencies. Higher sorbent loading rates results in less material that will have to be regenerated. This may also be taken into consideration in setting the differential pressure set point.

In FIGS. 7 and 9, the plurality of filter bags is shown in position within the bag house. Also shown near the top of the bag house 82 is a pulse valve 124 utilized to pulse the fabric bags 88 in order to reduce filter cake thickness or to free the filter cake from the bags 88. The bag house may be provided with a number of pulse valves 124. During operation, these pulse valves 124 may be activated sequentially or randomly in order to pulse the bags 88 in order to regulate and control differential pressure across the bag house 82 or the system as a whole. When the bag house is taken off-line, the bags may be pulsed to free the bags of virtually all filter cake so that reacted and unreacted sorbent may be removed.

Figure 10:
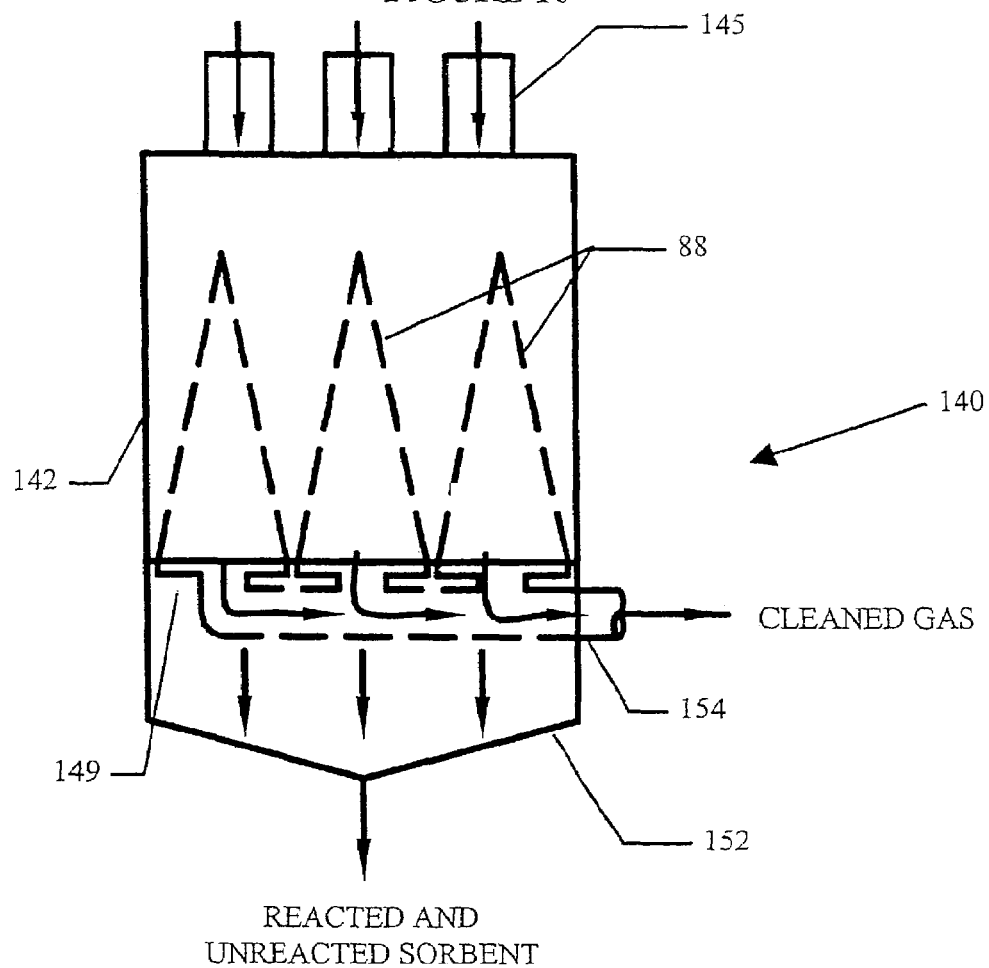
FIG. 10 is a sectional view of an inverted bag house according to the invention.
Figure 11:
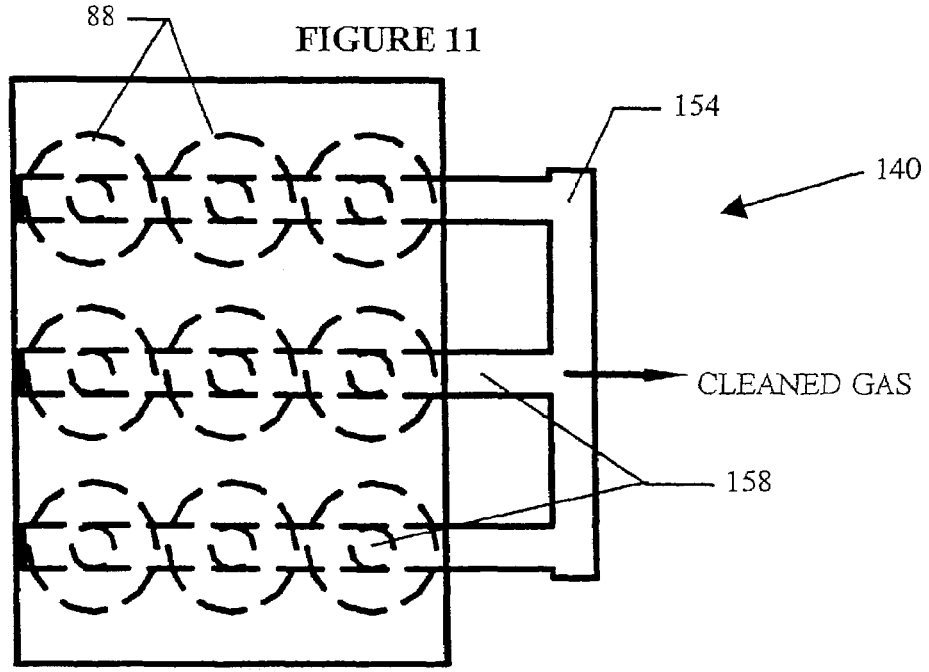
FIG. 11 is a top plan view of an inverted bag house according to the invention.

The bag house illustrated in FIGS. 6 through 9 is of a conventional design. In FIGS. 10 and 11, a novel bag house according to the invention is illustrated. This bag house, which can be utilized in the system of the invention, is referred to as an inverted bag house 140. The inverted bag house 140 eliminates the need for high can velocities, and permits downward, vertical flow of gases and reacted and unreacted sorbent. The inverted bag house 140 is comprised of a bag house housing 142, at least one inlet 145, a plurality of fabric filter bags 88, a support structure 149 for the filter bags, a hopper 152 to receive and collect reacted and unreacted sorbent, an outlet 154, and a conduit 158. The bag house housing permits the introduction of gases and reacted and unreacted sorbent entrained in the gases, has a top and a bottom and is configured for gases to flow vertically downward from the top to the bottom of the bag house. The inlet 145 is located near the top of the bag house housing and is configured for the introduction of gases and reacted and unreacted sorbent entrained in the gases into the bag house. The plurality of fabric filter bags 88 are configured to allow gas to flow from the outside of the bags 88 to the inside of the bags 88 under an applied differential pressure and to prevent the passage of reacted and unreacted sorbent from the outside to the inside of the bags 88, thereby separating reacted and unreacted sorbent from the gas and forming a filter cake on the bags 88. The support structure 149 is configured to receive and support the fabric filter bags 88 and to provide openings through which reacted and unreacted sorbent may be freely passed downward into the hopper 152 by gravity. The hopper 152 is configured to receive the reacted and unreacted sorbent and to permit the removal of the reacted and unreacted sorbent. The inverted bag house 140 also has an outlet 154 located near the bottom of the housing 142 below the bags 88 and above the hopper 152. The outlet 154 is connected to a conduit 158 located below the fabric filter bags 88 and positioned to receive gas passing through the fabric filter bags. Conduit 158 conveys gas to the outlet so that the gas may be vented or passed from the inverted bag house 140.

Figure 12:
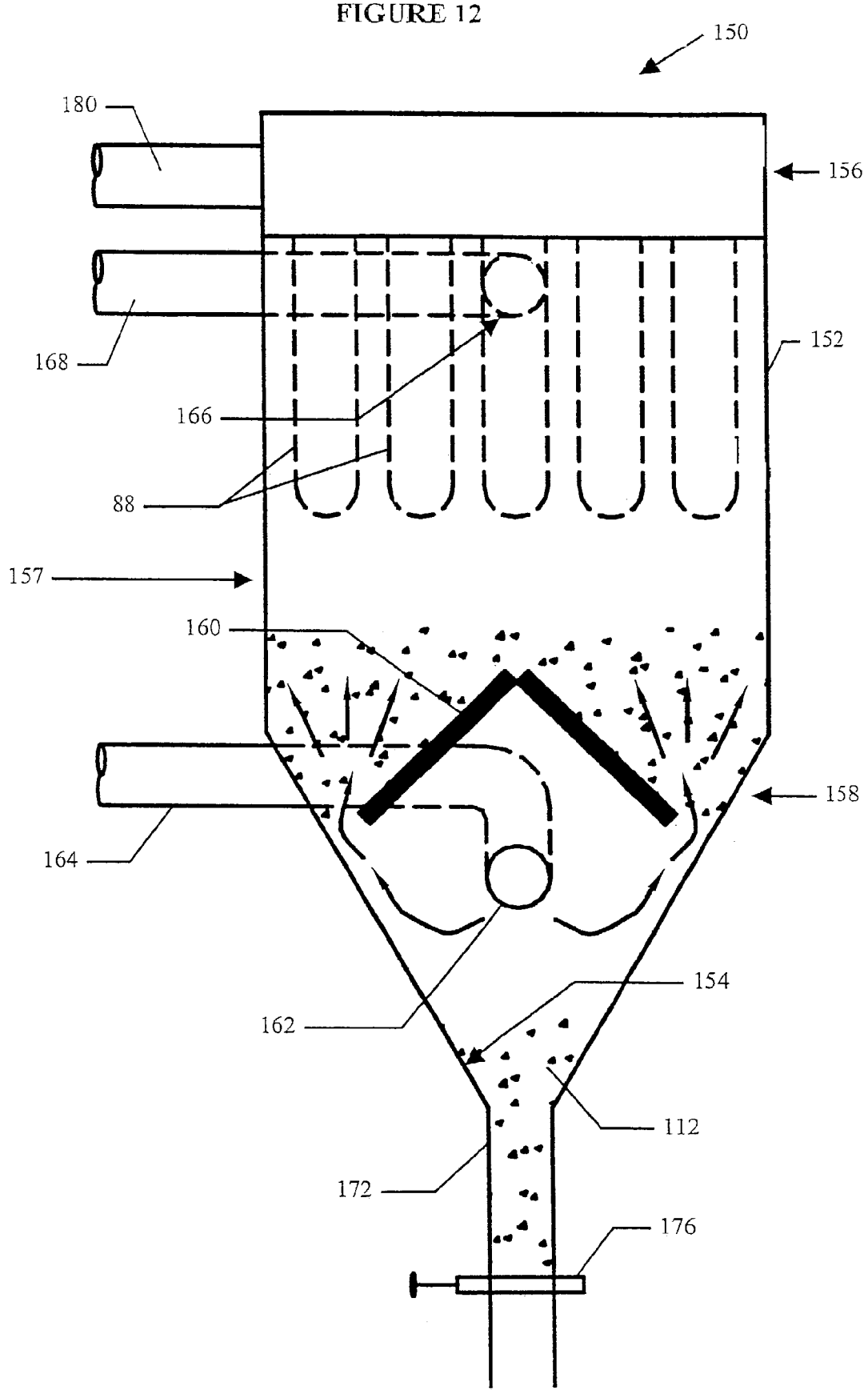
FIG. 12 is a flow diagram of a bag house reactor according to the invention.

In FIG. 12, a bag house reactor 150 of the invention is illustrated. This bag house reactor 150 can also be utilized in the system in place of a conventional bag house. The bag house reactor 150 has interior surface 154 and exterior surface 152. It may be viewed as having an upper section 156, central section 157 and lower section 158. Generally located in the central and/or lower sections 157, 158 is a variable venturi 160. The purpose of the variable venturi 160 is to adjust the velocity of gas flowing through the venturi opening within the bag house reactor 150. The variable venturi 160 is configured to adjust the position of the variable venturi by varying the space or distance between the variable venturi 160 and the interior surface 154 of the bag house reactor 150. In order to vary position a variable venturi position detector 367 shown in FIG. 23) for determining the position of the variable venturi 160 and a variable venturi positioner 368 (shown in FIG. 23) for adjusting the position of the variable venturi 160 are provided.

With the variable venturi 160 contacting the interior surface 154 of the bag house reactor 150, gas cannot flow from the lower section 158 to the central and upper sections 156, 157 of the bag house. By opening the space between the variable venturi 160 and the interior surface 154, gas is allowed to flow through the reactor 150. Gas introduced through gas distribution conduit 164 and the gas distribution port 162 flows from the lower section 158 to above the variable venturi 160 and into the central and upper sections 156, 157, and to the filter bags 88. When the space between the variable venturi 160 and the interior surface 154 is wide, the gas flows at lower velocities which allows some of the sorbent suspended above the variable venturi 160 to fall into the hopper 112.

There is also a sorbent distribution port 166 connected to a sorbent feed conduit 168. The sorbent distribution port 166 is positioned above the variable venturi 160 to allow the introduction of sorbent into the upper section 156 of the bag house reactor 150. The sorbent distribution port 166 is configured to allow introduction of sorbent into the bag house. Port 162 is configured to allow introduction of gas into the bag house reactor.

The bag house reactor 150 has a plurality of fabric filter bags 88 secured therein. The fabric filter bags are mounted in the upper section 156 of the bag house reactor 150 and extend downward into the central section 157. At the bottom of the bag house reactor in the lower section 158, is a sorbent hopper 112 where reacted and unreacted sorbent is collected. The sorbent hopper is connected to outlet 172. Outlet 172 has an outlet valve 176 which in the open position allows for the removal of sorbent from the hopper 112. A vent 180 is located in the top section 156 of the bag house reactor 150. Gases flowing through the bag house reactor 150 pass from the bag house reactor 150 through the vent 180 and may be directed on for further processing or venting to the atmosphere.

Sorbent entrained in gases containing target pollutants, e.g., $SO_X$ and $NO_X$, can begin reacting with the sorbent during transport in the sorbent feeder conduit 168. Since $SO_X$ is more reactive than $NO_X$, capture of the more reactive $SO_X$ commences in and may be primarily captured while it is being transported to the bag house reactor 150 in the first sorbent feeder conduit 164. At lower gas velocities the larger solids will abrade into finer solids and re-fluidize. The finer solids will travel upward through the opening between the variable venturi 160 and the interior surface 154 where the sorbent is suspended to create a pseudo fluidized-bed above the variable venturi 160 and the finest particles will travel upwards to form a filter cake on the surface of the fabric filter bags 88. By adjusting the position of the variable venturi 160 increasing or decreasing the space between the variable venturi 160 and the interior surface 154 of the bag house reactor 150 gas velocity is correspondingly decreased or increased. In operation, the variable venturi may be positioned to achieve a gas velocity sufficient to suspend a selected coarse fraction sorbent just above the orifice to create a pseudo-fluidized bed which may primarily or preferentially capture $SO_X$, since $SO_X$ is more reactive than $NO_X$. Partially stripped gas flows upward from the pseudo-fluidized bed carrying the finer fraction sorbent onto the filter bags. The resulting filter cake provides a reaction medium where "slower" reactions, such as $NO_X$ removal may occur. The variable venturi 160 position may be adjusted to achieve the desired thickness of filter cake on the fabric bags 88 thereby increasing or decreasing the differential pressure across the system also to balance overall differential pressure by changing the venturi restriction. The fabric filter bags 88 may also be pulsed to partially remove filter cake and thus regulate differential pressure. The gas flow rate entering port 162 can be adjusted to regulate upward gas velocity so that the bags 88 may be pulsed to allow some of the loaded sorbent to fall into the hopper 112 without being reentrained in the gas or redeposited on the bags 88.

Using the variable venturi 160, one can operate the system so that sorbent suspended above the venturi, loaded with the faster reacting gases, can primarily be captured by falling to the hopper before being carried up to the filter bags 88. The fraction of sorbent loaded with faster reacting gases can then be removed from the hopper 112 by opening the outlet valve 176 so that that fraction may be removed from the hopper 112 through the outlet 172. Later the fabric filter bags 88 can be pulsed to release the sorbent loaded with slower reacting gases which would then fall through the variable venturi 160 into the hopper 112. The sorbent loaded with slower reacting gases could then be removed from the hopper through loaded sorbent outlet 172 after the outlet valve 176 has been opened. This could allow for the separate processing of the different loaded sorbent fractions to regenerate the sorbent and produce useful by-products.

Differential pressure, which represents sorbent filter cake thickness, is only one of several process parameters that can be controlled in the system in order to achieve desired levels of target pollutant removal efficiencies and cost advantages of the system. Target pollutant removal efficiency or capture rate may be regulated by monitoring and adjusting various process parameters, including sorbent feeder rate and temperature control at the inlet to the reaction zones of the system. These controls are achieved by the control subelements or electronics, which include hardware and software and also are referred to herein below as control loops.

Figure 13:
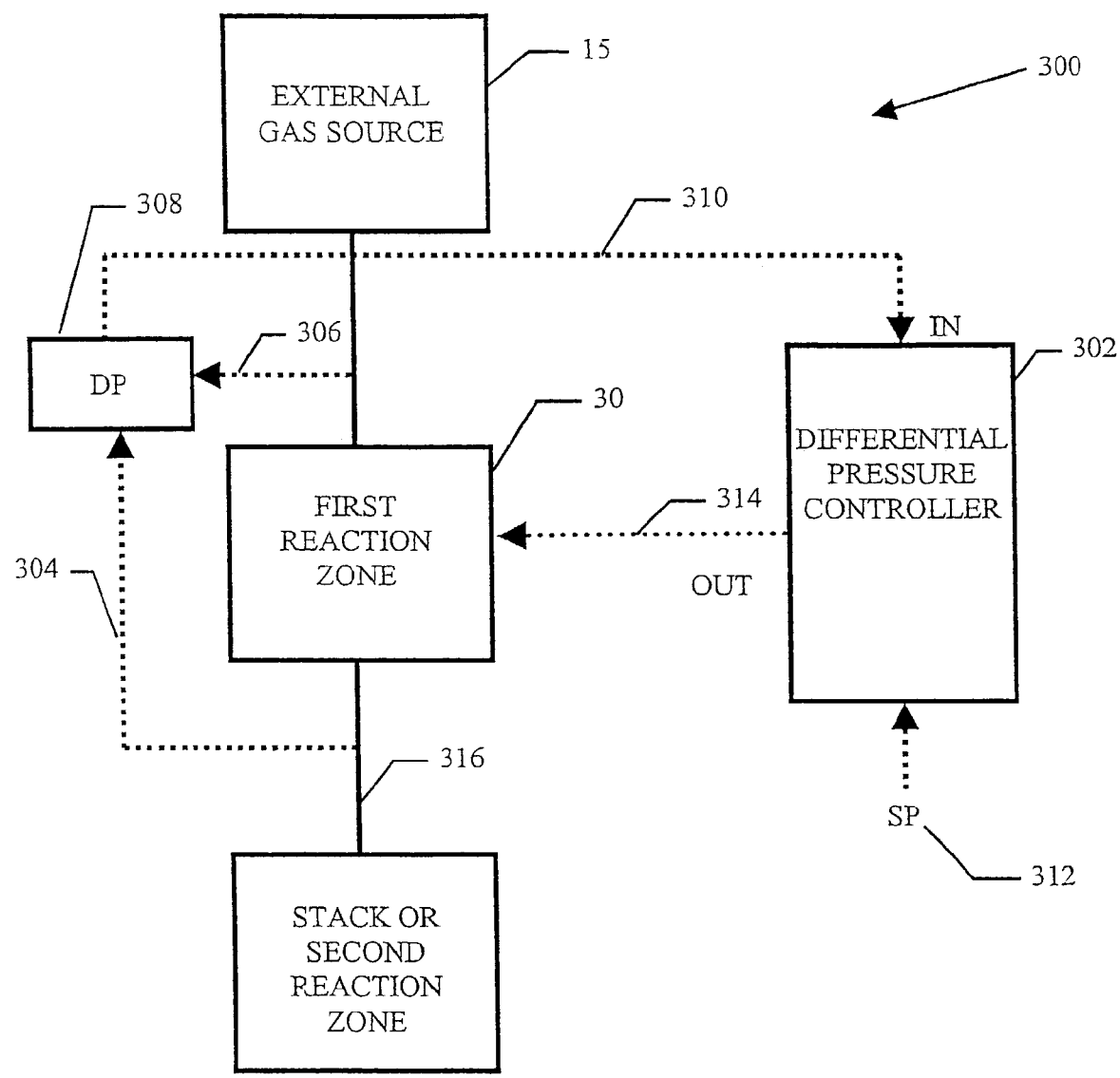
FIG. 13 is a block diagram of a system according to the invention.

Referring now to FIG. 13, a differential pressure control loop 300 is illustrated. External gas source 15 is illustrated feeding first reaction zone 30, which in turn feeds generally an output gas stream 316, which can feed either stack 40 or second reaction zone 38. The differential pressure across first reaction zone 30 may be measured as illustrated as difference in pressure between the inlet pressure 306 and the outlet pressure 304. In the example illustrated, inlet pressure 306 and outlet pressure 304 feed a differential pressure cell 308, which sends a differential pressure signal 310 to a differential pressure controller 302.

Differential pressure controller 302 can be any appropriate controller, including a proportional integral derivative (PID) controller. As used herein, PID controllers may be understood to operate using any combination of the proportional, integral, and derivative components. Differential pressure controller 302 can accept a set point 312, indicating the desired differential pressure across first reaction zone 30. Set point 312 can be human or computer generated. As discussed below, differential pressure controller 302, and other controllers, may be implemented as a stand-alone controller, distributed control system, as a PID block in a programmable logic controller (PLC), or as a set of discrete calculations within a PLC. Differential pressure controller 302 generates an output signal or output 314 to control the differential pressure across first reaction zone 30. In embodiments where first reaction zone 30 includes a bag house or uses solids-filtering media, differential pressure controller 302 output signal 314 may control the shaking, pulsing, or other removal of sorbent which has formed a filter cake on the filter medium.

In one embodiment, first reaction zone 30 includes numerous filter bags which can have an exterior containing sorbent material and an interior having a lower pressure, acting to pull the sorbent material against the bag filter media. In one example of the invention, a compressed air jet, pulse valve 124, is periodically discharged within the interior of the filter. In one embodiment, the compressed air pulse is sufficiently strong to dislodge a portion of caked sorbent material from the filter material even during normal operation of the bag house, not requiring the shut down of the bag house. In one embodiment, the individual bags are sequentially pulsed to dislodge a portion of caked sorbent material. The frequency of the pulsing may be increased in order to maintain a thinner filter cake thickness. Thus, increasing the frequency of the periodic pulsing of each filter bag will maintain a smaller filter cake thickness, and thus result in a smaller differential pressure across the bag house as a whole. In one embodiment, filter bags are grouped by row, with each row periodically pulsed at the same instant. In some embodiments, output 314 from differential pressure controller 302 includes a frequency for pulsing filters within a bag house reaction zone. Differential pressure controller 302, in response to a higher differential pressure than set point, may increase the frequency of filter pulsing through output 314. Conversely, in response to a lower differential pressure than set point, differential pressure controller 302 may decrease the frequency of filter pulsing through output 314.

In one embodiment, the individual filter bags are formed of cylindrical filter media disposed about a rigid cylindrical cage, with the compressed air jet, pulse valve 124, disposed within the cylindrical rigid cage. After a period of time, the sorbent material filter cake builds up on the outside of the filter media, forming a thick filter cake. The pulsed air jet can force the filter media momentarily away from the cylindrical rigid cage, thereby cracking the caked sorbent material and dislodging it, thereby allowing the sorbent material to fall under gravity to be collected and removed from the reaction zone.

A thicker filter cake can lead to increased pollutant removal efficiency, but at the price of extra power required to force the external gas source through the reaction zone. In one example, more power is required for an induction fan to pull exhaust gases through the bag house when the filter cake thickness is greater. The differential pressure may thus be maintained at an optimal level, trading off increased power requirements against the increased pollutant removal. In addition, as the filter cake thickness increases the contact or residence time of the gas with sorbent material in the system increases, resulting in more complete reaction. Therefore less material will have to be regenerated. This may also be taken into consideration in defining the differential pressure set point.

Referring now to FIG. 14, an emissions control loop 320 is illustrated. A gas stream may be seen to flow from gas source 15, through a first continuous emission monitor system (CEM) 80A, then to first reaction zone 30, then to a second CEM 80B. A sorbent feeder 20 may be seen to feed material to first reaction zone 30. Feeder 20 may be a screw feeder having a variable speed screw, auger, pneumatic conveyor, or other method to move sorbent, within.

For illustrative purposes, CEM 80A and CEM 80B can represent target pollutants analyzers such as a $NO_X$ analyzer and a $SO_X$ analyzer. In one embodiment, CEM 80A is a chemiluminescent monitor, for example, Thermo Electron model 42H. In one embodiment, CEM 80A includes a $SO_X$ monitor such as Bovar: Western Research model 921NMP, utilizing a spectrophotometric method. In some embodiments, CEM 80A and CEM 80B include both $NO_X$ and $SO_X$ analyzers. A feed controller 322 may be seen to accept a first input 328 from an outlet CEM signal 325. Controller input 328 may be used as a feedback signal to control the feeder rate. In some embodiments, a feeder controller 322 also has a second input 330 accepting an inlet measurement signal 324, also including pollutant concentration data. Second input 330 may be used to display the incoming gas concentrations and/or to calculate percentage removal set points in the system. Feeder controller 322 also accepts a set point signal 326, indicating the desired feed rate and/or the desired $NO_X$ or $SO_X$ concentration exiting first reaction zone 30. Feeder controller output 332 can be a variable frequency drive signal, among other available signals, to control the speed of feeder 20.

Feeder controller 322 may be any suitable controller, including a PID controller utilizing any combination of its individual modes. In one embodiment, set point 326 is set at a desired concentration for either $NO_X$ or $SO_X$, depending on the embodiment. The gas concentration signal 325 from CEM 80B can be used by feeder controller 322 to calculate output signal 332. When the gas concentration is higher than indicated as desirable by set point 326, output 332 can be increased to increase the speed of feeder 20, which will put more sorbent into first reaction zone 30, thereby dropping the pollutant concentration. Conversely, when pollutant gas concentration 325 is lower than required, feeder controller output 332 can be decreased to decrease the rate of sorbent addition from feeder 20 into first reaction zone 30.

Figure 15:
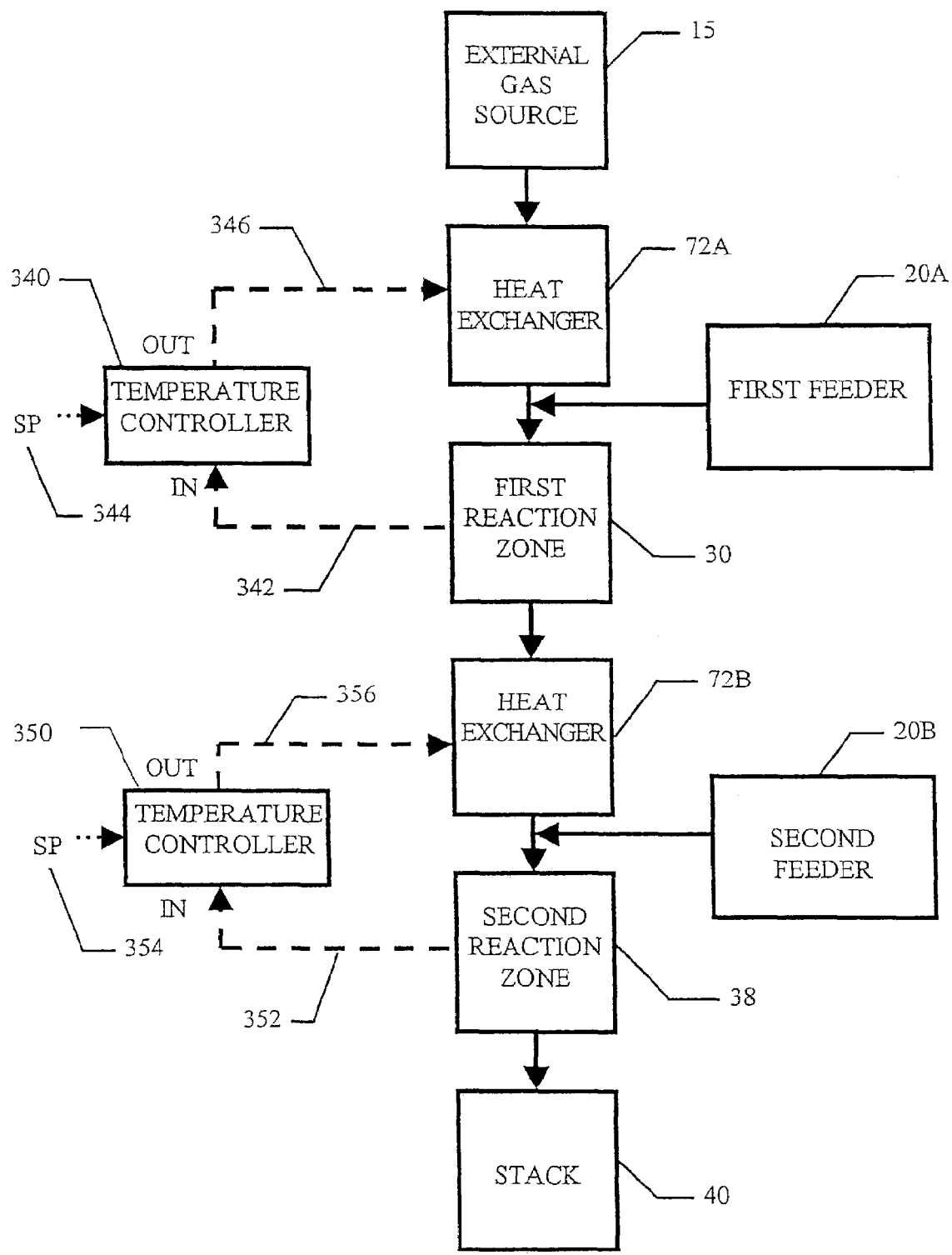
FIG. 15 is a block diagram of a system according to the invention.

Referring now to FIG. 15, the gas to be cleaned may be seen to flow from external gas source 15, through a first heat exchanger 72A, through first reaction zone 30, through second heat exchanger 72B, through a second reaction zone 38, and to stack 40. FIG. 15 illustrates a system having two reaction zones and two heat exchangers. The temperature to the first reaction zone 30 may be seen to be controlled by a first temperature controller 340, which accepts a set point 344 and a temperature input 342, and generates an output 346 to first heat exchanger 72A. As previously discussed, the maximum desired temperature in the reaction zone may depend on the thermal decomposition temperatures of reaction products, e.g., the sulfates of manganese or nitrates of manganese, depending on whether $NO_X$ and/or $SO_X$ are being removed with oxides of manganese as the sorbent. Lower temperature set points will be above the dew point of the system and adjusted automatically or manually as needed. In one embodiment, the temperature to be controlled is measured at the reaction zone itself, rather than at the outlet from the heat exchanger, in order to more directly measure the temperature in the reaction zone. In one embodiment, temperature controller 340 output 346 may be a variable analog signal or other variable signals used to control a variable speed blower to control the outlet temperature from heat exchanger 72A. Temperature controller 340 may increase/decrease the cooling air passing through heat exchanger 72A when the temperature in first reaction zone 30 is greater/less than set point 344.

A second temperature controller 350 may be seen to accept a temperature input 352 from second reaction zone 38 and a set point 354, and to generate an output 356 for heat exchanger 72B. Second temperature controller 350 may be similar to first temperature controller 340. In one embodiment, heat exchanger 72B is used to cool the incoming gas, using ambient air as the cooling medium. As discussed previously with respect to temperature controller 340, second temperature controller 350 may increase/decrease the output to a variable speed drive coupled to a blower when the temperature of second reaction zone 38 is greater/less than set point 354.

FIG. 15 also illustrates how a first feeder 20A may feed material to first reaction zone 30. A second feeder 20B may be used to feed sorbent material to second reaction zone 38. First feeder 20A and second feeder 20B may be controlled as previously described with respect to feeder 20 in FIG. 14.

Figure 16:
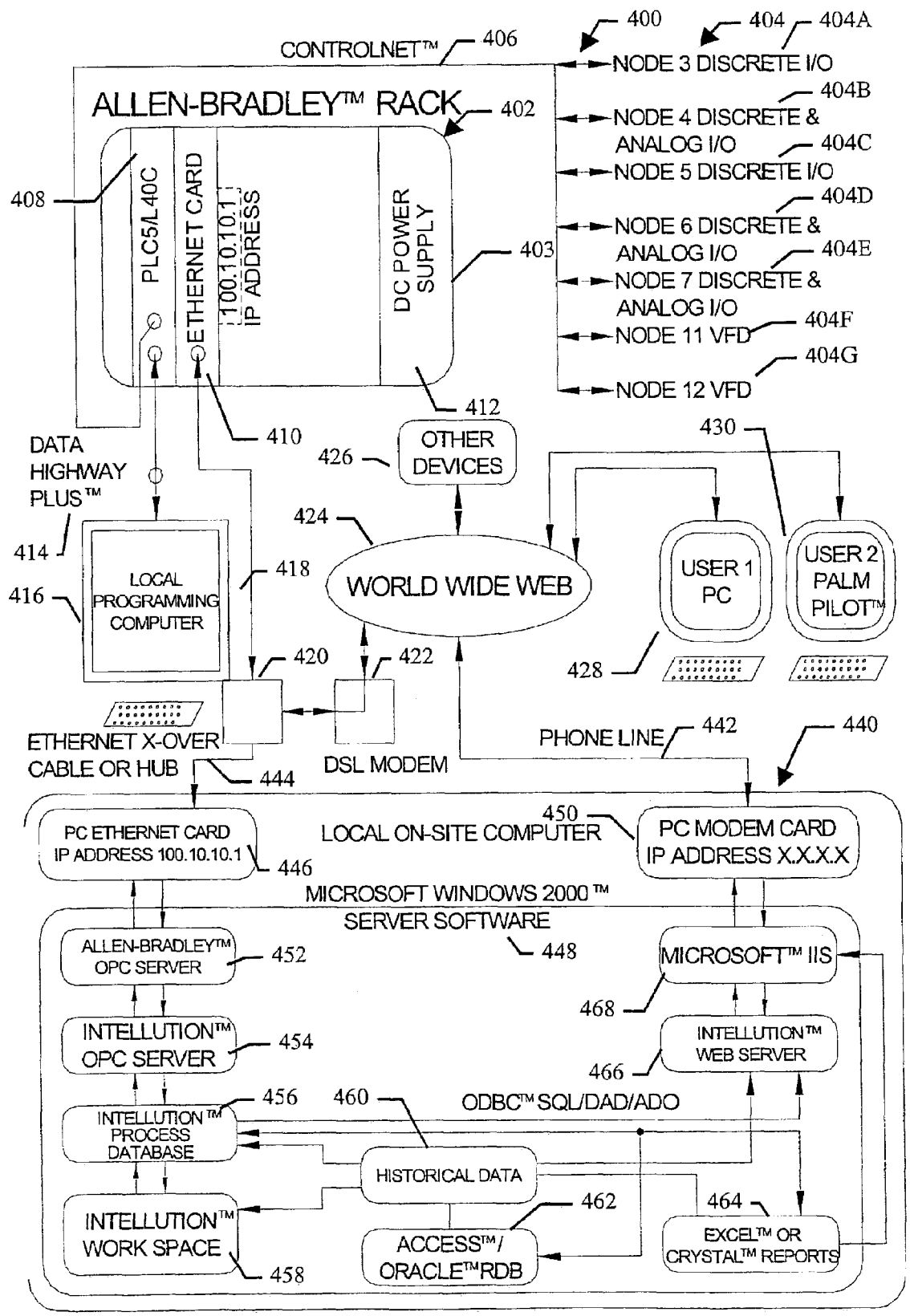
FIG. 16 is a flow diagram an electronic control system useful in the invention.

Referring now to FIG. 16, a control and data acquisition system 400 for controlling and monitoring the previously described processes is illustrated. System 400 may be seen to include generally a programmable logic controller (PLC) 402 and a local on-site computer 440. Both PLC 402 and local computer 440 may be coupled to the World Wide Web 424. PLC 402 and local computer 440 may be accessed over World Wide Web 424 by a user PC 428, a hand-held computer such as a Palm Pilot™ 430, and other devices 426 which can access World Wide Web 424.

PLC 402 may be seen to include a PLC rack 403. In one example, PLC 402 is an Allen Bradley™ PLC. In one example, the Allen Bradley™ PLC is a PLC 5. PLC rack 403 may be seen to include a PLC processor module 408, and Ethernet module 410, and a DC power supply 412. PLC 402 may be seen to include an input/output bus 406, for example a Controlnet™ bus 406 and input/output bus 414, shown as Data Highway Plus,™ which is connected to its local programming computer 416. Bus 406, in the present example, may be seen to be coupled to numerous input/output cards 404. Input/output cards 404 may be seen to include a discrete I/O cards 404A, mixed discrete and analog I/O cards 404B, discrete I/O cards 404C, discrete and analog I/O cards 404D, more discrete and analog cards I/O 404E, a variable frequency drive card 404F, and a second variable frequency drive card 404G. The discrete I/O may be commonly used to accept inputs from discrete switches such as limit switches, and the output used to open and shut valves and to start and stop motors. The analog I/O may be used to accept input analog measurements from sensors and to control variable position output devices. The variable frequency drive outputs may be used to control variable speed motors, for example, variable speed motors used to control airflow pass the heat exchangers.

PLC 402 may be seen to be coupled to an Ethernet hub 420 via an Ethernet cable 418. In one embodiment, a DSL modem 422 enables Ethernet hub 420 to be accessed from World Wide Web 424. Local computer 440 may also be seen to be coupled to Ethernet hub 420 via an Ethernet cable 444. Ethernet cable 444 can be coupled to an Ethernet card 446. Similarly, local computer phone line 442 may be coupled to a PC modem card 450. The PC modem card can provide access to World Wide Web 424 when a DSL modem line is not available or is not functioning. Local computer 440 may be seen to include software or software component 448 which can include, for example, Microsoft Windows 2000 as an operating system that is providing both server and terminal functionality. Software component 448 can include an Allen Bradley™ OLE Process Control (OPC) module 452, as well as an Intellution™ OPC server component 454.

The IFIX process monitoring and control package by Intellution is used in one embodiment. An Intellution™ process database component 456 may also be included. Allen Bradley™ OPC server 452 can provide communication between local on-site computer and Allen Bradley™ PLC 402.

Intellution™ OPC server 454 can provide communication between the Allen Bradley™ inputs and outputs and the Intellution™ process monitoring and control system residing within local computer 440. Intellution™ process database 456 may be used to monitor and control the entire process. Intellution™ Work Space 458 may be used to allow access to monitor, display, and change current data, and a historical data area 460 may be used to trend historical process data. An Access™/Oracle™ RDB component 462 may also be included to provide database reporting. In one embodiment, a report module, for example, a Microsoft Excel™ or Crystal™ report component 464 may also be provided. In some embodiments, an Intellution web server component 466 is provided, as is a Microsoft™ Internet Information Server (IIS) module 468. In some embodiments, local on-site computer 440 has a local terminal or CRT as well to display, monitor, and change data residing in the Intellution™ Work Space 458.

In some embodiments, most or all of the controls discussed below in the present application are implemented within control system 400. In one embodiment, most or all controls are implemented within Allen Bradley™ PLC 402. For example, PID control blocks can be implemented using provided Allen Bradley™ PID blocks, or the blocks can be created from primitive mathematical operations using ladder logic. Control blocks such as the table blocks and selector blocks of FIGS. 24 and 25 may be implemented within Allen Bradley™ PLC 402 using standard blocks. Local on-site computer 440 may be used to store and output values such as PID set points and selector switch values from local computer 440 to registers or control blocks within PLC 402. For example, the set points to heat exchanger, differential pressure, and feed rate control blocks may reside within local computer 440 and be downloaded to PLC 402. The set points may be obtained by local computer 440 from a local terminal and/or from World Wide Web 424 from devices 426, 428, and/or 430, protected by appropriate security. Local computer 440 can be used to provide historical trending, operator interface, alarming, and reporting.

Figure 17:
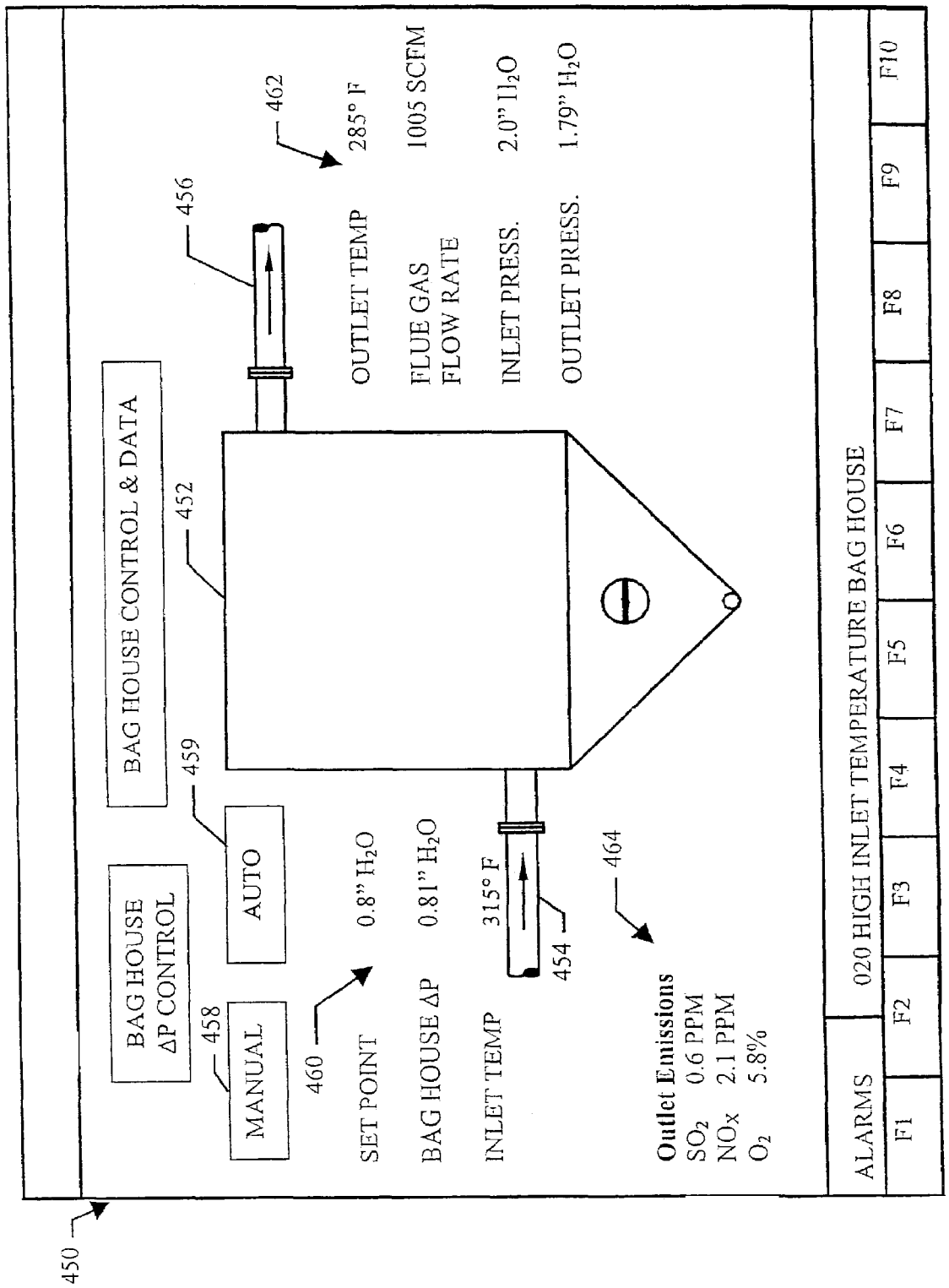
FIG. 17 is electronic control panel display.

Referring now to FIG. 17, a process graphic 450, as displayed on a human-machine interface is displayed. Process graphic 450 may be displayed, for example, on an Intellution™ IFIX system. Process graphic 450 can be updated in real time and can reside on a personal computer, for example. Process graphic 450 includes a manual switch 458 and an automatic switch 459 for controlling the control mode of the differential pressure across the bag house. Process graphic 450 also includes a table of values 460 including the differential pressure set point, the actual differential pressure and the inlet temperature to the bag house. An output table 462 is also illustrated, including the bag house outlet temperature, the flue gas flow rate, the inlet pressure to the bag house and the outlet pressure from the bag house. A bag house 452 is shown diagrammatically including an inlet 454 and an outlet 456. An outlet emission table 464 is also illustrated, including the SO$_2$, the NO$_X$ level, and the O$_2$ level. Process graphic 450 may be used to monitor and control the bag house differential pressure, as previously discussed.

Figure 18:
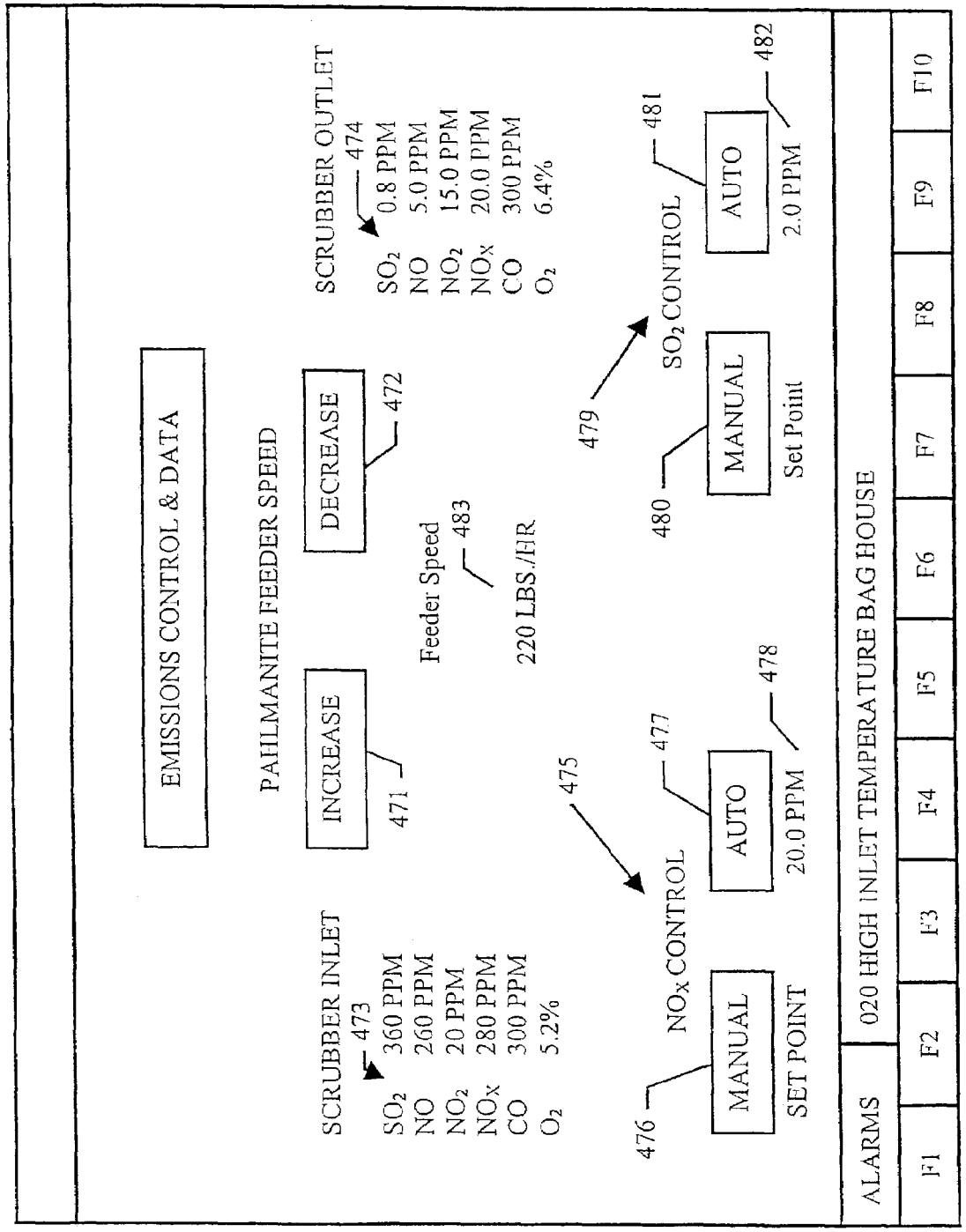
FIG. 18 is electronic control panel display.

Referring now to FIG. 18, a process graphic 470 is illustrated as may be displayed on an Intellution™ IFIX process graphic. Process graphic 470 can monitor and control the sorbent feeder speed, including an increase button 471 and a decrease button 472. The actual feeder speed in pounds of sorbent per hour is illustrated at feeder speed 483. A scrubber inlet table 473 is illustrated, including a SO$_2$ level, a NO level, a NO$_2$ level, a NO$_X$ level, a CO level, and an O$_2$ level. A scrubber outlet table 474 includes the same levels as the inlet, but at the scrubber outlet. A NO$_X$ control section 475 on the process graphic includes a manual button 476 and an auto button 477, as well as a set point 478. In automatic mode, set point 478 may be used to control the feeder speed using the NO$_X$ set point. Similarly, an SO$_2$ control section 479 includes a manual control button 480 and an auto control button 481, as well as a set point 482. In automatic mode, set point 479 may be used to control the feeder speed using the SO$_2$ set point.

Figure 19:
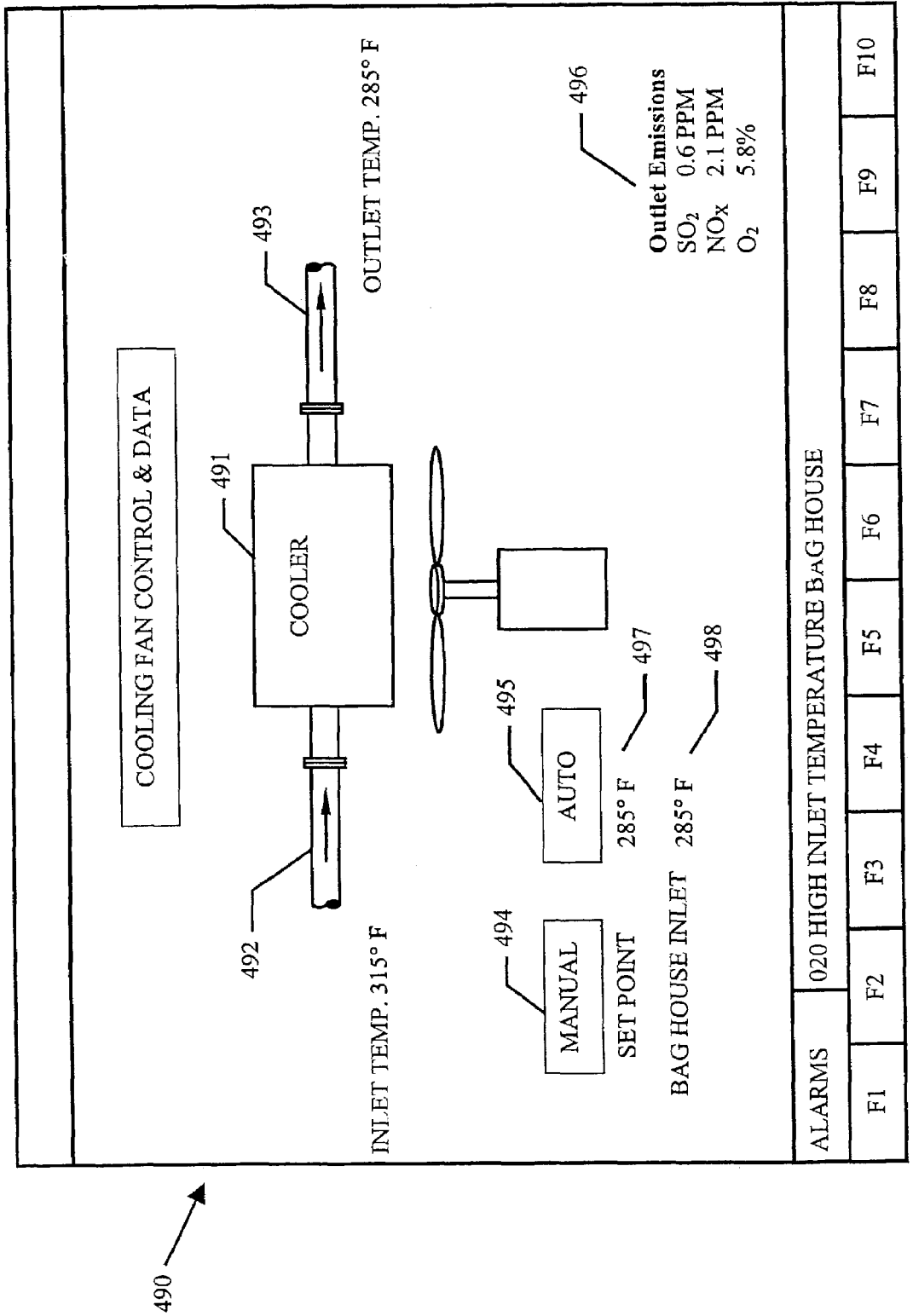
FIG. 19 is electronic control panel display.

Referring now to FIG. 19, a process graphic 490 is illustrated, as may be found on a process control and monitoring station. A cooler 491 is illustrated, having an inlet 492 and an outlet 493, with the inlet and outlet temperatures being displayed in real time. Cooler 491 may be a heat exchanger as previously discussed. Process graphic 490 includes a manual button 494 and an auto button 495. The bag house inlet temperature is displayed at 498 as is the cooler set point 497. When in the automatic mode, the fan speed may be controlled by a PID controller using set point 497. Process graphic 490 also includes an outlet emission table 496, including the SO$_2$ level, the NO$_X$ level, and the O$_2$ level.

Figure 20:
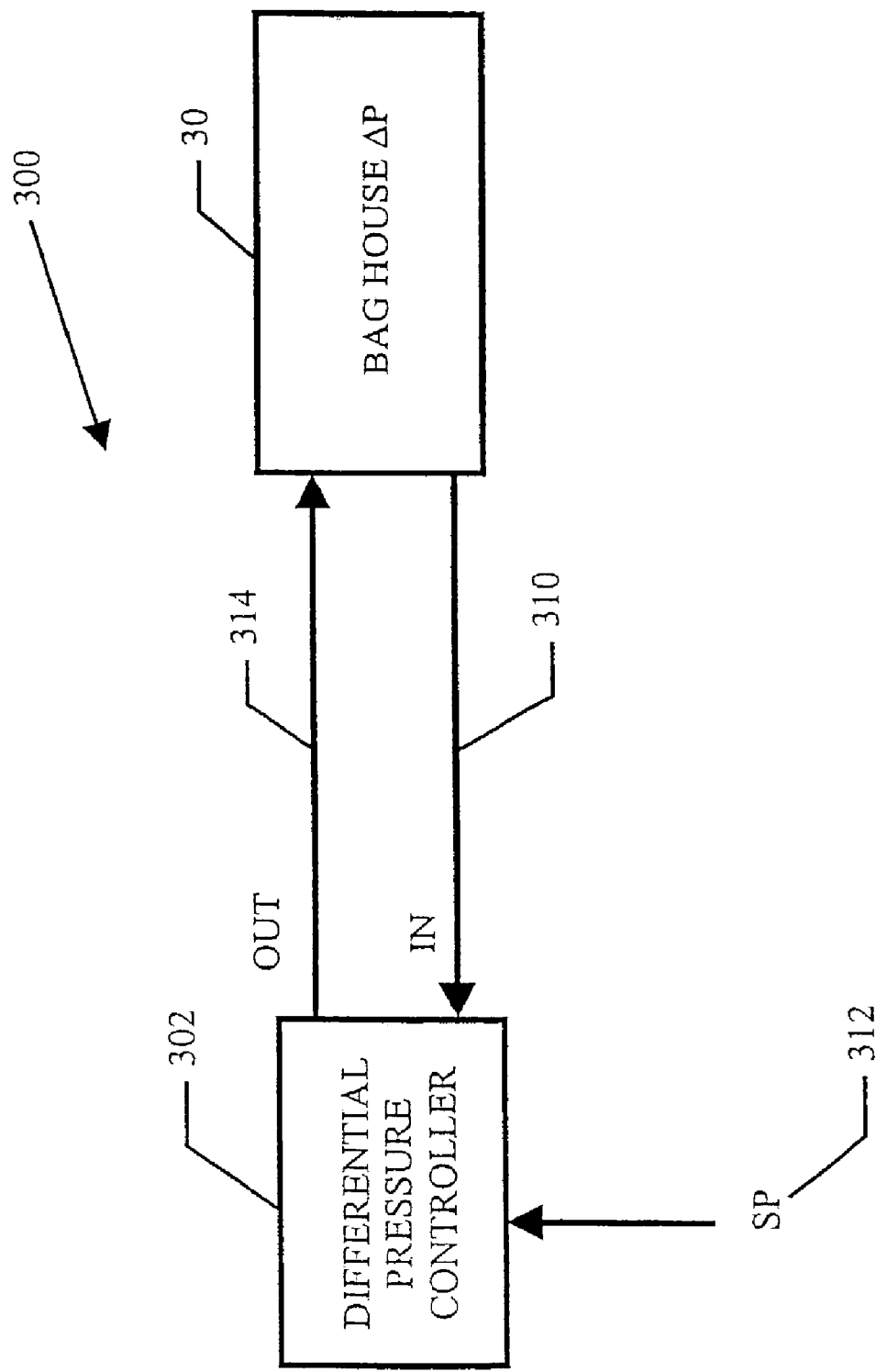
FIG. 20 is a block diagram of a control sub-element according to the invention for regulating differential pressure.

Referring now to FIG. 20, differential pressure control loop 300 is illustrated in block diagram form. Differential pressure controller 302 may be seen to accept set point 312 and actual differential pressure 310, and to generate output signal 314 to control the differential pressure across bag house 30. As previously discussed, differential pressure set point 312 may be set taking into account the desired pollutant removal target of the system, the power required to force gas through the filters, and the desired rate of sorbent replenishment.

Figure 21:
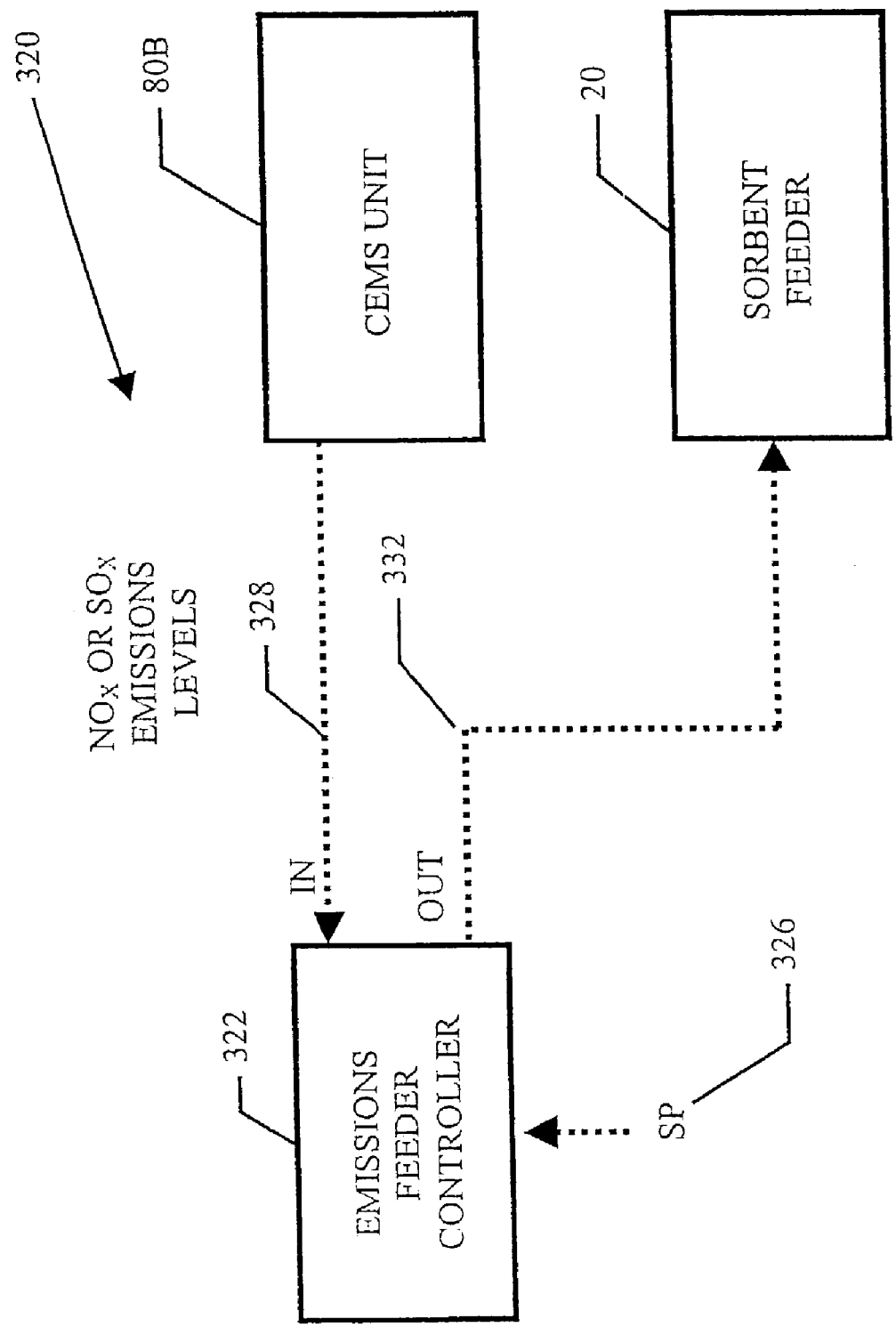
FIG. 21 is a control sub-element according to the invention for control of $SO_X$ or $NO_X$ capture rate or sorbent feed rate.

Referring now to FIG. 21, sorbent feeder control loop 320 is illustrated in block diagram form. As previously discussed, feeder control loop 320 can include a reaction zone CEM unit 80B that generates an output signal from the NO$_X$ and/or SO$_X$ emission analyzers. Emissions/Feeder controller 322 can accept the NO$_X$ or SO$_X$ measured emission level through controller input 328; and accepts a set point 326 indicating the desired NO$_X$ and/or SO$_X$ concentration. Controller 322 may also send a controller output 332 to sorbent feeder 20. As previously discussed, sorbent feeder 20 may be a variable speed screw feeder, accepting a variable analog drive signal among others as its input from feeder controller 322. The process trade-offs in setting set point 326 are as previously described.

Figure 22:
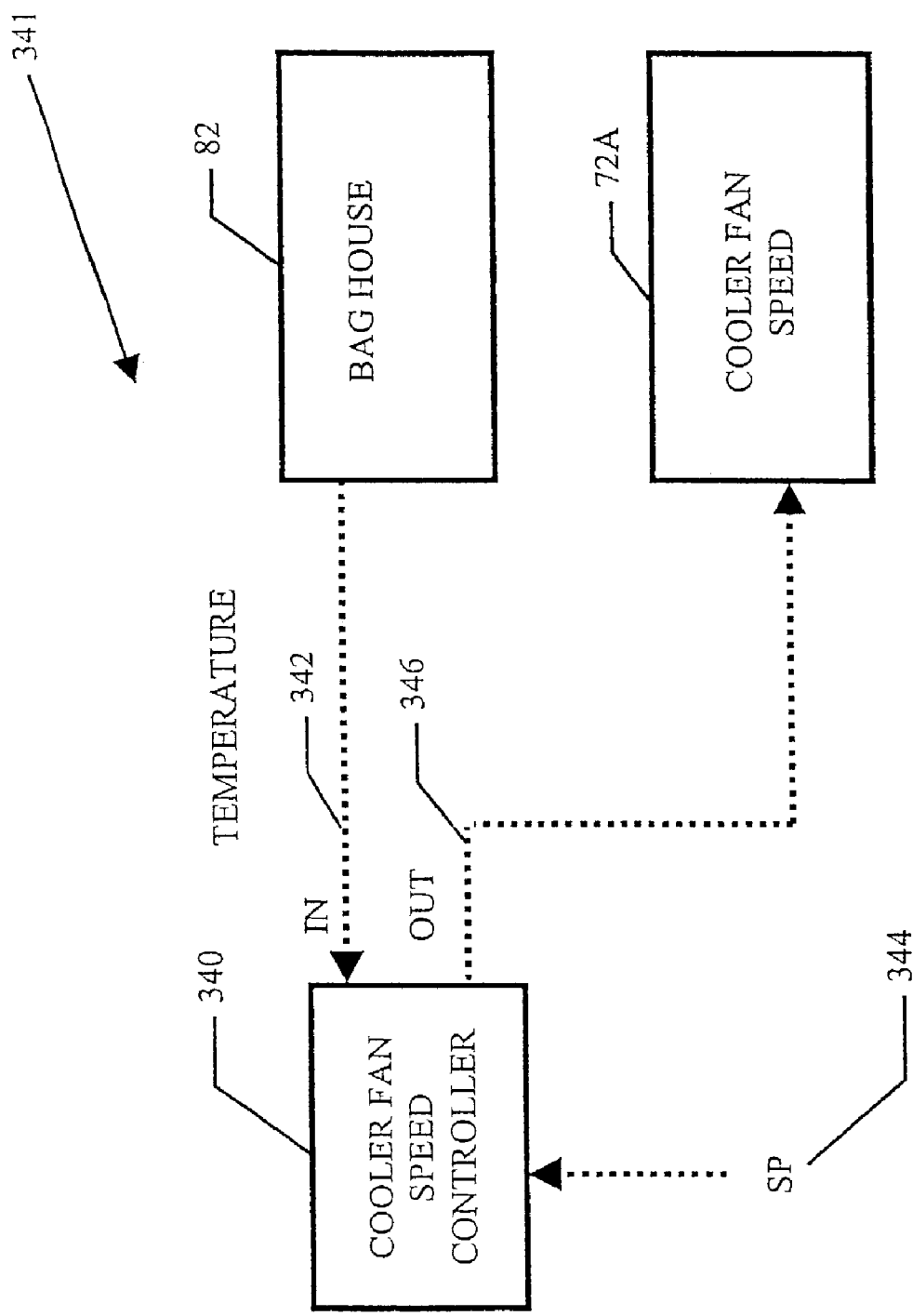
FIG. 22 is a control sub-element according to the invention for control of bag house gas inlet temperature.

FIG. 22 illustrates a control loop 341 for controlling the temperature of bag house 82. Temperature controller 340 is as previously described with respect to FIG. 15. Temperature controller 340 accepts a bag house temperature input 342 and desired bag house input temperature set point 344, generating controller output 346 which can be fed as a fan speed control to heat exchanger 72A. The control scheme rationale is as previously described with respect to FIG. 15.

Figure 23:
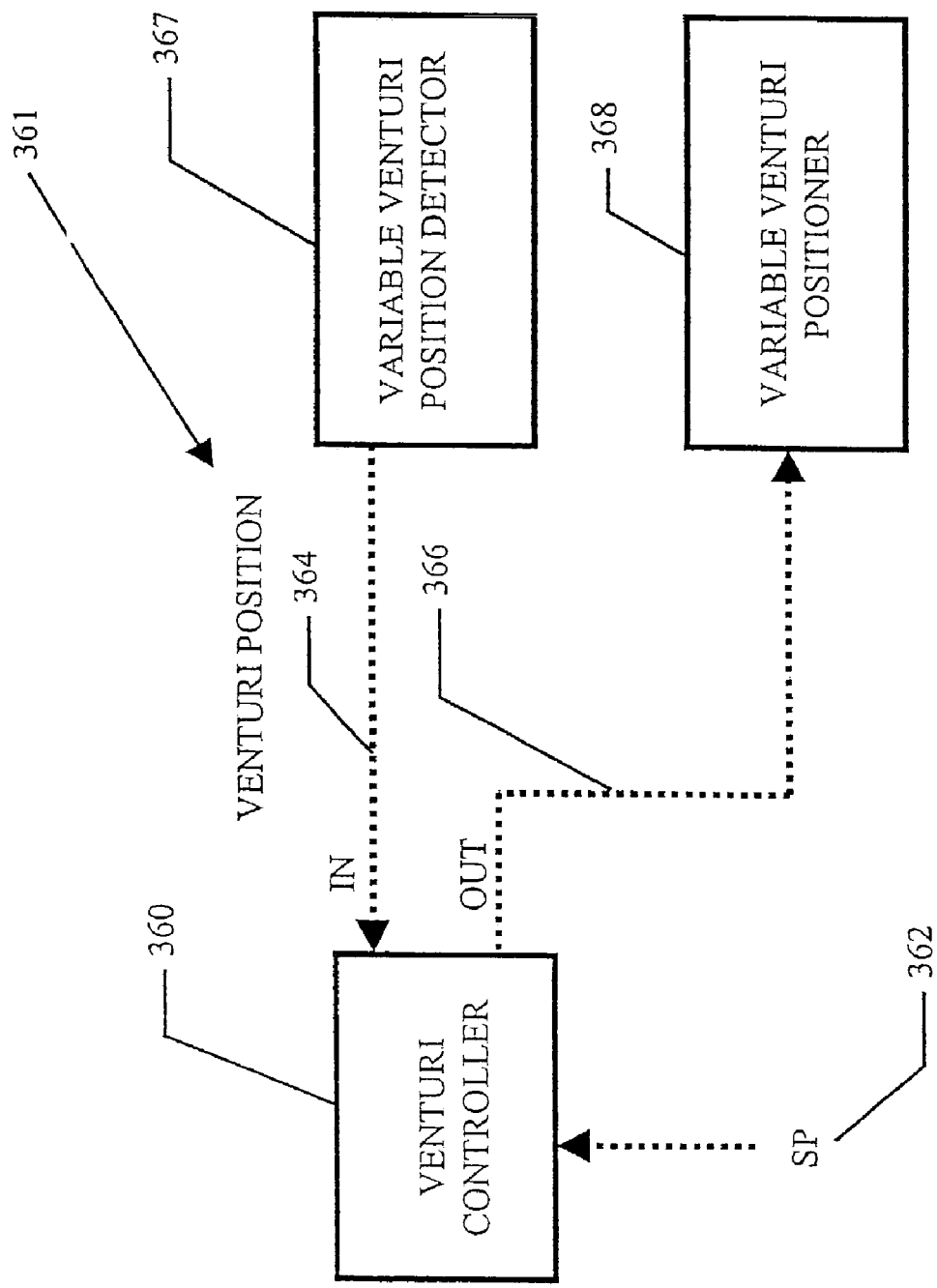
FIG. 23 is a control sub-element according to the invention for control of variable venturi position(s).

Referring now to FIG. 23, a variable venturi control loop 361 is illustrated. FIG. 23 illustrates a venturi position controller 360, which accepts a venturi position set point 362 and an actual venturi position input 364, generating a controller output 366 which can be accepted by a variable venturi positioner at 368. The actual position of the variable venturi position may be measured by a position detector 367.

In one embodiment, the variable venturi position may be measured in units of 0 to 100%. Venturi set point 362 may be set as a function of one of several desired process parameters.

The variable venturi position may be set to control the space between the variable venturi 160 and interior surface 154, the cross-sectional flow area, available for the bag house inlet gas to flow around the flow occluding devise, variable venturi 160, thereby controlling the fluidization velocity of the gas. When the flow cross-sectional area is decreased, the gas flow velocity increases, which can be used to support a deeper fluidized bed depth of sorbent material. If the gas flow velocity is made very high, only the densest sorbent particles will be able to descend against the swiftly rising gas and be collected from the system. If the fluid velocity is set very low, even the lightest particles will be able to settle out of the system quickly, thereby increasing the need for regeneration or recycling of material back to the reaction zone for more loading. A higher gas flow velocity will, in effect, create a fluidized bed reactor, having a fluidized bed of sorbent material held in place by the upwardly rising gas stream. A rapidly moving gas stream will also carry more sorbent particles to the fabric bags 88 filter to form a filter cake. Conversely, a slowly moving gas flow around the variable venturi 160 will allow many sorbent particles to fall and be collected prior to becoming caked upon the bags 88. A. deeper fluidized bed will create higher differential pressures and a shallow fluidized bed will create lower differential pressures. Removal efficiencies may be taken into consideration when setting $SO_X$ and/or $NO_X$ fluidized bed depth. Variable venturi controller 360 may be any suitable controller, including a PID controller, utilizing any combination of its modes.

Figure 24:
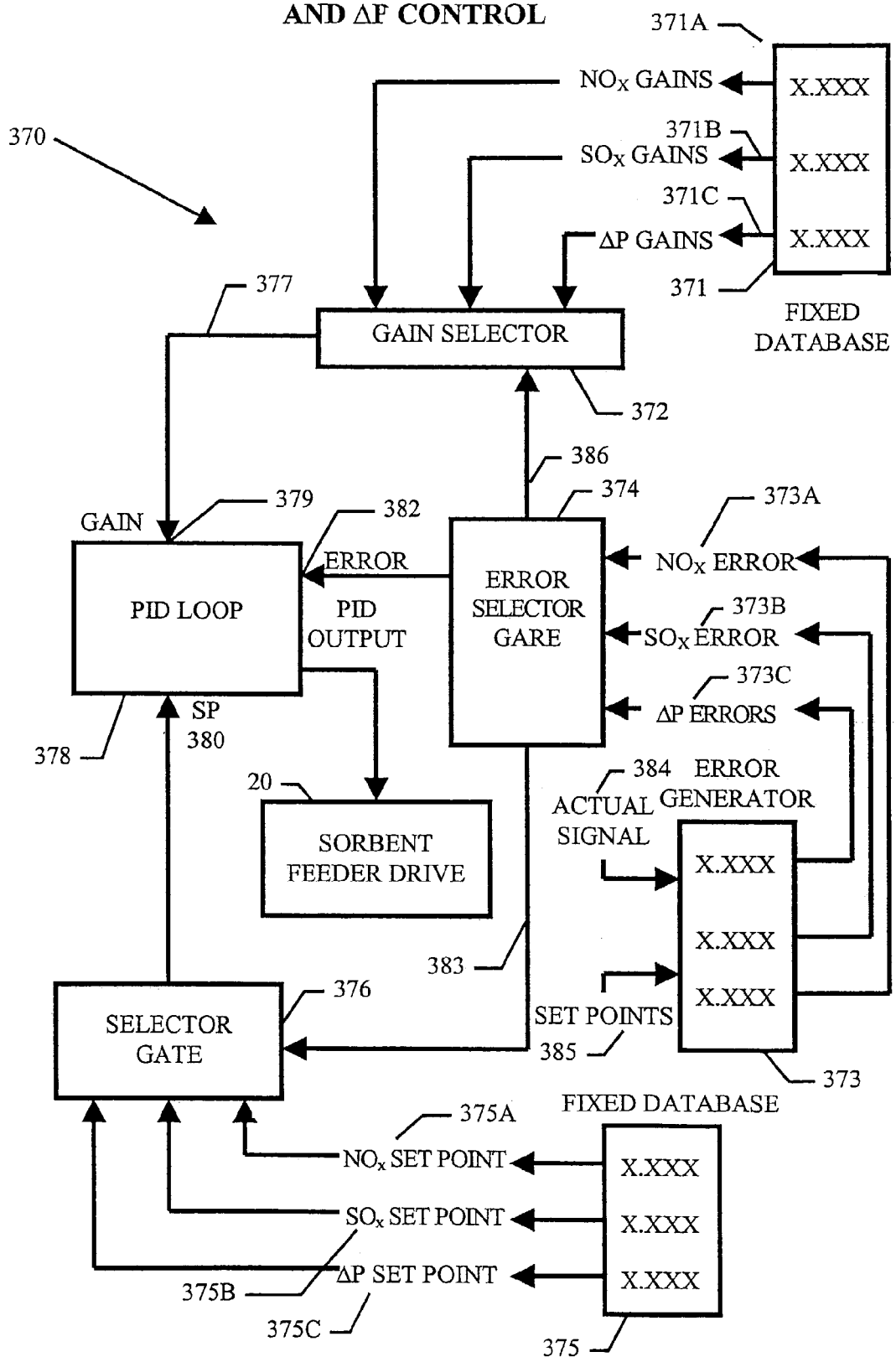
FIG. 24 is a control sub-element according to the invention for control of $SO_X$ or $NO_X$ capture rate, differential pressure, and sorbent feed rate.

Referring now to FIG. 24, a control scheme 370 is illustrated for controlling sorbent feeder 20 using one set of inputs selected from the group including $NO_X$ concentration, concentration, and reactor zone differential pressure. The control of sorbent feeder 20 may be accomplished by selecting one of the aforementioned control inputs, where the selection may be based on the greatest deviation from set point or error.

An error generator 373 may be seen to accept several actual measurement signals 384, as well as several set points 385. The actual signals and set points may be used to generate corresponding errors, for example, using subtraction. Error generator 373 may be seen in this example to output a $NO_X$ error 373A, a $SO_X$ error 373B, and a differential pressure error 373C. The outputs from error generator 373 may be accepted by an error selector gate 374, with one of the input errors selected and output as the error to a controller error input 382. Error selector gate 374 may be operated manually to accept one of the several input errors in some embodiments. In other embodiments, error selector gate 374 may automatically select the largest error or deviation, to control based on the process variable or parameter most requiring attention. For example, sorbent feeder 20 may be controlled based upon the $NO_X$ concentration, the $SO_X$ concentration, or the differential pressure across the reaction zone.

Error selector gate 374 may select the highest deviation, or the highest percent of deviation, of these three error inputs. Error selector gate 374 can generate a selector output 386 which can be used to select which of the inputs a gain selector 372 is to select. Similarly, error selector gate 374 may output a selector output 383 which can be accepted by a set point selector gate 376 to select from various set points provided to the selector gate.

A gain table 371 may be implemented as a table in a fixed database, for example, a series of registers in a PLC. Gain table 371 may be seen to include a $NO_X$ gain 371A, a $SO_X$ gain 371B, and a differential pressure gain 371C. The gains from gain table 371 may be seen to feed gain selector block 372. A gain selector output 377 may be sent to a controller gain input 379.

A set point table 375 may be seen to include a $NO_X$ set point 375A, a $SO_X$ set point 375B, and a differential pressure set point 375C. The set points may be used as inputs to selector gate 376, with selector output 383 being used to select one of the input set points. Selector gate 376 may be seen to output one of the selected set points to controller set point input 380.

Control scheme 370 thus provides a system and method for controlling the sorbent feeder rate based upon any one of the $NO_X$ concentrations, the $SO_X$ concentration or the differential pressure across the reaction zone. This can be accomplished using the selector, blocks previously discussed while only requiring a single controller. Controller 378 can be, for example, a PID controller, using any combination of its individual modes.

Figure 25:
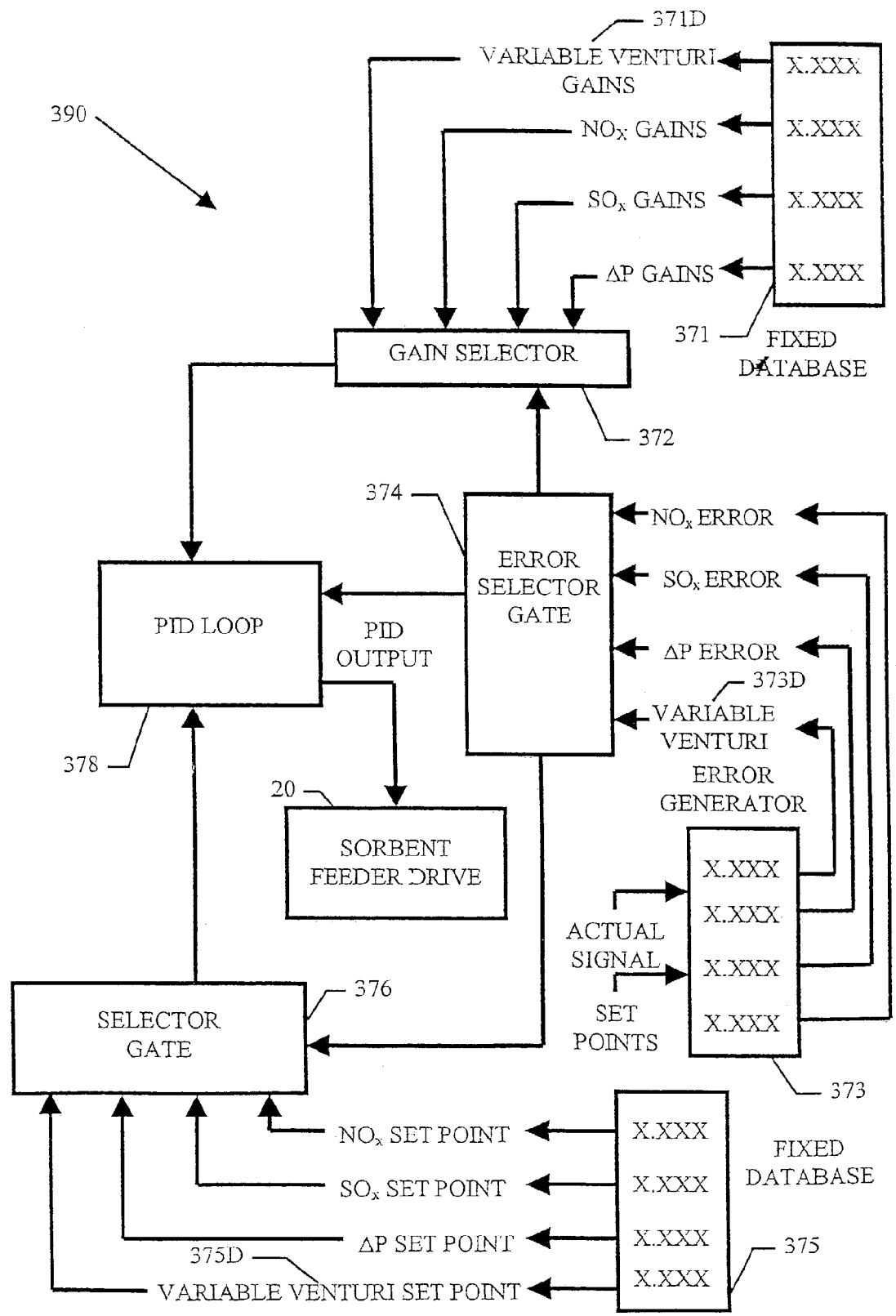
FIG. 25 is a control sub-element according to the invention for control of $SO_X$ or $NO_X$ capture rate, differential pressure, sorbent feed rate, and variable venturi position.

Referring now to FIG. 25, a control scheme 390 is illustrated, similar in some respects to control scheme 370 of FIG. 24. Control scheme 390 includes similar control blocks, tables, and outputs as previously described in FIG. 24. Control scheme 390 further includes the variable venturi control as one of the possible sets of inputs, gains, and set points to be used to control sorbent feeder 20. Gain table 371 may be seen to include a variable venturi gain 371D. Error generator 373 may be seen to generate a variable venturi error 373D. Set point table 375 may be seen to include a variable venturi set point 375D. Control scheme 390 may thus operate in a manner similar to control scheme 370 of FIG. 24, but allowing for control based on the venturi position.

Various components of the system of the invention have been discussed above. Many of the components of the system are commercially available from various original equipment manufacturers and are known to those of ordinary skill in the art. Further, one skilled in the art will recognize and understand that the reaction zones and other units of the system of the invention may be connected by pipes, ducts, and lines, etc. which allow gas and/or sorbent to flow through and within the system and that reaction zones are in flow through communication in dual and multi stage embodiments of the invention. In addition to the aforementioned system components, the system may further include various hoppers, conveyors, separators, recirculation equipment, horizontal and vertical conveyors, eductors. Further, there may be modulating diverter valves, vibrators associated with feeders, compressors to provide instrument air to pulse filter fabric bags, as well as various meters and sampling ports.

The system of the invention in its various embodiments may be utilized in processes for removal of target pollutants from a gas stream. The processes generally involve providing a system according to the invention, whether single stage, dual-stage, or multi-stage. Gas and sorbent are introduced into a reaction zone and contacted for a time sufficient to effect capture of the targeted pollutants thereby substantially stripping the gas of the targeted pollutants. In a single-stage removal process, the reaction zone would need to be a solid-gas separator operating as a reaction zone or else followed by a solid-gas separator in order to render the gas that has been substantially stripped of a target pollutant free of solids so that the gas may either be vented or directed for further processing. In a dual-stage removal process, the second reaction would preferably be a solid-gas separator operating as a reaction zone. In a multi-stage removal process all the reaction zones may be gas-solid separates, preferably bag houses. Alternatively, the last reaction zone in the series of reaction zones through which the process gas is directed would need to be a solid-gas separator operating as a reaction zone or else followed by a solid-gas separator in order to render the gas that has been substantially stripped of a target pollutant free of solids so that the gas may either be vented or directed for further processing. Generally, configuring the systems and processes of the invention to incorporate a solid-gas separator as at least the last reaction zone in a sequence of removal steps would be economical and efficient.

A process according to the invention is described below using single-stage and dual-stage systems of the invention for purposes of illustration. It should be readily understood by those skilled in the art that the processes as described can be adapted to multi-stage removals and to removal of various targeted pollutants with or without the addition of other sorbent materials or chemical additives, as appropriate.

Removal of target pollutants, for example, $SO_X$ and/or $NO_X$, can be accomplished in a single single-stage removal system. Sorbent and gas containing $SO_X$ and/or $NO_X$ are introduced into a reaction zone 30, where the gas and sorbent are contacted for a time sufficient to substantially strip the gas of $SO_X$ and/or $NO_X$. If $SO_X$ is the primary target pollutant, the gas may be introduced at temperatures typically ranging from about ambient temperature to below the thermal decomposition temperatures of sulfates of manganese. If $NO_X$ is the primary target pollutant, the gas would be introduced at temperatures typically ranging from about ambient temperature to below the thermal decomposition temperatures of nitrates of manganese. If both pollutants are present, $NO_X$ will not be captured if the temperature of the gas is above the thermal decomposition temperature of nitrates of manganese. In the reaction zone, the gas would be contacted with the sorbent for a time sufficient to effect capture of the target pollutant at a targeted capture rate. If both pollutants are to be captured, the capture rate for the primary targeted pollutant would control a control sub-element, such as control loop 320 of FIG. 14 or control loop 390 of FIG. 25 may be utilized to regulate target pollutant capture rates. The reaction zone would preferably be a solid-gas separator and, more preferably a bag house, that renders the gas free of solids, such as sorbent particles and any other particulate matter in the gas so that the gas may be vented from the reaction zone or directed for further processing, after contacting the gas with sorbent for a sufficient time.

In a dual-stage removal process, a system of the invention having at least two reaction zones, first and second reaction zones 30, 38 as in FIG. 1, is provided. It should be understood that the system could be a system of the invention such as the modular reaction units illustrated in FIGS. 2 and 3. With reference to FIG. 2, any of the bag houses 62, 64, 66 could serve as first and second reaction zones 30, 38 depending upon how the gas is directed through the system. Further, with reference to FIG. 3, the first bag house 70 would correspond to first reaction zone 30 and either or both of the second and third bag houses 76, 78 would correspond to second reaction zone 38. Additionally, it is understood that other reaction zones may be substituted for the bag houses of FIGS. 2 and 3, as long as the last reaction zone in a series is a bag house, and the process as described could be carried out.

However, for purposes of illustration, the dual-stage removal process is discussed with reference to FIG. 1. In this process of the invention, gas and sorbent are introduced into first reaction zone 30. The gas is contacted with the sorbent for sufficient time to primarily effect capture of a first target pollutant, e.g., $SO_X$, at a targeted capture rate. The gas is rendered free of solids and then vented from the first reaction zone 30. Sorbent and the gas that has been substantially stripped of $SO_X$ are then introduced into second reaction zone 38. In the second reaction zone, the gas is contacted with the sorbent for a sufficient time to primarily effect capture of a second target pollutant, e.g., $NO_X$ capture at a targeted capture rate. The gas is rendered free of solids and then vented from the second reaction zone 38. The vented gas may be directed to stack 40 to be vented or emitted into the atmosphere or directed on for further processing.

With the processes of the invention, other pollutants that can be captured with metal, as described herein above, oxides can be removed. For example, without being limited or bound by theory, Applicants believe that mercury compounds adsorb onto oxides of manganese or alumina. Applicants further believe that, in the system and processes of the invention, elemental mercury is oxidized to form oxides of mercury which also adsorb onto oxides of manganese or alumina. Additionally, hydrogen sulfide ($H_2S$) and other totally reduced sulfides (TRS) can be removed utilizing oxides of manganese. More specifically, Applicants postulate that the sulfur in TRS may be oxidized to form $SO_2$ which is known to react with oxides of manganese to form sulfates of manganese. It is known that mercury compounds may be removed from gases by adsorption on fly ash and/or alumina. Thus, alumina may be used as the sorbent or co-introduced with other compatible metal oxides introduced with the sorbent in a reaction zone for purposes of removing mercury compounds and elemental mercury that has be oxidized to form oxides of mercury or reacted to form mercury compounds. Thus, elemental mercury that is not oxidized and therefore not captured by the sorbent in a first or second reaction zone may be captured in a third reaction zone, which may be referred to as a mercury-alumina reactor or an alumina reactor. With respect to single-stage removal, the mercury compounds may be removed in a reaction zone by contacting the gas with sorbent for a time sufficient for the mercury compounds to adsorb on to the sorbent, and alumina if mixed with the sorbent to thereby substantially strip the gas of mercury. Further, if the reaction zone is a solid-gas separator, mercury compounds adsorbed to fly ash would also be removed, thereby substantially striping the gas of mercury compounds. Mercury compounds may similarly be removed in dual-stage or multi-stage removal processes with control of inlet temperatures.

The system and process of the invention has been tested at several power plants utilizing a $SO_X$ and/or $NO_X$ removal demonstration unit embodying a system according to the invention. The demonstration unit utilized a bag house as the second reaction zone and a pipe/duct as a first reaction zone in a dual stage removal system. The test runs and results are summarized in the following examples.

EXAMPLE 1

$NO_X$ concentrations were determined using EPA method 7E, chemiluminesent analysis method, and analyzed with a model 42H chemiluminescent instrument manufactured by Thermo Electron Inc. Sulfur dioxide ($SO_2$) concentrations were measured utilizing, a spectrophotometric analysis method employing a Bovar Western Research Spectrophotometric model 921NMP instrument. In order to obtain accurate and reliable emission concentrations, sampling and reporting was conducted in accordance with US EPA Reference CFR 40, Part 60, Appendix A, Method 6C. Gas flow rates in standard cubic feet per minute (scfm) were measured using AGA method #3, utilizing a standard orifice plate meter run. The demonstration was conducted utilizing a series of test runs on live gas streams from a power plant. Said power plant operates steam boilers which are fired on high sulfur coal. During test runs, $NO_X$ and $SO_2$ concentration readings were taken continuously alternating from the inlet and the outlet of the demonstration unit. Gas flow rates were measured continuously. The tests conducted utilized various forms of oxides of manganese as the metal oxide sorbent. The tests were performed with and without bag house filter pulsing. The following table summarizes the results and operational parameters:

| Range of Operation Parameters | |
|---|---|
| Range of $NO_X$ Concentrations Processed by the Demonstration Unit | 14.14 to 320 ppm |
| Range of $SO_2$ Concentrations Processed by the Demonstration Unit | 300 to 1800 ppm |
| Range of Gas Flow through the Demonstration Unit | 250 to 2000 scfm |
| Range of Pressure Across the Bag House | 0.5" to 10.0" of $H_2O$ |
| Range of Bag House Temperatures | 60° F. to 246° F. |
| Maximum $NO_X$ steady state Removal Rate | 96.0% |
| Maximum $SO_2$ steady state Removal Rate | 99.8% |

EXAMPLE 2

A test using the demonstration unit according to the invention, utilizing oxides of manganese as the metal oxide sorbent was conducted on a simulated gas stream containing varying levels of $NO_X$. Oxides of manganese powders that were used during this test described generally by 60% of particles less than 45 microns in size and having a BET surface area of approximately 30 $m^2/g$. Knowing that there is a competition for reaction sites between $SO_2$ and $NO_X$, a series of tests was conducted to gather data on the efficiency of $NO_X$ capture in the absence of $SO_2$. Synthetic $NO_X$ gas was made on site by use of high-concentration bottle gas which was diluted into the inlet gas stream and processed by the demonstration unit. The bag house was pre-loaded with oxides of manganese prior to introduction of test gas by operating the demonstration unit's blower at high speed (typically about 1200 scfm), and feeding the oxides of manganese into the gas stream at a high rate (between 40% and 90% of feeder capacity) in order to form a suitable filter cake on the fabric bags in the bag house. Gas from cylinders containing $NO_X$, 20% NO, and 20% $NO_2$, (20,000 ppm) was metered into the bag house inlet through a rotameter-type flow gage. $NO_X$ concentrations were measured at the bag house inlet and outlet on an alternating basis throughout the testing with the demonstration unit's continuous emissions monitoring system (CEMS), utilizing a Thermo Electron model 42H Chemiluminescent instrument. In order to obtain accurate and reliable emission concentrations, sampling and reporting was conducted in accordance with US EPA Reference CFR 40, Part 60, Appendix A, Method 6C.

Tests were performed at varying levels of bag house differential pressure (measured in inches of water column) and flow rates (measured in scfm). The $NO_X$ inlet concentrations ranged from 18.3-376.5 ppm with flow rates ranging from 260-1000. It has been determined that varying levels of filter cake thickness affect the $NO_X$ and $SO_2$ removal. A thicker filter cake increases the quantity of sorbent exposed to the gas, thus increasing the micro-reaction zone within the filter cake. As a representation of the sorbent filter cake depth, the differential pressure across the bag house (referred to as $\Delta P$) was measured between 2.00"-9.67" of WC (expressed in inches of water column). $NO_X$ concentrations were recorded once the system was in steady state and the readings were stable for up to 20 minutes. The following table illustrates the level of $NO_X$ removal achieved as a function of inlet concentration, gas flow rate, and bag house differential pressure:

| | Summary of Bottle Gas $NO_X$ Reduction Test | | | | |
|---|---|---|---|---|---|
| Run No. | Inlet $NO_X$ (ppm) | Outlet $NO_X$ (ppm) | % Reduction | $\Delta P$ (in. $H_2O$) | Flow Rate (scfm) |
| 1 | 25.5 | 3.3 | 87.1 | 2.00 | 260 |
| 2 | 140.1 | 8.5 | 94.0 | 3.86 | 500 |
| 3 | 102.0 | 10.5 | 89.7 | 7.71 | 1000 |
| 4 | 324.9 | 17.4 | 94.7 | 7.78 | 1000 |
| 5 | 195.0 | 15.1 | 92.3 | 7.85 | 1000 |
| 6 | 46.7 | 8.4 | 81.9 | 7.85 | 1000 |
| 7 | 200.3 | 32.5 | 83.8 | 3.0 to 4.0 | 1000 |
| 8 | 28.2 | 6.2 | 78.0 | 7.80 | 500 |
| 9 | 57.8 | 11.4 | 80.3 | 2.10 | 500 |
| 10 | 84.9 | 8.9 | 89.5 | 3.80 | 500 |
| 11 | 86.0 | 8.9 | 89.7 | 3.80 | 500 |
| 12 | 194.5 | 11.5 | 94.1 | 3.80 | 500 |
| 13 | 317.5 | 12.7 | 96.0 | 3.80 | 500 |
| 14 | 376.5 | 26.7 | 92.9 | 2.10 | 500 |
| 15 | 376.5 | 26.7 | 92.9 | 2.10 | 500 |
| 16 | 18.3 | 4.0 | 78.1 | 4.45 | 509 |
| 17 | 83.5 | 8.7 | 89.6 | 4.45 | 509 |
| 18 | 40.1 | 5.9 | 85.3 | 4.45 | 509 |
| 19 | 83.5 | 8.7 | 89.6 | 4.45 | 509 |
| 20 | 21.5 | 4.5 | 79.2 | 4.74 | 500 |
| 21 | 45.7 | 6.5 | 85.8 | 4.75 | 500 |
| 22 | 92.1 | 8.6 | 90.7 | 4.75 | 500 |
| 23 | 201.1 | 11.5 | 94.3 | 4.76 | 500 |
| 24 | 317.5 | 14.0 | 95.6 | 4.79 | 500 |
| 25 | 52.1 | 10.0 | 80.9 | 9.67 | 1000 |
| 26 | 82.4 | 12.0 | 85.5 | 9.67 | 1000 |
| 27 | 105.4 | 13.2 | 87.5 | 9.65 | 1000 |
| 28 | 224.0 | 18.5 | 91.8 | 9.67 | 1000 |
| 29 | 328.4 | 23.1 | 93.0 | 9.67 | 1000 |
| 30 | 100.2 | 15.0 | 85.0 | 9.67 | 1000 |

EXAMPLE 3

A further test of the demonstration unit according to the invention utilizing oxides of manganese as the metal oxide sorbent, was conducted on a live exhaust gas slipstream from a 170 MW coal fired boiler. The boiler was operating on high sulfur coal of approximately 4-6% sulfur, resulting in emission concentrations of $SO_2$ in the range of 1200-2000 ppm and $NO_X$ concentrations in the range of 280-320 ppm. A slipstream averaging 1000 scfm was diverted from the main stack exhaust and routed to the demonstration unit for reaction and sorption by the sorbent oxides of manganese. $SO_2$ and $NO_X$ concentrations were measured at the scrubber inlet and outlet of the bag house on an alternating basis throughout the testing with the demonstration unit's continuous emissions monitoring system (CEMS). $SO_2$ concentrations were measured utliizing a Bovar Western Research model 921NMP spectrophotometric analyzer and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C.

$SO_2$ removal efficiencies of 99.8% and $NO_X$ removal efficiencies of 75.3% were achieved while processing on average 1000 scfm of exhaust gas at temperatures typically ranging from 150° F. to 250° F. Test runs were conducted with varying levels of bag house differential pressures ranging from 0.5" to 8.6" of WC, which represents various levels of filter cake thickness. Tests were also conducted with different rates of bag house filter bag pulsing and varying levels of oxides of manganese feed rates. Oxides of manganese powders that were used during this test described generally by 60% of particles less than 45 microns in size and having a BET surface area of approximately 30 $m^2/g$. The following table gives an example of $SO_2$ and $NO_X$ data collected during a test in which 1000 scfm was processed by the dry scrubber at an inlet temperature of 250° F., and a differential pressure of 5.75" of WC. Data was collected once the demonstration unit was in a steady state of $NO_X$ and $SO_2$ removal for a period of 30 minutes. The results are summarized in the below table:

| Pollutant | Inlet ppm | Outlet ppm | ppm % Removal |
|---|---|---|---|
| Oxides of Nitrogen ($NO_X$) | 285.9 | 70.5 | 75.3% |
| Sulfur Dioxide ($SO_2$) | 1703 | 3.9 | 99.8% |

EXAMPLE 4

An additional series of demonstration tests of the demonstration unit, utilizing oxides of manganese as the metal oxide sorbent, was conducted on a live exhaust gas slipstream from a 75 MW coal fired boiler. This boiler was operating on Powder River Basin (PRB) coal, resulting in emission concentrations of $SO_2$ in the range of 340-500 ppm with $NO_X$ concentrations in the range of 250-330 ppm. A slipstream ranging from 500-1000 scfm was diverted from the main stack exhaust and routed to the demonstration unit for reaction and sorption by the oxides of manganese. Oxides of manganese powder that were used during this test described generally by 60% of particles less than 45 microns in size and having a BET surface area of approximately 30 $m^2/g$. $SO_2$ and $NO_X$ concentrations were measured at the bag house inlet and outlet on an alternating basis throughout the test with the demonstration unit's continuous emissions monitoring system (CEMS). $SO_2$ concentrations were measured utilizing a Bovar Western Research model 921NMP spectrophotometric instrument and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C.

$SO_2$ and $NO_X$ reduction efficiencies were measured at 99.9% and 91.6% respectively. Testing was conducted with varying degrees of differential pressure ($\Delta P$) across the bag house to affect the residence time of the targeted pollutants. Reaction chamber temperatures ranged from 150° F. to 280° F. It was determined that longer residence times resulted in improved capture rates for $NO_X$. However, the fact that the $SO_2$ reaction occurs so rapidly and completely, the $SO_2$ reduction efficiency remains nearly complete (99.9%) at even the lowest of residence times. While operating the scrubber at 0.5"-1.0" of WC across the bag house, a pollutant concentration reduction efficiency of 99.8% for $SO_2$ and 40.0% for $NO_X$ was achieved. It is from these results that the concept for a two stage reaction chamber system develops, whereby the first reaction chamber captures the majority of $SO_2$ and a small fraction of $NO_X$, while the second "polishing" stage completes the $NO_X$ removal to desired levels of efficiency, predetermined and controlled by the system operator. Data was collected once the dry scrubber was in a steady state of $NO_X$ and $SO_2$ removal for a period of 30 minutes. The following table gives an example of $SO_2$ and $NO_X$ data collected during a testing in which 500 scfm was processed by the demonstration unit at an inlet temperature of 250° F., and a differential pressure of 8.7" of WC:

| Pollutant | Inlet ppm | Outlet ppm | ppm % Removal |
|---|---|---|---|
| Oxides of Nitrogen ($NO_X$) | 268.1 | 22.4 | 91.6% |
| Sulfur Dioxide ($SO_2$) | 434.3 | 0.5 | 99.9% |

EXAMPLE 5

In an attempt to determine the effectiveness of $SO_2$ and $NO_X$ removal, a series of lab-scale tests were conducted utilizing a glass reactor. The reactor was designed to mimic the gas-solid interactions known to be present in the aforementioned demonstration unit. The glass reactor had a diameter of 2 inches with a length of approximately 24 inches. 50.0 grams of oxides of manganese, utilized as the metal oxide sorbent, were suspended in the reactor using a fritted glass filter allowing for flow of the gas stream, while keeping the oxides of manganese suspended. Approximately 3 inches above the fluidized bed of oxides of manganese, a sintered stainless steel filter was arranged to simulate a bag house filter bag. The reactor was heated during the testing to 250° F. and the gas flow rate was metered at a constant 6 liters per minute (1 pm). Simulated exhaust gas was produced by use of a calibration gas standard having the following composition: $CO_2$=17.35%, $NO_X$=391 ppm, $SO_2$=407 ppm, CO=395 ppm, and balance $N_2$. The simulated flue gas stream passed through the fluidized bed of oxides of manganese, where the flow carried a portion of the sorbent up onto the filter, thus creating a filter cake, which mimics a bag house reactor chamber.

$SO_2$ and $NO_X$ concentrations were measured continuously from the reactor outlet utilizing a continuous emissions monitoring system (CEMS). $SO_2$ concentrations were measured utilizing a Bovar Western Research model 921NMP spectrophotometric instrument and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C. Removal efficiencies of 99.9% for $SO_2$ as well as 99.9% for $NO_X$ were measured and duplicated for several test runs. Inlet temperature was 250° F., with a differential pressure of 2.00" of WC. The following table gives an example of $SO_2$ and $NO_X$ data collected during testing in which 61 pm of gas was processed by a glass reactor:

| Pollutant | Inlet (ppm) | Outlet (ppm) | Sorbent Weight (g) | % Removal | Flow rate (lpm) | ΔP (in H$_2$O) | Temp. (° F.) | Time with >94% Removal |
|---|---|---|---|---|---|---|---|---|
| Oxides of Manganese Type A | | | | | | | | |
| NO$_x$ | 391 | 17.21 | 50 | 95.6% | 6 | 2.00 | 250 | 29 min |
| SO$_2$ | 407 | 0.1 | 50 | 99.9% | 6 | 2.00 | 250 | >54 min |
| Oxides of Manganese Type B | | | | | | | | |
| NO$_x$ | 391 | 0.1 | 50 | 99.9% | 6 | 2.00 | 250 | 60 min |
| SO$_2$ | 407 | 0.1 | 50 | 99.9% | 6 | 2.00 | 250 | >90 |
| Oxides on Manganese Type C | | | | | | | | |
| NO$_x$ | 391 | 0.2 | 50 | 99.9% | 6 | 2.00 | 250 | 34 min |
| SO$_2$ | 407 | 0.1 | 50 | 99.9% | 6 | 2.00 | 250 | >68 min |

Figure 29:
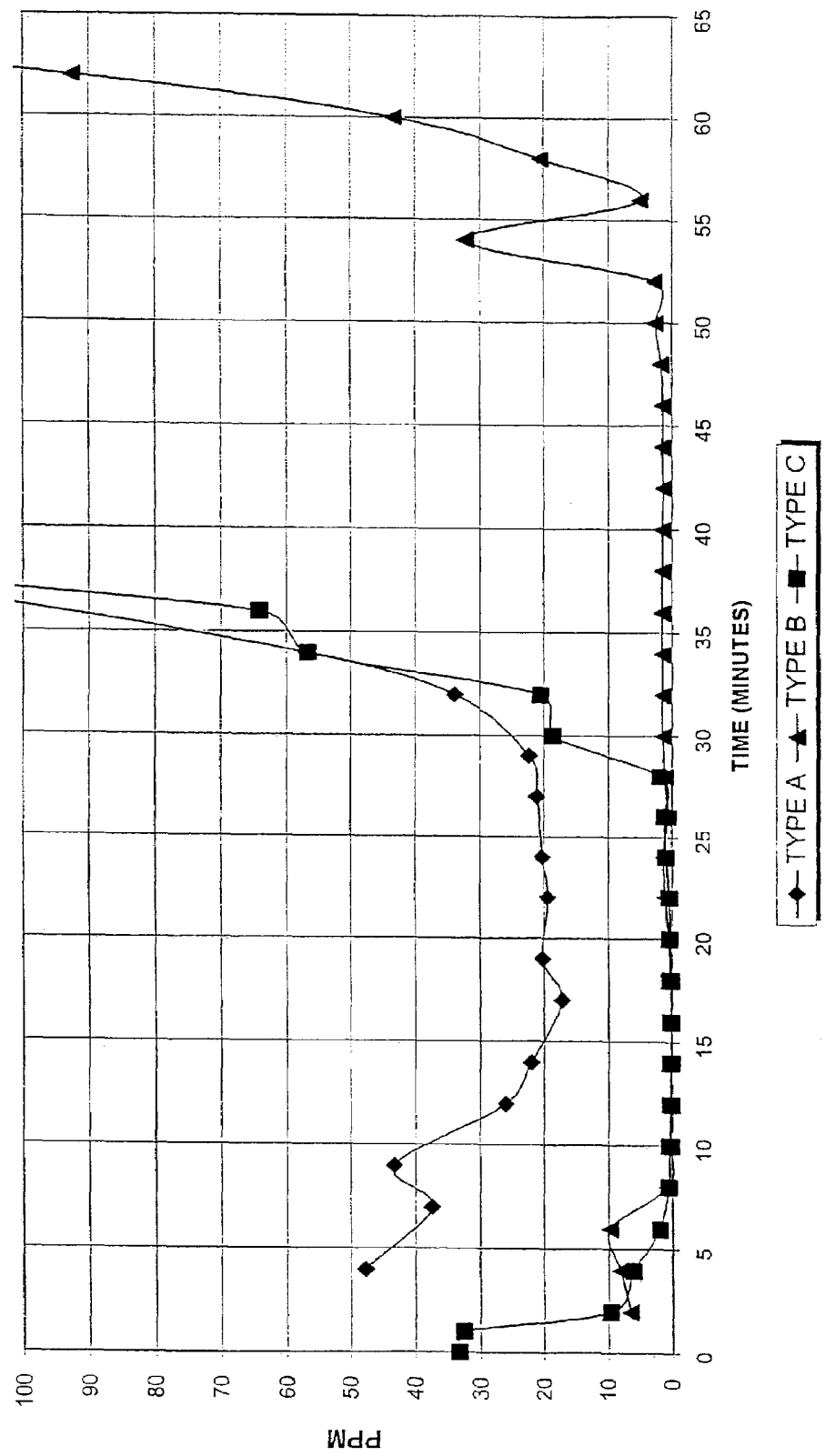
FIG. 29 is a graph plotting $NO_X$ values over time.
Figure 30:
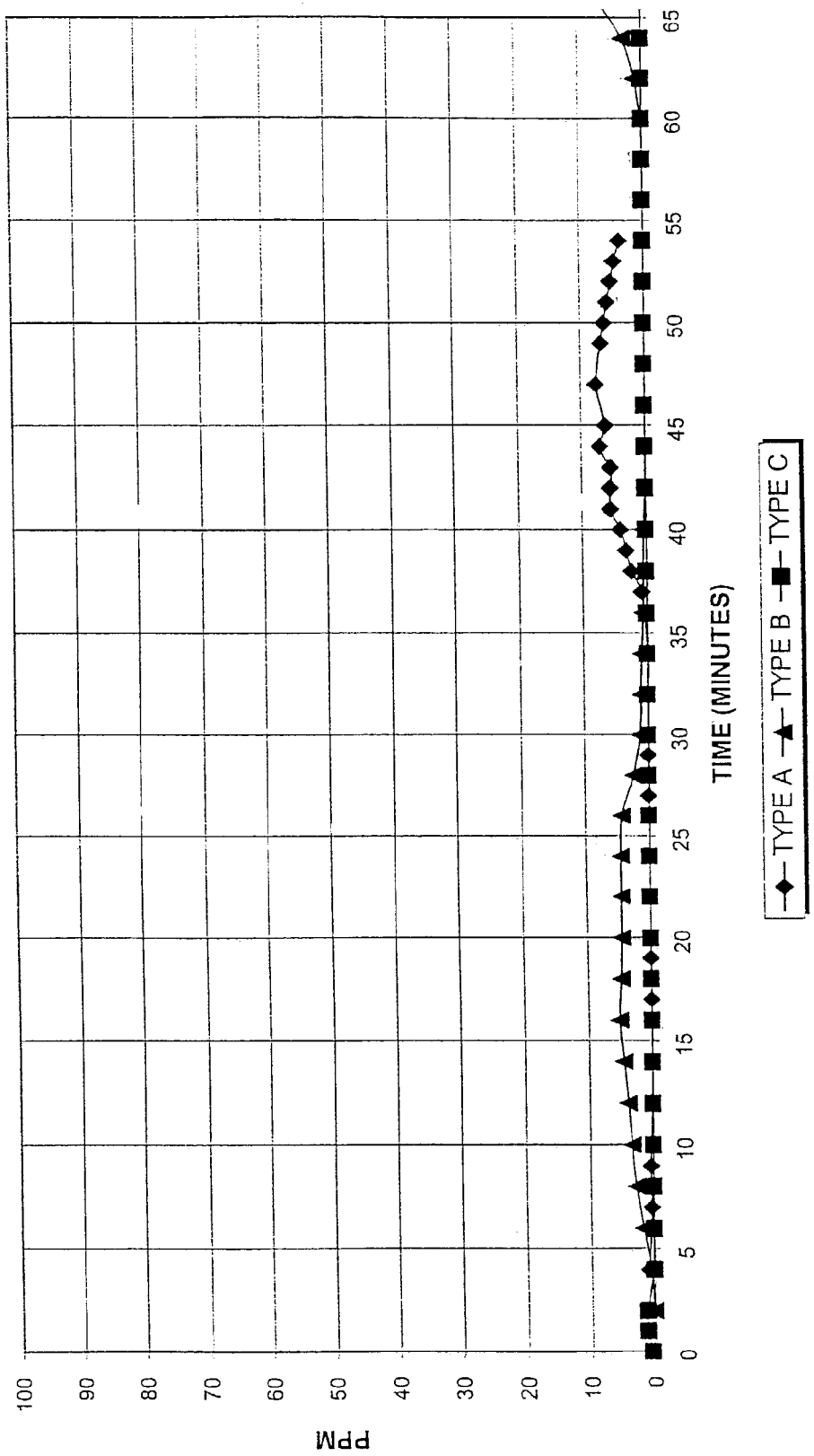
FIG. 30 is a graph plotting $SO_X$ values over time.

The tests of this Example 5 were conducted with three different lots of manganese oxide sorbent. FIGS. 29 and 30 are, respectively, graphs plotting NO$_X$ and SO$_X$ concentrations at the outlet of the glass reactor versus time. The three different oxides of manganese are represented by the symbols "◇" for type A sorbent, "Δ" for type B sorbent, and "□" for type C sorbent in FIGS. 29 and 30. Type A sorbent is an oxide of manganese powder generally at 60% of particles less than 45 microns in size and having a BET surface area of approximately 30 m$^2$/g. Type B sorbent is an oxide of manganese powder generally at 100% of particles less than 45 microns in size and having a BET surface area of approximately 200 m$^2$/g. Type C sorbent is an oxide of manganese powder generally at 80% of particles less than 45 microns in size and having a BET surface area of approximately 90 m$^2$/g. The graph of FIG. 30, confirms the above statements regarding near immediate and complete SO$_X$ capture upon contact with the sorbent. The graph of FIG. 29 shows a range of capture efficiency over time for NO$_X$ and that different forms of oxide manganese may be able to provide more efficient capture of NO$_X$. The type B sorbent performed the best before break-through, followed by type C. Useful captures were observed for all three types. With the process controls of the invention a wide variety of oxides of manganese can be utilized to effect removal at targeted capture rates. Further, the graphs of FIGS. 29 and 30 show that high removal or capture rates can be achieved and sustained over time. The operational parameters of the systems of the invention can be monitored and adjusted to attain and maintain removal or capture rates at these high levels.

As mentioned above, the reacted or loaded sorbent can be recycled and/or regenerated after being removed from a reaction zone. For recycling purposes the reacted sorbent may simply be reintroduced into another reaction zone. For example with reference to FIG. 4, the system has first and second reaction zones 30, 38 which are connected to feeder 20 which contains unreacted sorbent. Gas from external gas source 15 is introduced into first reaction zone 30 along with sorbent fed from feeder 20. The gas is contacted with sorbent for a time sufficient to remove a target pollutant, such as SO$_X$, and after being rendered free of solids is vented from the first reaction zone 30. The gas is then introduced in the second reaction zone 38 along with sorbent from feeder 20. In the second reaction zone 38, the gas is contacted with gas for a time sufficient to remove another target pollutant, here NO$_X$. During operation, the level of NO$_X$ loading on the reacted sorbent in second reaction zone 38 reaches the point where the sorbent no longer efficiently removes NO$_X$. When the point is reached, the NO$_X$ reacted sorbent is removed from the second reaction zone 38 and conveyed or transported to NO$_X$ reacted sorbent feeder 21. The NO$_X$ reacted sorbent, which has unused reactive sites available for further capture, is fed or introduced into the first reaction zone 30 for additional loading or reaction with SO$_X$ in the gas introduced from external gas source 15. When the recycled NO$_X$ reacted sorbent reaches the point where SO$_X$ capture can no longer be achieved at a targeted rate of removal, the now NO$_X$ and SO$_X$ reacted (or loaded) sorbent is removed from the first reaction zone and routed for regeneration. In this way, the amount of unreacted sorbent that is utilized in the first reaction zone can be reduced and the additional load or reactive sites available on the NO$_X$ reacted sorbent can be utilized.

There are essentially two general methods of regeneration, thermal decomposition and chemical decomposition which are discussed below using oxides of manganese as the metal oxide sorbent, it being understood that this discussion applies to other metal oxides that may be utilized as a sorbent in the systems and processes of the invention.

In thermal decomposition, the thermally decomposable react products, e.g., sulfates of manganese and/or nitrates of manganese, are heated in an oxidizing atmosphere whereupon manganese oxide is formed and nitrogen dioxide and/or sulfur dioxide are desorbed and captured. The captured nitrogen dioxide or sulfur dioxide can be reacted with other chemicals to produce marketable products.

Chemical regeneration may be carried out in an aqueous sorbent regeneration subsystem. Such subsystems will utilize oxidizers or oxidants or aqueous oxidizing solutions. For example, in the chemical decomposition or regeneration of a metal oxide, e.g., manganese oxide, the soluble reaction products, sulfates of manganese and/or nitrates of manganese, are dissolved from the used sorbent in a dilute acidic aqueous solution or slurry to which, after separation and recovery of the washed sorbent, other compounds such as oxidizers alkali or hydroxides or carbonates may be added and manganese oxide is precipitated out of solution and removed. Alternatively, the aqueous solution containing disassociated metal cations may be mixed with an oxidizing aqueous solution containing oxidants or oxidizers. The solution, now free of oxides of manganese, can be routed on for further processing or production of marketable products such as alkali or ammonium sulfates and nitrates. The regeneration of manganese oxide and production of useful or marketable products through thermal or chemical decomposition is further discussed below.

Figure 26:
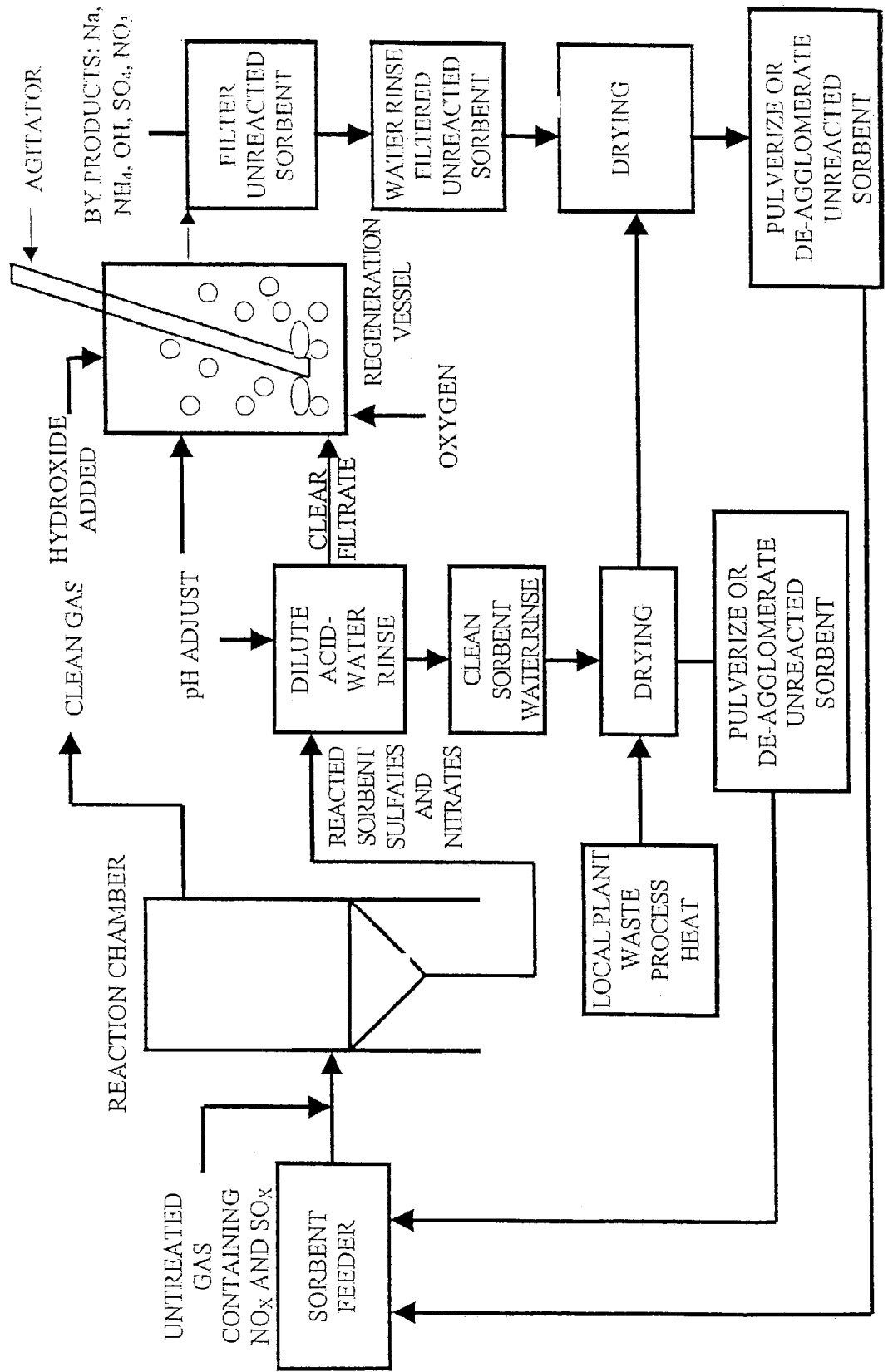
FIG. 26 is a block diagram of a system and process according to the invention.

During a wet or chemical regeneration process, the reacted surfaces of the sorbent may be removed and the remaining sorbent may be refreshed. This will be understood with reference to FIG. 26. In a wet regeneration, reacted sorbent is removed from a reaction zone, a reaction chamber in FIG. 26, and washed in an aqueous dilute acid rinse. Since the interaction between pollutants and the sorbent is believed to be a surface-controlled phenomenon, only a small fraction of the oxides of manganese is reacted with the pollutant. It is this small fraction of the sorbent that can be removed by washing or rinsing which thereby "activates" the sorbent by making unreacted surface area available. The solubility in water of nitrates of manganese is greater than the solubility of sulfates of manganese by at least an order of magnitude in cold water and by at least several orders of magnitude in warm to hot water. This differential in solubility can be advantageously utilized in the regeneration process.

The sulfates and nitrates of manganese on the surface of the sorbent particles dissolve off into solution in the dilute acid aqueous bath, leaving clean sorbent that can be readily separated from the rinse or bath by known means, such as settling and decanting, filtering, centrifuging or other suitable techniques. As is further discussed below, the clear filtrate or solution containing dissolved sulfates and/or nitrates of manganese are directed to a regeneration vessel for regeneration of sorbent and production of useful by-products. The clean sorbent is then dried in, for example, a kiln to remove excess moisture. The heat for this drying step may be waste heat generated by combustion which is transferred or exchanged from combustion or process gases at an industrial or utility plant. After drying, the clean sorbent may be pulverized as necessary to reduce the clean sorbent to particle sizes useful in the system of the invention. The cleaned or "activated" sorbent is then conveyed or otherwise transported to the unreacted sorbent feeder(s) and thus, recycled.

Alternatively, the reacted sorbent removed from the reaction zone can be introduced into an aqueous solution and agitated to form a slurry. An oxidant may be added to the solution to regenerate the rinsed sorbent and to precipitate out metal oxides, here oxides of manganese. The oxidant may be added directly to the slurry or introduced in an oxidizing aqueous solution. The slurry and oxidizing aqueous solution may be heated, preferably up to temperature at or near boiling under ambient atmospheric pressures. Acids and base may be added as necessary to maintain pH at a level that provides a yield of metal oxides having oxidation states or loading capacities of at least equal to or greater than that of unreacted metal oxides. The specific conditions or pH range at given temperatures and pressures, given atmospheric or otherwise, can be determined with reference to a Pourbaix window diagram for specific metal oxides such as the diagrams in FIGS. 31 and 32.

Again with reference to FIG. 26, the regeneration of sorbent and production of useful by-products can be understood. The solution or filtrate containing the dissolved sulfates and nitrates of manganese is passed from the acidic bath to a regeneration vessel to which alkali hydroxides such as potassium hydroxide (KOH) or sodium hydroxide (NaOH), or ammonium hydroxide ($NH_4OH$) is added. The addition of these hydroxides, yield respectively, a solution containing nitrates and/or sulfates of potassium, sodium, or ammonium. These solutions can be made into fertilizer products or other products such as explosives. Air or oxygen is bubbled into or otherwise introduced into the reaction vessel to complete the regeneration, forming oxides of manganese, $MnO_X$ where X is between about 1.5 to 2.0.

Instead of hydroxide compounds, soluble carbonate compounds, e.g., alkali carbonates, such as potassium carbonate ($K_2CO_3$), sodium carbonate ($Na_2CO_3$), or ammonium carbonate ($(NH_4)_2CO_3$) may be added to the solution or filtrate in an regeneration vessel. The addition of carbonates will yield a manganese carbonate precipitate and a solution containing nitrates and/or sulfates of potassium, sodium, or ammonium. The precipitate is separated from the solution, dried and heated to thermally decompose the manganese carbonate to form oxides of manganese and $CO_2$ gas which may be vented or captured and containerized as a marketable product. The oxides of manganese may be further heated in an oxidizing atmosphere to complete the sorbent regeneration, to form oxides of manganese, $MnO_X$ where X is between about 1.5 to 2.0.

Without being bound by theory or limited by this example, Applicants believe that the processing of recovered metal oxides values, such as manganese cations and the precipitation of newly formed metal oxides, e.g., oxides of manganese in a heated aqueous oxidizing solution system maintained within the metal oxide stability area may beneficially affect a number of characteristics of the metal oxides. Such characteristics include, but are not limited to, particle size and shape, crystalline structure or morphology, porosity, composition, surface area (BET), bulk density, electrochemical or oxidation potential and/or metal valence states. Some or all of these characteristics affect the performance of metal oxides of manganese in their various uses and, particularly, in their use as a sorbent for removal of gaseous pollutants. With attention to the maintaining aqueous system conditions within the stability area, Applicants have found that they are able to produce metal oxides, particularly oxides of manganese, having desirably high loading capacities and/or high valence states. With selection of suitable metal oxides, the processing of other reacted metal oxide sorbents in aqueous regeneration subsystems should proceed in substantially the same manner with similar attention to maintaining aqueous solution system condition within the stability area.

The application of these principles can be understood with reference to the following discussion relative to oxides of manganese. The stability area for an aqueous system will vary based upon the conditions of the system and may shift or drift as reactions in the aqueous system proceed. With oxides of manganese as an example, changes in dissolved manganese ion concentration, oxidizer concentration, pH, Eh, solution temperature, and competing dissolved ions may affect the boundaries of the domain or region of stability for $MnO_2$. The aqueous oxidizing solution systems of the invention are typically at temperatures at or near the boiling temperature of aqueous solutions at given atmospheric pressures. The boiling point of aqueous solutions will vary depending upon elevation and will be different at sea level than at other elevations. The effects of such changes or different atmospheric conditions upon the boundaries of the $MnO_2$ stability area or other metal oxide stability area on a Pourbaix Eh-pH diagram can be determined either by empirical data derived from experimentation or with computer software programs known to those skilled in the art such as HSC Chemistry distributed by Outokumpu Oy of Finland. Software may also be written to determine stability areas as defined by other diagrams, such as the Latimer Diagram or the Frost Diagram.

Figure 31:
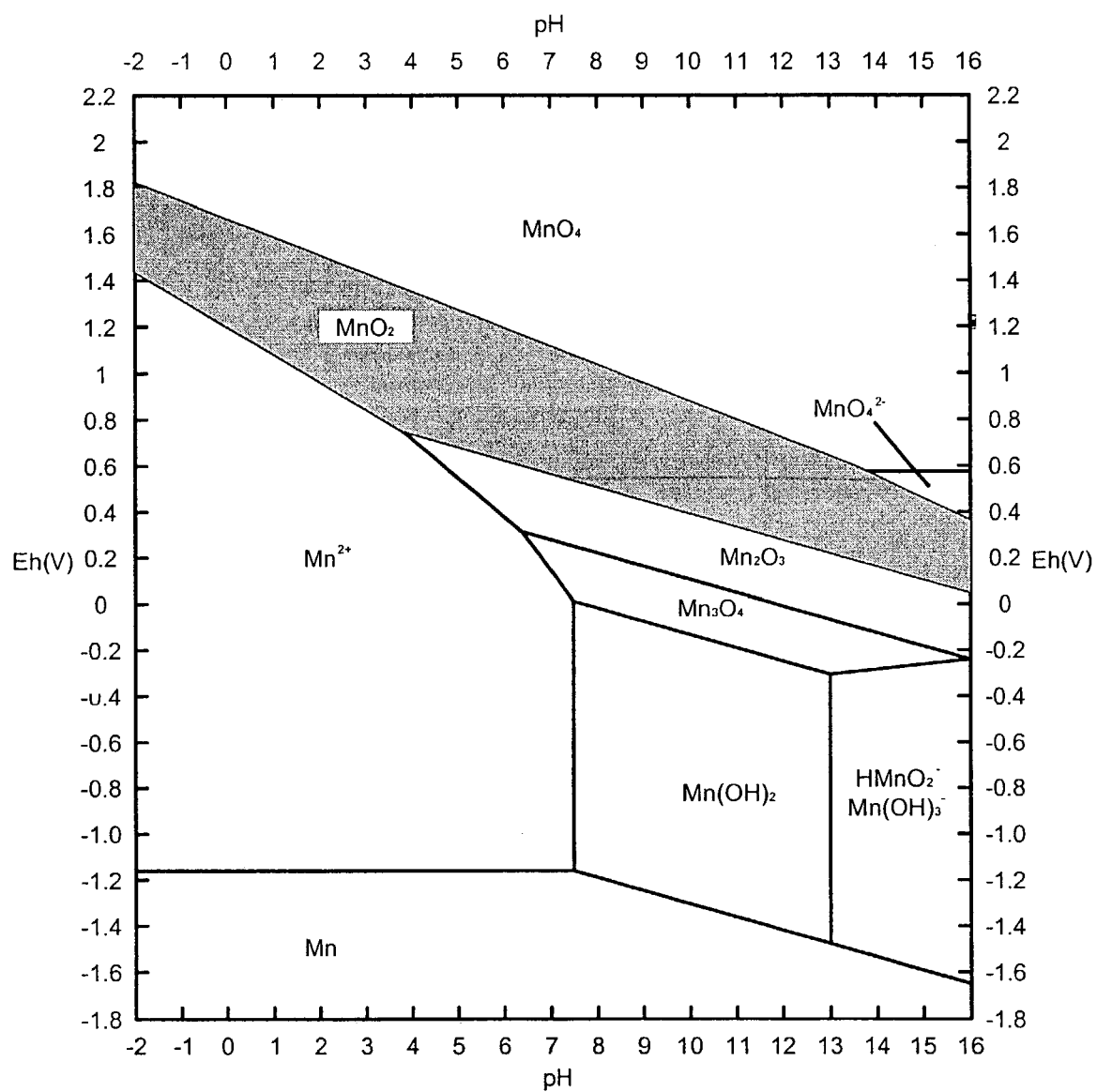
FIG. 31 is a Pourbaix diagram for an aqueous solution of 1 mole/liter manganese ion concentration.
Figure 32:
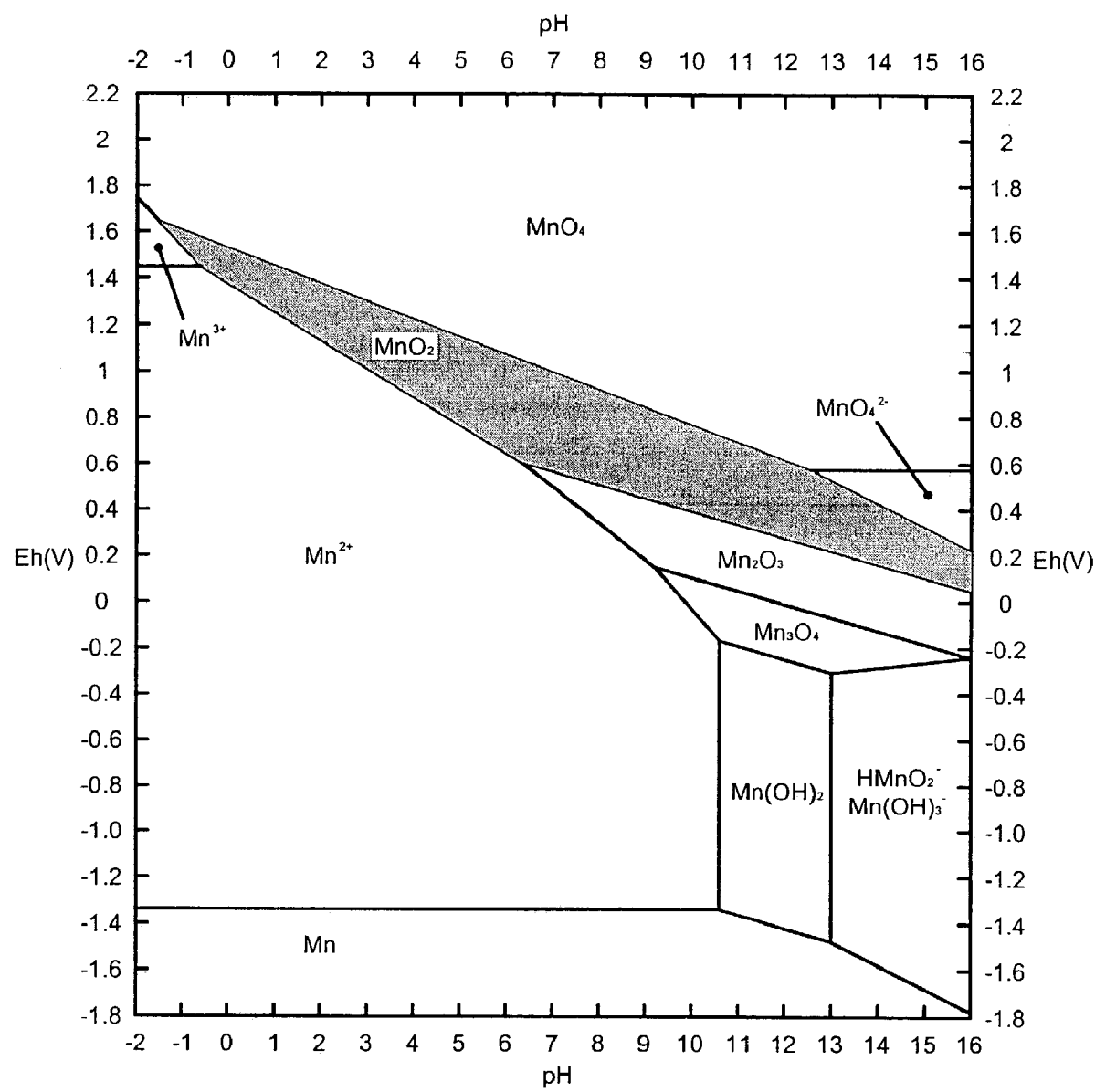
FIG. 32 is a Pourbaix diagram for an aqueous solution of 10-6 mole/liter manganese ion concentration.

With reference to FIGS. 31 and 32, impact of system conditions on the $MnO_2$ stability area is illustrated with respect to Pourbaix diagrams for systems at 25° C. and at atmospheric pressure at sea level. In FIG. 31, the ranges of pH and Eh values for thermodynamically stable aqueous solutions of various manganese compounds are illustrated in graph form for aqueous solution systems at 25° C. and a 1 mole/liter manganese ion concentration. FIG. 32 similarly illustrates ranges of pH and Eh values for aqueous solution systems at 25° C. but at a 1.0×10-6 mole/liter manganese ion concentration. The Pourbaix Window diagrams depicted in FIGS. 31 and 32 were derived from the diagram presented in Atlas Of Electrochemical Equilibria in Aqueous Solutions," Marcel Pourbaix, pages 286-293, National Association of Corrosion Engineers, Houston, Tex. The Eh and pH values as plotted on the graphs delineate the boundaries of the $MnO_2$ stability area for each of the two aqueous solution systems, emphasized with shading in FIGS. 31 and 32. A comparison of the boundaries of the two shaded areas on FIGS. 31 and 32 is illustrative of the different stability areas that exist under different system conditions.

In the methods and systems disclosed herein, the conditions or parameters of aqueous systems are maintained within the metal oxide stability area for the target metal oxide valence state with regard to electrochemical (oxidizing) potential (Eh) range and pH range at the prescribed system temperature at ambient atmospheric conditions in order to provide an Eh-pH combination to achieve stable solution equilibrium, as defined by the stability area as delineated in, for example, a Pourbaix Window diagram, such as those depicted in FIGS. 31 and 32.

In a Pourbaix diagram, the metal oxide stability area is defined by the thermodynamically stable ranges or boundaries of pH-Eh combinations that promote the existence and formation of high valence metal oxides, for example $MnO_2$ (where manganese has an average valence state close to +4), as the most thermodynamically stable form of metal oxide in an aqueous solution system. In the methods of the invention, the constituents of the aqueous solution systems are the loaded oxides of metal and their disassociated metal salts along with the oxidizer or oxidizers in the aqueous oxidizing solution and the base or acids that may be added thereto. During processing, aqueous solution system conditions must be moved to and maintained at or within the boundary area delineated by the combination of Eh and pH ranges. In order to accomplish this, Eh and/or pH adjustments must be made through the addition of oxidizer, base or acid.

To this end, Applicants utilize a heated aqueous oxidizing solution to provide the oxidizer or oxidant. The oxidizer, for example, but not limited to, gaseous oxidizers may also be added directly to a sorbent slurry or solution contain disassociated reactions products, though this methodology is not preferred. The oxidizer must be able to provide the required electrochemical (oxidizing) potential (Eh) at the specified temperature and within the specified ph ranges to provide an Eh-pH combination to achieve stable aqueous solution system equilibrium within the metal oxide stability area for metal oxides of the target valence state. Suitable oxidizers to name a few include, but are not limited to, persulfates, such as potassium peroxidisulfate (K2S2O8), sodium peroxidisulfate (Na2S2O8), and ammonia peroxidisulfate ((NH4)2S2O8), chlorates, such as sodium chlorate (NaClO3), perchlorates such as sodium perchlorate (NaClO4), permanganates, such as potassium permanganate (KMnO4), oxygen (O2) or air, ozone (O3), peroxides, such as H2O2, and hypochlorites, such as sodium hypochlorite (NaOCl). Other oxidizers may be selected by those skilled in the art based upon their compatibility with the metal oxide and corresponding reaction products. Other oxidizers suitable for use in the methods of the invention will be apparent to those skilled in the art; it being understood that the electrochemical potential (Eh) of the heated aqueous oxidizing solution, and therefore the effectiveness of the methods of the invention, depends, in part, upon the strength of the oxidizer and/or the concentration of the oxidizer in the solution.

Depending upon the conditions and constituents of the aqueous solution system, the pH range of the boundary may be acidic, near neutral, or basic. In short, processing may be carried out over the full pH spectrum. However, the oxidizer strength or concentrations required at the extremes of the pH spectrum may make such processing uneconomic though nonetheless achievable. As the reactions proceed, high valence metal oxide is being produced and the oxidizer is being consumed, the system may tend to shift away from the desired pH range, in which case the addition of a suitable base or acid will help accomplish the necessary adjustment to maintain the system within the appropriate Eh-pH range of the high valence metal oxide stability area. Applicants have found it beneficial to maintain pH relatively constant during processing. Alternatively, the introduction of additional oxidizer to bring the system within the appropriate Eh range as pH drifts or shifts in the aqueous system may also beneficially accomplish the necessary adjustment. The aqueous solution system is, and therefore the methods and systems of the invention are, dynamic and adaptive with necessary adjustments being made not only by introduction of acid or base but with introduction of oxidizer as well.

Examples of useful bases include but are not limited to alkali or ammonium hydroxides, potassium hydroxides, and sodium hydroxides. Examples of useful bases include but are not limited to sulfuric, nitric, hydrochloric and perchloric acid to name a few. Applicants have found it useful to match the cations of the oxidant and base. For example, where the oxidant is a persulfate, such as potassium peroxodisulfate (K2S2O8), the pH could be adjusted with a compatible or suitable base, such as potassium hydroxide (KOH). If sodium peroxodisulfate is used (Na2S2O8), a compatible base would be sodium hydroxide (NaOH); and with ammonium peroxodisulfate ((NH4)2S2O8), ammonium hydroxide ((NH4OH) would be a compatible base. The acids or bases and other process additives are generally commercially available and those skilled in the art would be able to readily identify compatible process additives useful within the scope of the invention.

Using manganese as an example, Applicants are able to achieve stable and controlled precipitation so as to rapidly and adaptively yield oxides of manganese having equal or increased loading capacity when compared to the untreated commercially available EMD and CMD oxides of manganese (NMD, EMD, and CMD) or when compared to loaded oxides of manganese. At a given pH, Eh and temperature ranges within the MnO2 stability area, the desired manganese valence state (theoretically close to +4) will exist. Thus, there is no propensity for Mn compounds at or close to +4 valence state to degrade to +3 or +2 valence states. However, if conditions are not maintained within the $MnO_2$ stability area such degradation may occur. Applicants have found that oxides of manganese regenerated or pretreated in or precipitated from a heated oxidizing solutions maintained within the $MnO_2$ stability area will exhibit a Mn valence state of close to +4 and exhibit target pollutant loading capacities equal to and/or greater than (increased) the loading capacities of virgin or loaded oxides of manganese.

Heated oxidizing solutions having the desired pH-Eh-temperature combination can be prepared and maintained or adjusted by increasing or decreasing oxidizer, acid or base concentrations and/or temperature adjustment, as appropriate, so that the conditions are adjusted to remain within the metal oxide stability area. With monitoring of Eh, pH, and temperature, an operator can make necessary adjustments in order to maintain or return the oxidizing solution to conditions within the metal oxide stability area. Such monitoring and adjusting can also be automated utilizing electronic probes or sensors and controllers that control temperature, acid feed, base feed, oxidant feed, or feed of aqueous oxidizing solutions.

Whether processed with oxidizers, aqueous oxidizing solutions, hydroxides, or carbonates are utilized, the precipitated oxides of manganese are separated from the solution, much as the cleaned or reactivated sorbent after the acid wash step, and are then dried and pulverized before being conveyed to a virgin or unreacted sorbent feeder. The filtrate from the separation containing useful sulfates and nitrates that can then be further processed into marketable products.

Rather than drying the cleaned, regenerated or precipitated sorbent as discussed above, the sorbent thus processed may be separated from the rinse or regeneration solution, with the rinse or solution being routed for sorbent regeneration and/or recovery of useful by-products. The separated sorbent is mixed with water to form an sorbent slurry that is fed or otherwise introduced into the removal systems of the invention. This can be accomplished by injection of the slurry through an atomizing spray nozzle capable of introducing the slurry a sufficiently fine spray. The nozzle may be incorporated as feature of a dry sorbent feeder or may be part of a separate system component such as a slurry feeder configured to handle and feed a sorbent slurry. The slurry spray may be injected into a section of pipe duct prior to a reaction zone of the system or directly into a reaction zone. Whether introduced into the flow of gas prior to or directly into a reaction zone of the system of the invention, water is evaporated by flash drying increasing the relative humidity or moisture content of the gas being processed. The moisture content is to be maintained below the dew point of the gas. This can be accomplished through electronic monitoring of the moisture content and gas temperature and regulation of the amount and/or rate of sorbent slurry injection and the amount or rate of dry sorbent being feed into the system. Injection and flash drying of the sorbent slurry also serves to lower the temperature of the process gas to operational temperatures for the system and to temperatures below the thermal decomposition temperature of the reaction products formed by reactions between the sorbent and target pollutant. This lowering of process gas temperature can minimize or eliminate the need for cooling of process gas prior to entry into the system of the invention. Further, during flash drying and water evaporation, sorbent particles may crack or fracture thereby increasing the BET value of the particles, i.e., increasing amount of surface area available surface area for target pollutant capture. These and other process and economic benefits result from sorbent slurry injection and flashing drying.

Oxides of manganese may also be regenerated in a dry or thermal regeneration process, taking advantage of the thermal decomposition temperature(s) of nitrates of manganese. This regeneration process may be understood with reference to FIG. 27. The process illustrated and discussed herein is based upon a removal process where $NO_X$ is the target pollutant with nitrates of manganese being formed in the removal step in the reaction zone, a reaction chamber in FIG. 27. The $NO_X$ reacted sorbent is removed from the reaction chamber and conveyed to a first kiln. In the first kiln, the reacted sorbent is heated to a temperature at or above the thermal decomposition temperature(s) of nitrates of manganese and $NO_2$ desorbs or is otherwise driven off. Oxides of manganese, $MnO_X$ where X ranges from about 1.5 to 2.0 are formed in the first kiln which may be heated with waste process heat from the local plant. The regenerated oxides of manganese from the first kiln may be conveyed to a second kiln heated with waste process heat. Air or oxygen are introduced into the second kiln to more completely oxidize the regenerated sorbent so that the X of MnOx ranges from about 1.5 to 2.0.

If the sorbent was $SO_X$-reacted the thermal regeneration would proceed much as described for $NO_X$, except the first kiln would be heated to a temperature at or above the thermal decomposition temperature of sulfates of manganese and $SO_2$ would desorb or otherwise driven off. With out being bound by theory, Applicants believe that nitrates of manganese thermally decompose at temperatures between about 130° C. to about 260° C., while sulfates of manganese tend to liquefy at the temperatures over which nitrates of manganese thermally decompose. Applicants further believe that sulfates of manganese heated to these temperatures in the presence of a reducing agent, e.g., CO, $H_2$, etc., will decompose to $SO_2$ and MnO. Thus, if the sorbent were reacted with both $SO_X$ and $NO_X$, $NO_2$ could be driven off first by heating reacted sorbent in a kiln to a first temperature at which nitrates of manganese thermally decompose so that $NO_2$ can be generated and directed for further processing. A reducing agent could then be introduced and the reacted sorbent further heated to desorb $SO_2$. Alternatively, the reacted sorbent could be heated to a second temperature, the thermal decomposition temperature of sulfates of manganese with $SO_2$ being desorbed and directed for further processing. The desorbed $SO_2$ can be directed to a wet scrubber containing water and an optional oxidant to form sulfuric acid. This acid liquor can then be marketed as is or further processed. This further processing would involve the addition of an ammonium or alkali hydroxide solution to form useful sulfates. In either case, the regenerated sorbent is further heated in an oxidizing atmosphere to more completely oxidize the regenerated sorbent so that the X of $MnO_X$ ranges from about 1.5 to 2.0.

Figure 27:
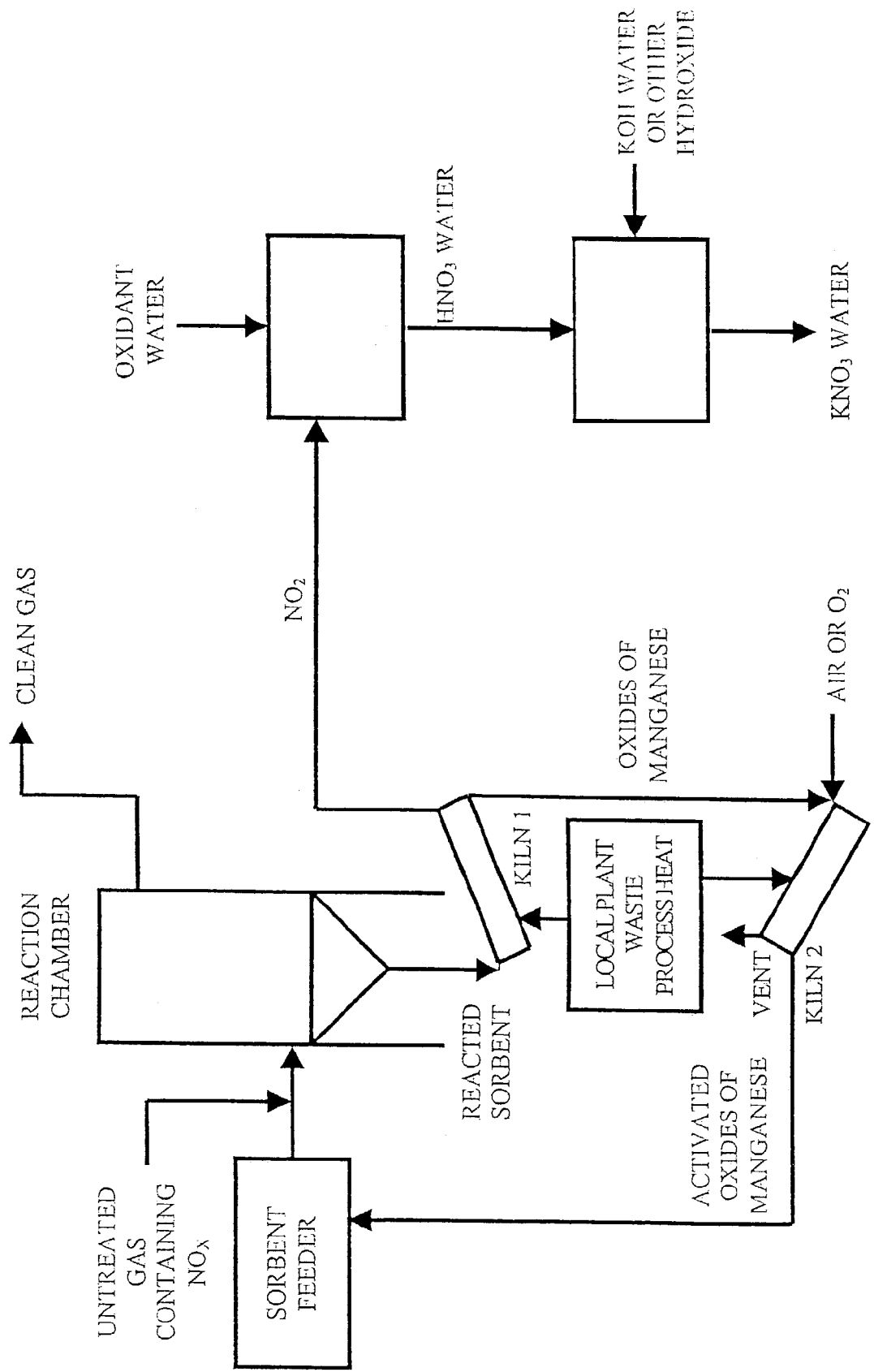
FIG. 27 is a block diagram of a system and process according to the invention.

Referring back to FIG. 27, the desorbed $NO_2$ can be directed to a wet scrubber containing water and an oxidant to form nitric acid. This acid liquor can then be marketed as is or further processed. This further processing would involve the addition of an ammonium or alkali hydroxide solution to form useful nitrates, such as KOH as illustrated in FIG. 27.

In addition to regeneration of sorbent and production of useful by-products from the sulfates and nitrates of manganese, elemental mercury can be recovered for $NO_X$, $SO_X$ reacted sorbent that further has mercury compounds adsorbed thereon can be processed to generate and recover elemental mercury. The reacted sorbent is removed from a reaction zone of a system according to the invention and conveyed to a first kiln, the reacted sorbent is heated to a first temperature to desorb $NO_2$ which is routed for further processing into marketable products. The reacted sorbent is then heated a second temperature to desorb elemental mercury which is routed to a condenser for recovery as a marketable product. The sorbent is then rinsed to wash away any ash and to dissolve sulfates of manganese into solution to form a liquor. Any ash in the liquor is separated out and the ash routed for further handling. Alkali or ammonium hydroxide is added to the liquor to form an unreacted sorbent precipitate of oxides of manganese and a liquor containing alkali or ammonium sulfates. The liquor contains rinsed sorbent. The rinsed sorbent and unreacted sorbent precipitate and are separated from the liquor and the liquor is routed for further processing into marketable products or for distribution and/or sale as a useful by-product. The rinsed sorbent and sorbent precipitate are dried to form unreacted sorbent which can then be pulverized to de-agglomerate the unreacted sorbent.

Ion exchange can also be utilized as a mechanism for the separation and recovery of useful sulfate and nitrates. The dissolved sulfates and nitrates of manganese in the filtrate or solution left after washing $SO_X$ and/or $NO_X$ reacted sorbent can be processed in anion exchangers, permitting the recovery manganese cations and separation of the sulfate and nitrate anions. To accomplish this separation, the aqueous solution containing dissolved sulfates and nitrates is passed across or through a bed or column of an anion exchange resin that has an affinity for one of the two anions to remove one of the two anions. The resin with absorb the anion, for instance the sulfate, while permitting the nitrate to pass through the bed or column. Additionally, the solution stripped of sulfate can then be passed across or through a second bed or column of yet a second anion exchange resin to remove the nitrate. After the resin is loaded, the vessel containing the resin can be taken off-line and the resin therein stripped of the captured anion and recovered for reuse.

Suitable anion exchange resins and vessels are known to and readily identified by those skilled in the art. For purposes of illustration, the anion exchange resin has a chloride in the exchange position on the resin. The chloride is eluted while capturing the sulfate and/or nitrate anions. The solution, after passing through the anion exchanger or exchangers in series, will contain manganese chloride from which manganese carbonate or manganese hydroxide is precipitated with the addition of a soluble carbonate or hydroxide compound; and oxides of manganese can be regenerated from the precipitate as discussed above. The sulfates and/or nitrates loaded on the resin can in turn be eluted with a solution containing chlorides of potassium, sodium or ammonium in order to generate useful sulfates and nitrate by-products for marketing or further processing. The filtrate or solution left over after precipitate formation can be utilized for this purpose.

Gases processed in the systems and processes of the invention may contain non-sorbent particulates, such as fly ash. Usually, the gases will have be routed through a primary ash removal system to remove ash from the gas stream. Nonetheless, not all ash is necessarily removed and particulate fly ash therefore has the potential to accumulate in the sorbent introduced into the systems and process of the invention. This is due to inefficiencies of the primary ash removal system. Also, process gases may be introduced into the systems and processes of the invention without first being routed through a primary ash removal system. The resultant accumulation of fly ash in the sorbent a dry state may have a detrimental effect on the ability to efficiently remove pollutants from gas streams. Further, the presence of ash or other particulate matter in the sorbent in a wet state when processed for regeneration and/or production of useful and marketable by-products may also impact sorbent regeneration and by-product productions.

In order to avoid these potential deleterious effects of ash accumulations, it is desirable to separate the ash from the sorbent. In addition to ash other particulate matters that do not participate in the process chemistry of the invention may also be present in the gases processed with or in the sorbent compounds utilized in the invention. Such particulates are referred to herein as spectator particulates. Some of the metal oxides that may be utilized as a sorbent in the systems and processes of the invention are magnetic or exhibit varying ranges of magnetic properties (from weak to strong comparatively) relative to each other, to ash, and to spectator particulates. The differences in magnetic properties can be effectively exploited to separate ash and/or spectator particulates from the sorbent. Further, it can be utilized to separate sorbent mixtures where more than one sorbent compound or metal oxide is introduced or commingled in a reaction zone.

Ferromagnetic bodies or materials magnetized magnetic fields exert either attractive or repulsive magnetic forces on particles in their proximity depending upon the position and magnetic susceptibility of the particles. Magnetic separation devices and methods exploit the magnetic susceptibility of particles to accomplish the separation of mixtures of magnetic and non-magnetic materials and mixtures of magnetic materials having different magnetic susceptibilities. As used herein, the term "magnetic" describes and should be understood to mean materials or particles having appreciable positive susceptibility. Thus, magnetic materials or particles would include paramagnetic and ferromagnetic materials or particles, and particularly metal oxide sorbents, having appreciable positive susceptibilities. The term "nonmagnetic," as used herein, describes and should be understood to mean materials or particles which are diamagnetic or which have positive susceptibility too weak to be exploited in magnetic separation devices and methods.

Extraction or separation of nonmagnetic materials, such as ash or certain spectator particulates, and of mixtures of magnetic materials can be achieved using any of various devices and methods for magnetic separation. Some known wet and dry magnetic separation devices and methods are described in the following listed patents, the disclosures of which are incorporated herein by reference: U.S. Pat. Nos. 6,383,397; 6,368,561; 6,361,749; 6,355,178; 6,350,296; 6,325,927; 6,277,276; 6,264,842; 6,253,924; 6,250,474; 6,207,463; 6,193,892; 6,193,071; 5,568,569; 4,235,710, and 4,102,780. This is not an exhaustive listing of useful magnetic separation devices and methods but are representative of the magnetic separation technology that could be utilized to accomplish the desired separation. Other magnetic separation methods and devices, both known and unknown, beside those incorporated in the previously listed patents may be adapted and employed in the systems and processes of the invention.

According to the invention, magnetic separation would occur subsequent to sorbent loading and prior to the regeneration of the loaded sorbent. The separation of the magnet sorbent particles from non-magnetic or less susceptible particles can be accomplished with dry or wet separation methods. For example, separation can be performed dry with air as the carrier by a device that can differentiate particles by their magnetic susceptibilities. In one such separation method, loaded sorbent is removed from a reaction zone of a system of the invention and introduced into a separation device. In the separation device, a magnetic field deflects the magnetic or more magnetically susceptible particles in a gravity stream towards a discharge partition while the non-magnetic or less magnetically susceptible particles pass through the magnetic field. The nonmagnetic or less magnetically susceptible materials, such as ash, passes through the device and can then be collected to be rejoined with the ash and other particulates removed in the primary ash removal discharge. The materials thus collected can be routed for appropriate handling and/or disposal. The sorbent that has been separated from ash, spectator particulates or other metal oxide sorbent compounds having lesser magnetic susceptibility can not be routed for either processing, wet or thermal regeneration as described herein above. Magnetic separation can also be accomplished by in wet methods using liquid such as water as the carrier. In an wet magnetic separation method, loaded sorbent is removed from a reaction zone and mixed with a liquid, water for example, to form a loaded or reacted sorbent slurry. This slurry is introduced or fed into the wet magnetic separation device where magnetic and nonmagnetic fractions are separated by the deflection of magnetic particles by a magnetic field to form at least two streams, one containing nonmagnetic and the other magnetic particles. Both gravitational and magnetic forces may be utilized to facilitate the desired separation. Again, if magnetic particles having different magnetic susceptibilities are being separated, the two streams would contain, respectively, magnetic materials of lesser and greater relative magnetic, susceptibilities. The stream containing nonmagnetic materials or particulates would be routed for further handling or disposal. The streams of particles having different relative magnetic susceptibilities would contain, for example, oxides of two different metals. Each stream could then be routed for separate regeneration of the metal oxide sorbent. This could be accomplished with the wet regeneration methods describe herein above. Or the metal oxide sorbents could be separated by filtration or other means from the liquid, dried and regenerated thermally. Alternatively, if the sorbent is sufficiently clean or activated by the rinse received in the course of wet magnetic separations, the sorbent slurries containing the different sorbent fractions could be feed using a sorbent slurry feeder or feeder system, described herein, for reintroduction into the system of the invention.

Liquid mercury can also be recovered from mercury adsorbed to alumina in an alumina reactor. The mercury-reacted alumina from the reactor is heated to drive off or desorb mercury. The mercury vapor is then directed to a condenser where it is condensed to form liquid mercury which is a marketable product.

The above examples of regeneration processes are provided by way of example and are not intended to limit the processes, both known and unknown, for regeneration of oxides of manganese and for recovery of useful and marketable by-products that may be incorporated into the processes of the invention.

The combustion of fossil fuels (e.g., coal, oil, and natural gas) liberates three major air pollutants: (1) particulates (2) sulfur dioxide ($SO_2$) and (3) oxides of nitrogen ($NO_X$). Wet scrubbing, electrostatic precipitators and bag houses can remove particulates such as fly ash. Using mechanical filters or electrostatic precipitators does not remove $SO_2$, $SO_3$, $NO_2$, $N_2O_4$, $NO$, or $N_2O_3$. Prior technologies have used wet scrubbing for the process as a means of sorbing $SO_X$ and $NO_X$. Water is effective as a scrubbing medium for the removal of $SO_2$; removal efficiencies can be improved by the addition of chemical absorbents such as calcium, magnesium and sodium. However, nitrogen oxide (NO) is essentially insoluble in water, even with the use of sorbtion chemicals. Residence times required and liquid-to-gas surface areas have proven to be impractical where high gas flow rates are encountered such as boiler flue gas.

Some of the economics involved in the wet scrubbing process involve high-energy consumption; on the average 4-5% of a plant gross power generation is consumed in the process. For example: (1) high differential pressure of a venturi/absorber tower requires 30" of WC or a bag house and scrubber combination requires even higher static pressures. (2) Large volumes of high pressure scrubbing liquor injected through nozzles into the scrubbing apparatus. (3) Slurry tanks requiring continual vigorous agitation. (4) High horsepower required to force water-saturated non-buoyant flue gas up the stack.

Environmental drawbacks of existing systems include large quantities of minerals used as sorbents and the insoluble sulfites or sulfate formed from the scrubbing reaction. The precipitate is then taken to landfills or holding ponds. Some other disadvantages of existing systems are fouling of the internal scrubber components with hard scale, increasing operational labor and maintenance costs. Some complex regenerative systems use large quantities of chemicals required to react with the millions of gallons of slurry used every day.

The dry scrubbing process described in this patent is effective in removing nearly all $NO_X$ and $SO_X$. Differential pressure requirements through the scrubber should typically not exceed 10 inches of water column and residence times within the sorbent cake are typically less than 1 second. Volumes of sorbent used in this invention in comparison to the wet slurry volumes are miniscule and recharging of reaction zones are done periodically. While stack gases remain dry and hot, some waste heat will be used in the drying of washed and re-generated sorbent. Operational costs of the reaction zone(s) are similar to operating an ash bag house; also capital expenditures are estimated to be reasonable requiring standard off-the-shelf equipment and instrumentation.

As a summary, the equipment is used in the dry scrubbing process is much less complex than the wet scrubber process thus requiring lower operational maintenance costs and a reduced operating staff. Chemical and raw material costs are expected to be similar with less waste effluent produced. The major cost savings will be in the reduced power consumption expected to be significantly less than that of a wet scrubbing system, with fan horsepower reduction making up the majority of the savings.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A system for removal of target pollutants from gases, comprising:
    A. at least one feeder selected from the group consisting of a dry sorbent feeder, a sorbent slurry feeder, sorbent filter cake feeder, and a feeder system, the feeder containing a supply of a sorbent comprised of a regenerable metal oxide, the feeder being configured to handle and feed the sorbent, wherein metal oxide is a metal oxide that is insoluble in aqueous solutions and that produces soluble and/or thermally decomposable reaction products when reacted with a target pollutant in a gas stream;
    B. at least one reaction zone configured for introduction of the sorbent and a gas containing at least one target pollutant, where gas is introduced and contacted with the sorbent for a time sufficient to effect capture of the target pollutant at a targeted pollutant capture rate through formation of a reaction product, the at least one reaction zone being comprised of at least one bag house having fabric filter bags disposed therein and optionally preceded by a gas-solids reaction unit, the metal oxides being in particle form when introduced in to the bag house and having an average particle size of about 0.1 to about 500 microns and a BET value ranging from about 1 to about 1000 m₂/g; and C. a controller for simultaneously monitoring and adjusting system operational parameters, the controller providing integrated control of system differential pressure and other operational parameters selected from the group consisting of target pollutant capture rates, gas inlet temperature, sorbent feed rate and any combination thereof, wherein differential pressure within the system is regulated so that any differential pressure across the system is no greater than a predetermined level and the target pollutants are removed at their targeted capture rate set points.

2. The system of claim 1, wherein the at least one reaction zone comprises a first reaction zone and a second reaction zone, the two reaction zones being connected so that gas passing from the first reaction zone is introduced into the second reaction zone, both reaction zones being a bag house having fabric filter bags disposed therein and each optionally preceded by a gas-solid reaction unit.

3. The system of claim 1, wherein the at least one reaction zone comprises a first reaction zone, a second reaction zone, and a third reaction zone, the reaction zones being connected so that gas passing from the first reaction zone may be introduced in the second reaction zone, the third reaction zone or both reaction zones, the reaction zones being a bag houses having fabric filter bags disposed therein and each optionally preceded by a gas-solid reaction unit.

4. The system of claim 1, wherein the at least one reaction zone comprises modular reaction unit comprised of at least three (3) interconnected reaction zones, the reaction zones being connected so that a gas containing target pollutants can be routed through any one of the reaction zones, any two of the reaction zones in series, or all of the at least three reaction zones in series or in parallel, or any combination of series and parallel, each reaction zone being separately connected to the feeder so that sorbent can be introduced into each reaction zone, the reaction zones each being a bag houses having fabric filter bags disposed therein and each optionally preceded by a gas-solid reaction unit.

5. The system of any one of claims 1-4, wherein the gas-solid reaction unit is selected from the group consisting of a fluidized bed, a pseudo-fluidized bed, a reaction column, a fixed bed, a pipe/duct reactor, a moving bed, a serpentine reactor, a cyclone, a multiclone, or combinations thereof and the bag house selected from the group consisting of conventional bag house, an inverted bag house, a bag house reactor, and a fluidized bed-bag house reactor.

6. The system of any one of claims 1-4, wherein the gas is generated from the combustion of a fossil fuel.

7. The system of any one of claims 1-4, wherein the gas contains target pollutants that form soluble and/or thermally decomposable reaction products when reacted with the sorbent.

8. The system of any one of claims 1-4, wherein the target pollutant in the gas is at least one of an oxide of nitrogen ($NO_X$), and oxide of sulfur ($SO_X$), elemental mercury, a mercury compound, hydrogen sulfide, a totally reduced sulfide, a chloride, an oxide of carbon, ash and particulates.

9. The system of any one of claims 1-4, wherein the gas contains first and second target pollutants, the first and second target pollutants being one of an oxide of nitrogen ($NO_X$), and oxide of sulfur ($SO_X$), elemental mercury, a mercury compound, hydrogen sulfide, a totally reduced sulfide, a chloride, an oxide of carbon, ash and particulates.

10. The system of any one of claims 1-4, wherein the gas contains $NO_X$ and $SO_X$ which react respectively to form nitrate and sulfate reaction products.

11. The system of any one of claims 1-4, further comprising a thermal regeneration subsystem and/or an aqueous regeneration subsystem and optionally at least one magnetic separation device selected from the group consisting of wet and dry magnetic separators.

\* \* \* \* \*